(12) United States Patent
Nagata et al.

(10) Patent No.: US 7,735,129 B2
(45) Date of Patent: Jun. 8, 2010

(54) FIREWALL DEVICE

(75) Inventors: Kazuhiko Nagata, Tokorozawa (JP); Taisuke Oka, Toyonaka (JP); Ryoichi Suzuki, Kodaira (JP); Takashi Ikegawa, Shibuya-ku (JP); Hiroyuki Ichikawa, Hino (JP); Tadashi Ishikawa, Chiba (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1225 days.

(21) Appl. No.: 10/544,483

(22) PCT Filed: Feb. 4, 2004

(86) PCT No.: PCT/JP2004/001124

§ 371 (c)(1),
(2), (4) Date: Aug. 4, 2005

(87) PCT Pub. No.: WO2004/071038

PCT Pub. Date: Aug. 19, 2004

(65) Prior Publication Data

US 2006/0143699 A1    Jun. 29, 2006

(30) Foreign Application Priority Data

Feb. 5, 2003   (JP) .............................. 2003-027828
Feb. 21, 2003  (JP) .............................. 2003-044770
Feb. 24, 2003  (JP) .............................. 2003-045222

(51) Int. Cl.
   *H04L 9/00* (2006.01)

(52) U.S. Cl. ........................................ 726/15; 713/154

(58) Field of Classification Search ................. 726/1–7, 726/11–12, 15, 17–19, 21, 27–30; 713/153–154, 713/161, 169, 132; 709/203, 218, 223, 225, 709/227, 238; 705/73, 18; 711/203, 205–207; 719/311; 370/230, 235, 255–256, 395.3, 370/395.31, 401, 411, 420, 471
See application file for complete search history.

(56) References Cited

U.S. PATENT DOCUMENTS 6,832,322 B1 *  12/2004  Boden et al. ................... 726/15
7,170,857 B2 *  1/2007   Stephens et al. ............ 370/230

(Continued)

FOREIGN PATENT DOCUMENTS

| JP | 2001-298449 | 10/2001 |
|----|-------------|---------|
| JP | 2002-094508 | 3/2002  |
| JP | 2002-544607 | 12/2002 |
| WO | 2002/003220 | 1/2002  |

OTHER PUBLICATIONS

Nagata et al., "Investigation of Secure Content Filtering Method in a Data Center" IEICE Society Conference, B-6-38 (2002) (with partial English translation).
Bellovin, "Distributed Firewalls", Special Issue on Security, ISSN 1044-63971 (Nov. 1999).

*Primary Examiner*—Kimyen Vu
*Assistant Examiner*—Leynna T Truvan
(74) *Attorney, Agent, or Firm*—Oblon, Spivak, McClelland, Maier & Neustadt, L.L.P.

(57) ABSTRACT

A firewall apparatus including plural virtual firewalls, each virtual firewall including a dependent firewall policy, is disclosed. The firewall apparatus includes: a distribution management table for managing a user name and a virtual firewall ID; a part configured to receive authentication information for network connection from a user terminal, and hold a user name included in the authentication information; a part configured to report the authentication information to the authentication server; and a part configured to receive an authentication response from the authentication server, and hold a user ID, included in the authentication response, to be provided to the user terminal. The firewall apparatus registers the user ID in the distribution management table associating the user ID with the user name.

38 Claims, 50 Drawing Sheets

U.S. PATENT DOCUMENTS

| | | | |
|---|---|---|---|
| 7,177,932 B2 * | 2/2007 | Pitsos | 709/225 |
| 7,181,766 B2 * | 2/2007 | Bendinelli et al. | 726/15 |
| 7,209,486 B2 * | 4/2007 | Nakahara | 370/401 |
| 7,272,625 B1 * | 9/2007 | Hannel et al. | 709/200 |
| 7,313,606 B2 * | 12/2007 | Donahue et al. | 709/220 |

* cited by examiner

FIG.11

101-3 DISTRIBUTION MANAGEMENT TABLE

| USER NAME | VIRTUAL FIREWALL ID | USER ID |
|---|---|---|
| #a | 102 | a.a.a.a |
| #b | 103 | b.b.b.b |
| ⋮ | ⋮ | ⋮ |
|  | 104 | OTHERS |

FIG.13

101-4 DISTRIBUTION MANAGEMENT TABLE

| USER NAME | VIRTUAL FIREWALL ID | USER ID |
|---|---|---|
| #a | 102 | a.a.a.a |
| #b | 103 | b.b.b.b |
| ⋮ | ⋮ | ⋮ |
| | 104 | c.c.c.c |
| | DISCARD | OTHERS |

FIG.16

101-5 DISTRIBUTION MANAGEMENT TABLE

| USER NAME | VIRTUAL FIREWALL ID | USER ID |
|---|---|---|
| #a | 102 | a.a.a.a |
| #b | 103 | b.b.b.b |
| ⋮ | ⋮ | ⋮ |
|  | ERROR | OTHERS |

FIG.22

| USER NAME | VIRTUAL FIREWALL ID | INDIVIDUAL FILTERING ID | COMMON FILTERING ID | USER ID |
|---|---|---|---|---|
| #a | 302 | α | I | |
| #b | 302 | β | I | |
| #d | 303 | γ | II | |
| ⋮ | ⋮ | ⋮ | ⋮ | |

601 DISTRIBUTION MANAGEMENT TABLE

FIG.23

| USER NAME | VIRTUAL FIREWALL ID | INDIVIDUAL FILTERING ID | COMMON FILTERING ID | USER IP ADDRESS |
|---|---|---|---|---|
| #a | 302 | α | I | a.a.a.a |
| #b | 302 | β | I | |
| #d | 303 | γ | II | |
| ⋮ | ⋮ | ⋮ | ⋮ | ⋮ |

1101 DISTRIBUTION MANAGEMENT TABLE

FIG.26

| USER NAME | VIRTUAL FIREWALL ID | FILTERING ID | USER ID |
|---|---|---|---|
| #a | 302 | $\alpha$ | a.a.a.a |
| #b | 302 | $\beta$ | b.b.b.b |
| #d | 303 | $\gamma$ | d.d.d.d |
| ⋮ | ⋮ | ⋮ | ⋮ |
| | 304 | | OTHERS |

301-3 DISTRIBUTION MANAGEMENT TABLE

FIG.28

| USER NAME | VIRTUAL FIREWALL ID | FILTERING ID | USER ID |
|---|---|---|---|
| #a | 302 | α | a.a.a.a |
| #b | 302 | β | b.b.b.b |
| #d | 303 | γ | d.d.d.d |
| ⋮ | ⋮ | ⋮ | ⋮ |
|  | 304 |  | c.c.c.c |
|  | DISCARD |  | OTHERS |

301-4 DISTRIBUTION MANAGEMENT TABLE

FIG.30

| USER NAME | VIRTUAL FIREWALL ID | FILTERING ID | USER ID |
|---|---|---|---|
| #a | 302 | $\alpha$ | a.a.a.a |
| #b | 302 | $\beta$ | b.b.b.b |
| ⋮ | ⋮ | ⋮ | ⋮ |
| | ERROR | | OTHERS |

301-5 DISTRIBUTION MANAGEMENT TABLE

FIG.32

1961 FILTERING TABLE

| USER TERMINAL SIDE IP ADDRESS | COMMUNICATION PARTNER TERMINAL SIDE IP ADDRESS | USER TERMINAL SIDE PORT | COMMUNICATION PARTNER TERMINAL SIDE PORT | OPERATION |
|---|---|---|---|---|
| a.a.a.a | j.j.j.j | x | m | PASS |
| a.a.a.a | j.j.j.j | y | n | DISCARD |
| ... | | | | |
| a.a.a.a | | | | |

NUMBER OF RULES OF USER #a = N

FIG.35

| USER NAME | PASSWORD |
|---|---|
| USER 515−1 | α |
| USER 515−2 | β |

FIG.36

| USER TERMINAL INFORMATION | IN-USE FLAG |
|---|---|
| IP_1 | 0 |

FIG.37

| USER NAME | COMMON FILTERING TABLE ID | INDIVIDUAL FILTERING TABLE ID |
|---|---|---|
| USER 515−1 | COMMON 509 | INDIVIDUAL 510−1 |
| USER 515−2 | COMMON 509 | INDIVIDUAL 510−2 |

FIG.38

| USER NAME | INDIVIDUAL SECURITY POLICY |
|---|---|
| USER 515-1 | RULE 1-1 ⋮ RULE 1-m |
| USER 515-2 | RULE 2-1 ⋮ RULE 2-n |

FIG.39

| USER TERMINAL INFORMATION | COMMON FILTERING TABLE ID | INDIVIDUAL FILTERING TABLE ID |
|---|---|---|
|  |  |  |

FIG.51

| FIRST HALF PART OF USER NAME | PASSWORD |
|---|---|
| USER 2015-1 | $\alpha$ |

FIG.52

| USER TERMINAL INFORMATION | IN-USE FLAG |
|---|---|
| IP_1 | 0 |

FIG.53

| FIRST HALF PART OF USER NAME | PASSWORD |
|---|---|
| USER 2015-2 | $\beta$ |

FIG.54

| USER TERMINAL INFORMATION | IN-USE FLAG |
|---|---|
| IP_2 | 0 |

FIG.55

| USER 2015-1 | 2016-1 |
|---|---|

FIG.56

| USER 2015-2 | 2016-2 |
|---|---|

FIG.57

| FIRST HALF PART OF USER NAME | VIRTUAL FIREWALL ID | COMMON FILTERING TABLE ID | INDIVIDUAL FILTERING TABLE ID |
|---|---|---|---|
| USER 2015-1 | VIRTUAL 2014-1 | COMMON 2009-1 | INDIVIDUAL 2010-1 |
| USER 2015-2 | VIRTUAL 2014-2 | COMMON 2009-2 | INDIVIDUAL 2010-2 |

FIG.58

| USER NAME | INDIVIDUAL SECURITY POLICY |
|---|---|
| USER 2015-1 | RULE 1-1 |
|  | ⋮ |
|  | RULE 1-m |
| USER 2015-2 | RULE 2-1 |
|  | ⋮ |
|  | RULE 2-n |

FIREWALL DEVICE

TECHNICAL FIELD

The present invention relates to a firewall apparatus for protecting a user connecting to an external network such as the Internet.

BACKGROUND ART

There exists firewalls (to be also referred to as FW) as means for improving security of an own terminal or an own network.

The firewall is placed between the own terminal or the own network that requires high security and an external network. The firewall determines whether a packet transmitted from the external network to the own terminal or network, or a packet transmitted from the own terminal or network to the external network is permitted to pass through the firewall according to a predetermined security policy. The firewall performs a filtering process in which, if the packet is permitted to pass through the firewall, the packet is passed through the firewall, and if not, the packet is discarded.

One rule is formed by associating address, protocol type, port number, direction, availability of being passed through, or other condition with each other so that the security policy is formed by plural rules.

In addition, the firewall can be categorized into three types according to its placement.

The first type is, as shown in FIG. 1, a firewall 10 (to be referred to as "terminal base firewall" hereinafter) that is included in the own terminal. The firewall 10 is used for protecting the own terminal 10 against an external network (the Internet, for example) 12.

The second one is, as shown in FIG. 2, a firewall 10 (to be referred to as "CPE base firewall" hereinafter) that is placed at an edge of the own network 13 and is connected to the external network 12. This firewall is used for protecting the own network 13 against the external network 12.

The third one is, as shown in FIG. 3, a firewall 10 (to be referred to as "NW base firewall" hereinafter) that accommodates more than one networks 13 or terminals 11 that are operated by corresponding independent policies and that are required to increase security, and the firewall is placed at a position connecting to the external network 12 and is used for protecting each network 13 or terminal against the external network 12.

As constant connection users are increasing, necessity of security is increasing. Under the circumstances, it is required to provide users who do not have enough knowledge of security with a security service for compensating for lack of skill with low cost. In this view point, among the above-mentioned firewalls, the NW base firewall in which the firewall is provided in the network side is effective.

That is, by using the NW base firewall, economy by integrating accommodated users and reduction of user activities by outsourcing can be expected. However, since it is necessary to provide each user with the security policy, an architecture for constructing virtual firewalls for each user in a physical firewall is required according to the firewall of this method.

FIG. 4 shows a method for constructing the virtual firewall according to a conventional technology. For assigning a virtual firewall to a user's terminal, server or network, a fixed user ID is associated with a virtual firewall ID.

The fixed user ID is a VLAN-ID of a network to which the user's terminal or server belongs, or an IP address of the user's terminal or server. In FIG. 4, an IP address [a.a.a.a] of a sever 211 of a user #a and an IP address [b.b.b.b] of a sever 212 of a user #b are registered in a distribution management table 201 beforehand as fixed user IDs in which the fixed user IDs are associated with virtual firewall IDs 202 and 203 respectively.

Then, for example, in a communication between the sever 211 and a connection partner terminal 213 of the user #a, for a packet 221 sent from the server 221, the distribution management table 201 is referred to by using the source IP address [a.a.a.a] as a search key, and the virtual firewall ID 202 that is associated with the source IP address [a.a.a.a] is retrieved so that the packet 221 is distributed to the virtual firewall 202. In addition, for a packet 222 sent from the connection partner terminal 213, the distribution management table 201 is referred to by using the destination IP address b.b.b.b as a search key, and the virtual firewall ID 203 that is associated with the destination IP address b.b.b.b is retrieved so that the packet 222 is distributed to the virtual firewall 203.

In each of the virtual firewalls 202 and 203, a filtering rule conforming to a security policy defined by the user #a and the user #b, respectively, is described. According to the rule, the packet 221 and the packet 222 are passed or discarded. Accordingly, an attacking packet from an unauthorized access person to the server 211 can be filtered, for example.

This conventional technology is mainly applied to a data center and the like. In the data center, since a fixed user ID is used, the user ID can be registered in the distribution table 201 beforehand.

"Investigation of secure content filtering method in a data center" (IEICE Society conference (2002) B-6-38 2002.8.20) is a prior art document relating to the conventional technology.

As another conventional technology for setting security communications for each user, there is a document (Japanese Laid Open Patent Application No. 2001-298499, "Security communication method, communication system and the apparatus). However, the conventional technology mainly presumes IP sec communications. Security communications for each user defined in the document are merely for determining the strength of an authentication algorithm or an encryption algorithm used for communications according to a request of a user, which is different from a function for filtering attacking packets due to invalid accesses.

In a constant connection service used by a user, a user ID (user IP address) is assigned for the first time when a connection between the user terminal and a network is established. More particularly, the user ID is assigned for the first time when a PPP (Point to Point Protocol) session is established. In addition, the user IP address is generally variable.

Therefore, even if one tries to apply the virtual firewall of the conventional technology to the constant connection service, it is difficult to apply the virtual firewall of the conventional technology to the constant connection service since it is impossible to register a user IP address in the distribution management table beforehand.

In addition, as to the constant connection service, since the number of accommodated users is much larger than a case for applying the firewall to a data center and the like, it is required to increase the number of users to be accommodated simultaneously by the NW based firewall apparatus.

Other than the viewpoint of a placement location of a firewall, the firewall can be classified to two types as follows from a viewpoint of a holding method of the security policy.

A first firewall is one that includes the security policy inside of the firewall. Regular firewalls adopt this method.

Another firewall is one, as shown in FIGS. 5, 6 and 7, that has the security policy outside of the firewall 10. The security policy is distributed to plural firewalls 10.

For each type of before-mentioned firewalls (terminal base firewall, CPE base firewall, or NW base firewall), many of the firewalls include the security policy in the inside.

However, as to the firewall that uses the method for distributing the security policy, Japanese Laid-Open Patent Application No. 2002-544607 discloses applying such method to the terminal base firewall. In addition, a document ([distributed Firewalls] (November 1999, Special issue on Security, ISSN 1044-63971)) discloses applying the method to the CPE base firewall.

In addition, also as to the NW base firewall, when an accommodated network or terminal is statically connected, the same situation as the CPE base firewall applies to the NW base firewall.

However, as to the NW base firewall, in a case where the accommodated network or the terminal is dynamically connected and disconnected, or the accommodating NW base firewall is changed, the method of holding the security policy in the inside of the firewall is not useful since all security policies relating to the networks or the terminals that the firewall may accommodate should be held regardless of the connection and disconnection of the network or the terminal.

Therefore, in such an environment, a NW base firewall apparatus having means for keeping an optimum capacity of the security policies according to connection or disconnection of the network or the terminal becomes necessary.

In addition, as to the NW base firewall having means for loading security policies in response to connection of networks or terminals, since plural networks or terminals are connected to the NW base firewall, the NW base firewall may load many security policies. In this case, processes in the CPU of the NW base firewall for loading security policies becomes large, so that processes of filtering and transferring cannot be performed. Thus, the filtering and transferring performance is affected.

In addition, the apparatus that delivers the security policy cannot distribute the security policy when the distributing amount exceeds the apparatus's performance.

Further, as to a line used for distributing the security policy, when the distributing amount exceeds the circuit capacity, discard or delay may occur in distributing the security policy.

Therefore, a NW base firewall apparatus including means for reducing the security policy amount to be delivered is necessary.

DISCLOSURE OF THE INVENTION

A first object of the present invention is to provide a firewall apparatus that can provide a service even in a communication environment in which the user ID cannot be associated with the virtual firewall ID beforehand.

In addition, a second object of the present invention is to provide a firewall apparatus that can increase the number of multiple users.

Further, a third object of the present invention is to provide a firewall apparatus that can hold or discard necessary security policies according to connection or disconnection of an accommodating network or terminal, and that can reduce the security policy amount to be loaded.

The first object is achieved by a firewall apparatus including plural virtual firewalls, each virtual firewall including a dependent firewall policy, the firewall apparatus including:

a distribution management table for managing a user name and a virtual firewall ID;

a part configured to receive authentication information for network connection from a user terminal, and hold a user name included in the authentication information;

a part configured to report the authentication information to the authentication server; and a part configured to receive an authentication response from the authentication server, and hold a user ID, included in the authentication response, to be provided to the user terminal;

wherein the firewall apparatus registers the user ID in the distribution management table associating the user ID with the user name.

According to the present invention, by using the authentication information for network connection from the user terminal, the user ID can be dynamically associated with the virtual firewall ID even in the communication environment in which the user ID cannot be associated with the virtual firewall ID beforehand. Then, the filtering rule complying with the security policy corresponding to the user terminal can be applied to a packet transmitted or received by the user terminal of the user ID.

The second object of the present invention can be achieved by a firewall apparatus including:

a distribution management table for managing a user name, a user ID, and a filtering ID associating them with each other;

a filtering table, being specified by the filtering ID, including a dependent filtering policy;

a part configured to receive authentication information, issued by a user terminal when starting network connection, so as to hold the user name;

a part configured to report the authentication information to an authentication server;

a part configured to receive an authentication response from the authentication server so as to hold a user ID, included in the authentication response, to be provided to the user terminal, wherein the firewall apparatus registers the user ID in the distribution management table associating the user ID with the user name.

According to the present invention, since the filtering ID is introduced so that the filtering policy is identified by the filtering ID for each user, plural independent filtering policies can be managed in each virtual firewall so that the number of multiple users can be increased.

In addition, since the search area for a packet for each user is restricted only to a table corresponding to a filtering ID provided to the packet, it can be avoided that the search process time unnecessarily increases.

In addition, in the present invention, the filtering ID is divided into an individual filtering ID and a common filtering ID so that a filtering policy specific to each user is written in the individual filtering table and a filtering policy commonly used for plural users is written in the common filtering table.

Accordingly, for example, in a case where 10 users use two identical filtering rules, if a conventional technology is applied, 20 rules are written in the filtering table. On the other hand, according to the present invention, only two rules need to be written in the filtering table. Thus, it becomes possible to efficiently manage the filtering policy.

The third object of the present invention can be achieved by a firewall apparatus provided between plural user terminals and a network and performing filtering for the plural user terminals, the firewall apparatus including:

an individual filtering table holding security policies for each user;

a common filtering table holding a security policy common to plural users;

a distribution management table for managing user terminal information, a common filtering table ID, and an individual filtering table ID;

a communication part configured to communicate with an authentication server determining whether the user terminal is connectable;

a communication part configured to communicate with an identifier management server managing the common filtering table ID and the individual filtering ID associated with a user;

a communication part configured to communicate with a security policy management server managing correspondence between a user-specific security policy to be written into the individual filtering table and the user, wherein, the filtering apparatus:

receives a connection request with authentication information including a user name from the terminal when starting network connection, holds the user name, and reports the user name to the authentication server, holds user terminal information accompanied by an authentication response received from the authentication server, reports the user name to the identifier management server and to the security policy server, writes the common filtering table ID, the individual filtering table ID, and the user terminal information received from the identifier management server into the distribution management table associating them with each other, and writes policy information received from the security server and the individual filtering table ID into the individual filtering table.

According to the present invention, a necessary security policy can be loaded simultaneously with a start of connection of the network or the terminal.

In addition, an identifier indicating an area to which the security policy is written at the start of network connection is associated with user terminal information provided to the network or the terminal to start connection by authentication, so that the identifier is determined based on the user terminal information of the network or terminal at the time of disconnection so as to discard the security policy in the area indicated by the identifier. Therefore, the security policy can be discarded simultaneously with disconnection of the network or the terminal.

In addition, according to the firewall apparatus of the present invention, by dividing the security policy into an individual security policy and a common security policy, the common security policy can be always held in the firewall apparatus and only the individual security policy needs to be loaded at the time of start of connection by the network or the terminal. Therefore, the security policy amount to be loaded can be decreased.

In addition, according to the firewall apparatus of the present invention, all firewall apparatuses can be connected to an apparatus for distributing the security policy and an apparatus that can check the identifier so that the firewall apparatuses can load the security policy. Therefore, even when the network or the terminal changes an accommodating firewall apparatus to start network connection or to perform disconnection, the firewall apparatus can properly load the security policy.

BRIEF DESCRIPTION OF THE DRAWINGS

FIG. 11 is a diagram showing an example of a distribution management table in an embodiment 1-3;

FIG. 13 is a diagram showing an example of a distribution management table in the embodiment 1-4;

FIG. 16 is a diagram showing an example of the distribution management table in the embodiment 1-5;

FIG. 22 is a diagram showing an initial state of the distribution management table in an embodiment 2-3;

FIG. 23 is a diagram showing a state in which an IP address is registered in the distribution management table in an embodiment 2-3;

FIG. 26 is a diagram showing information in the distribution management table in the embodiment 2-5;

FIG. 28 is a diagram showing information in the distribution management table in an embodiment 2-6;

FIG. 30 is a diagram showing information in the distribution management table in an embodiment 2-7;

FIG. 32 is a diagram showing contents in a filtering table;

FIG. 35 is a diagram showing detail of authentication information in an authentication server shown in FIG. 34;

FIG. 36 is a diagram showing detail of a pool table held in a user terminal information part in the authentication server shown in FIG. 34;

FIG. 37 is a diagram showing detail of an identifier management table in the identifier management server shown in FIG. 34;

FIG. 38 is a diagram showing detail of a security policy table in the security policy server shown in FIG. 34;

FIG. 39 is a diagram showing detail of the distribution management table, in an initial state, in the firewall apparatus shown in FIG. 34;

FIG. 51 is a diagram showing details of authentication information in an authentication server 1 shown in FIG. 50;

FIG. 52 is a diagram showing details of a pool table held in a user terminal information part in the authentication server 1 shown in FIG. 50;

FIG. 53 is a diagram showing details of authentication information in an authentication server 2 shown in FIG. 50;

FIG. 54 is a diagram showing details of a pool table held in a user terminal information part in the authentication server 2 shown in FIG. 50;

FIG. 55 is a diagram showing a user name sent to the firewall apparatus via the user terminal (2002-1) by the user (2015-1);

FIG. 56 is a diagram showing a user name sent to the firewall apparatus via the user terminal (2002-2) by the user (2015-2);

FIG. 57 is a diagram showing details of a identifier management table 2012 in the identifier management server shown in FIG. 50;

FIG. 58 is a diagram showing details of a security policy table in the security policy server shown in FIG. 50;

PREFERRED EMBODIMENTS FOR CARRYING OUT THE INVENTION

In the following, embodiments of the present invention are described with reference to figures.

Embodiment 1-1-Embodiment 1-5

Embodiment 1-1

Figure 1:
FIG. 1 is a block diagram showing an example of a conventional firewall apparatus.
Figure 2:
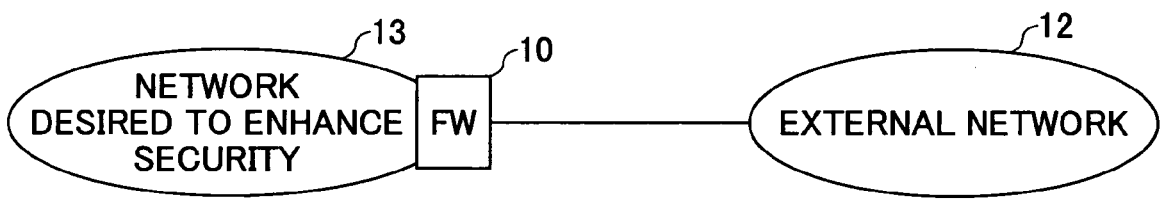
FIG. 2 is a block diagram showing another example of a conventional firewall apparatus.
Figure 3:
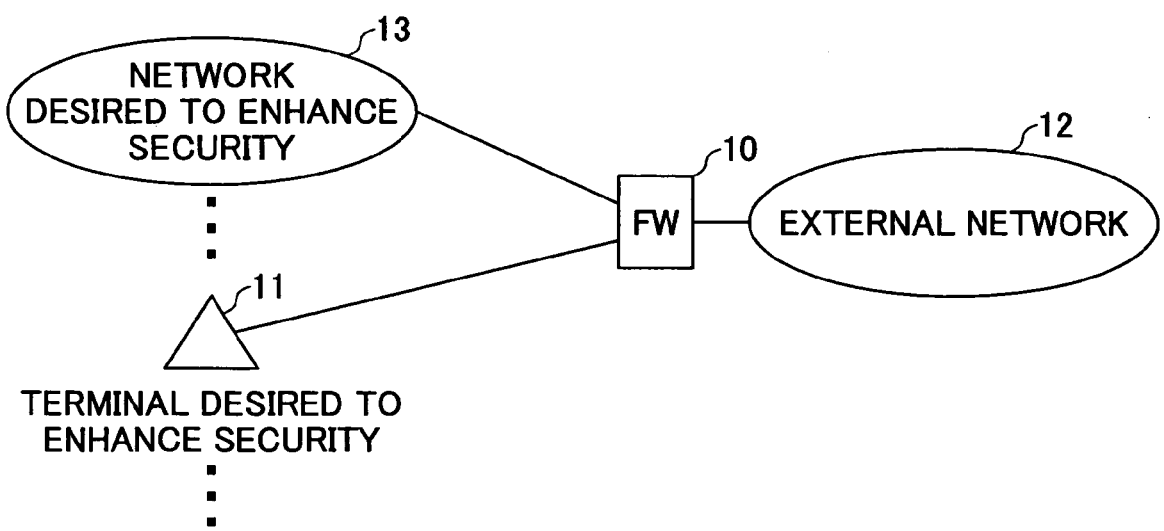
FIG. 3 is a block diagram showing another example of a conventional firewall apparatus.
Figure 4:
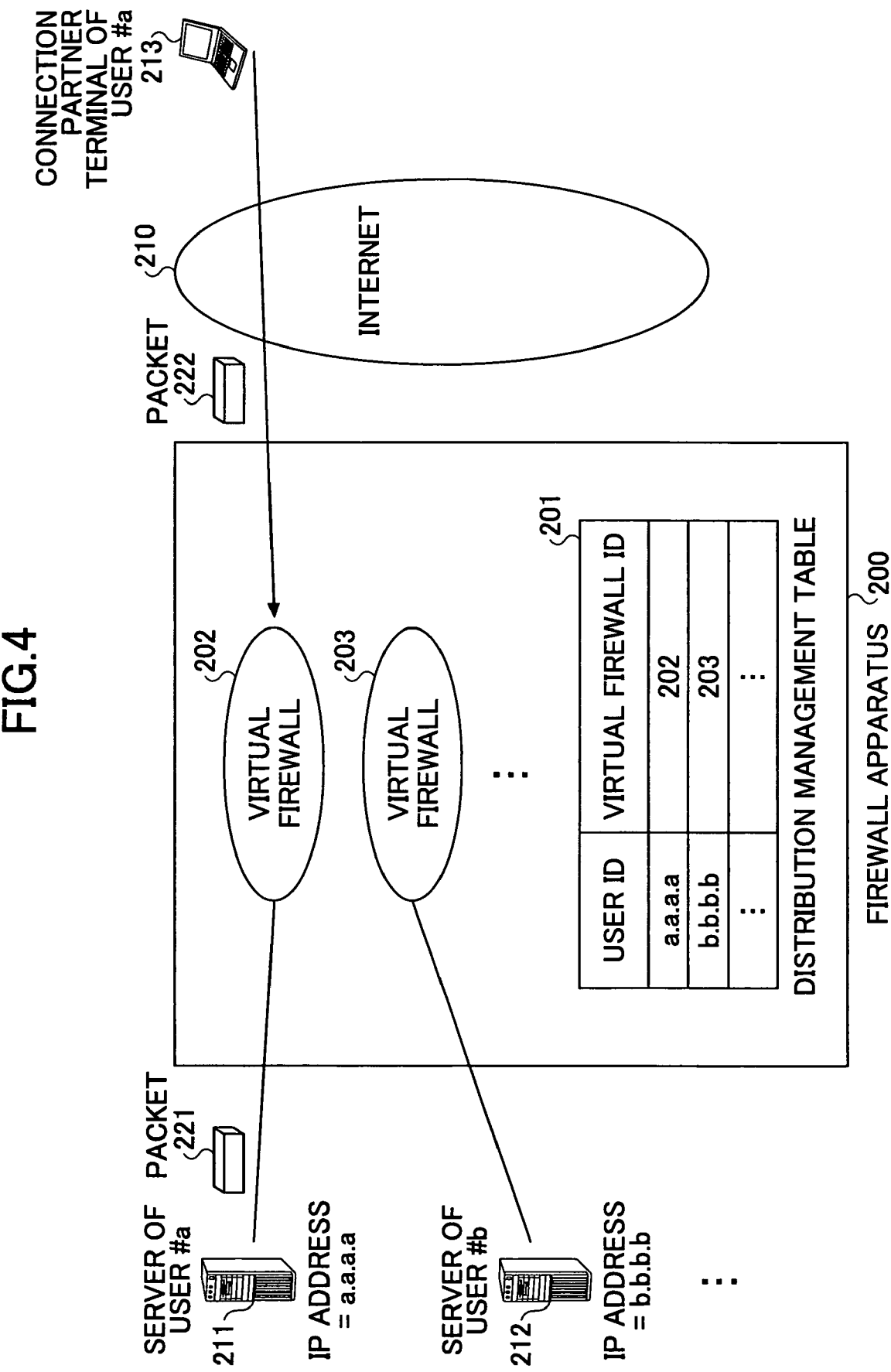
FIG. 4 is a diagram showing a virtual firewall establishing method according to a conventional technology.
Figure 5:
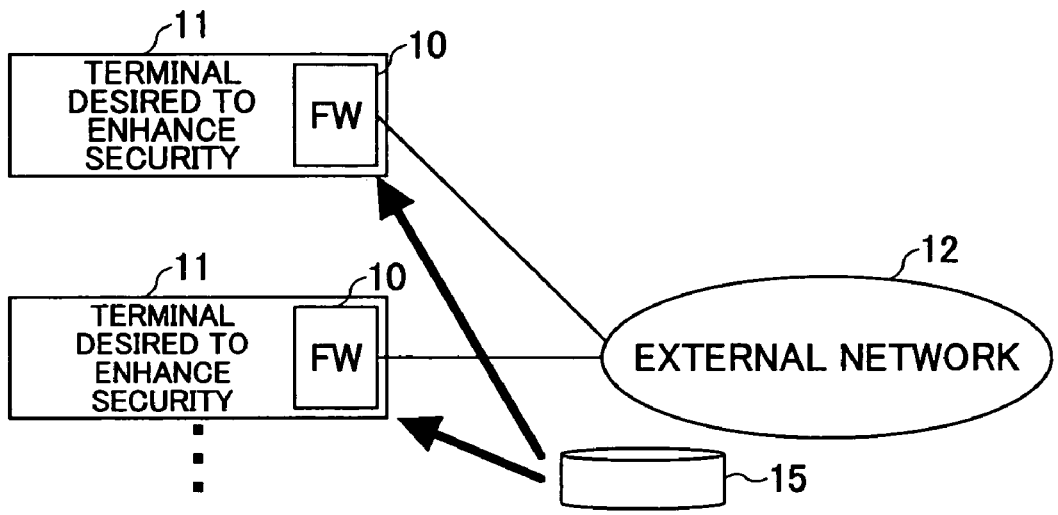
FIG. 5 is a diagram showing an example of a conventional firewall apparatus in which a security policy is provided in its outside.
Figure 6:
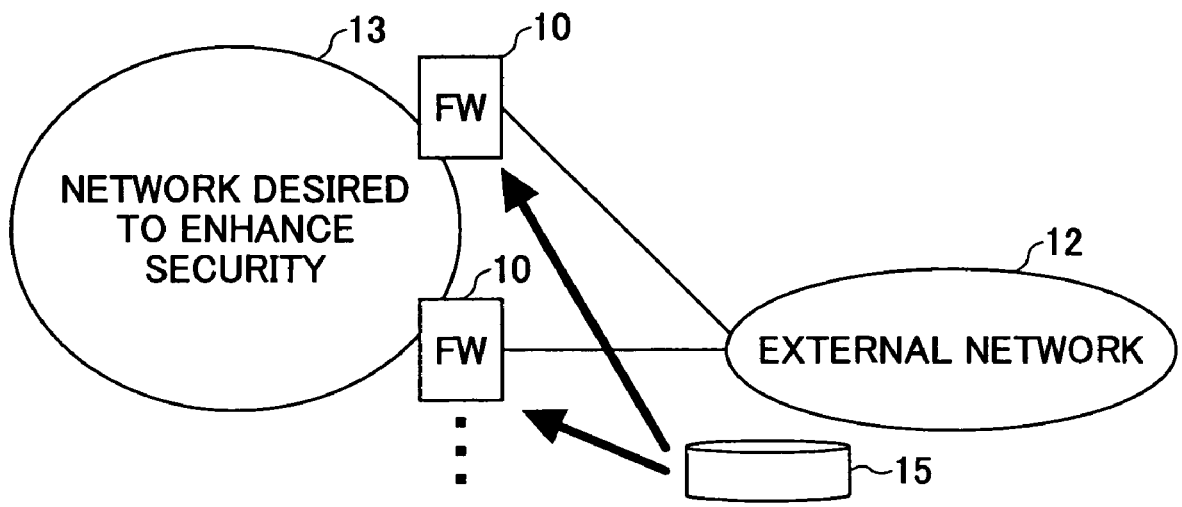
FIG. 6 is a diagram showing another example of a conventional firewall apparatus in which a security policy is provided in its outside.
Figure 7:
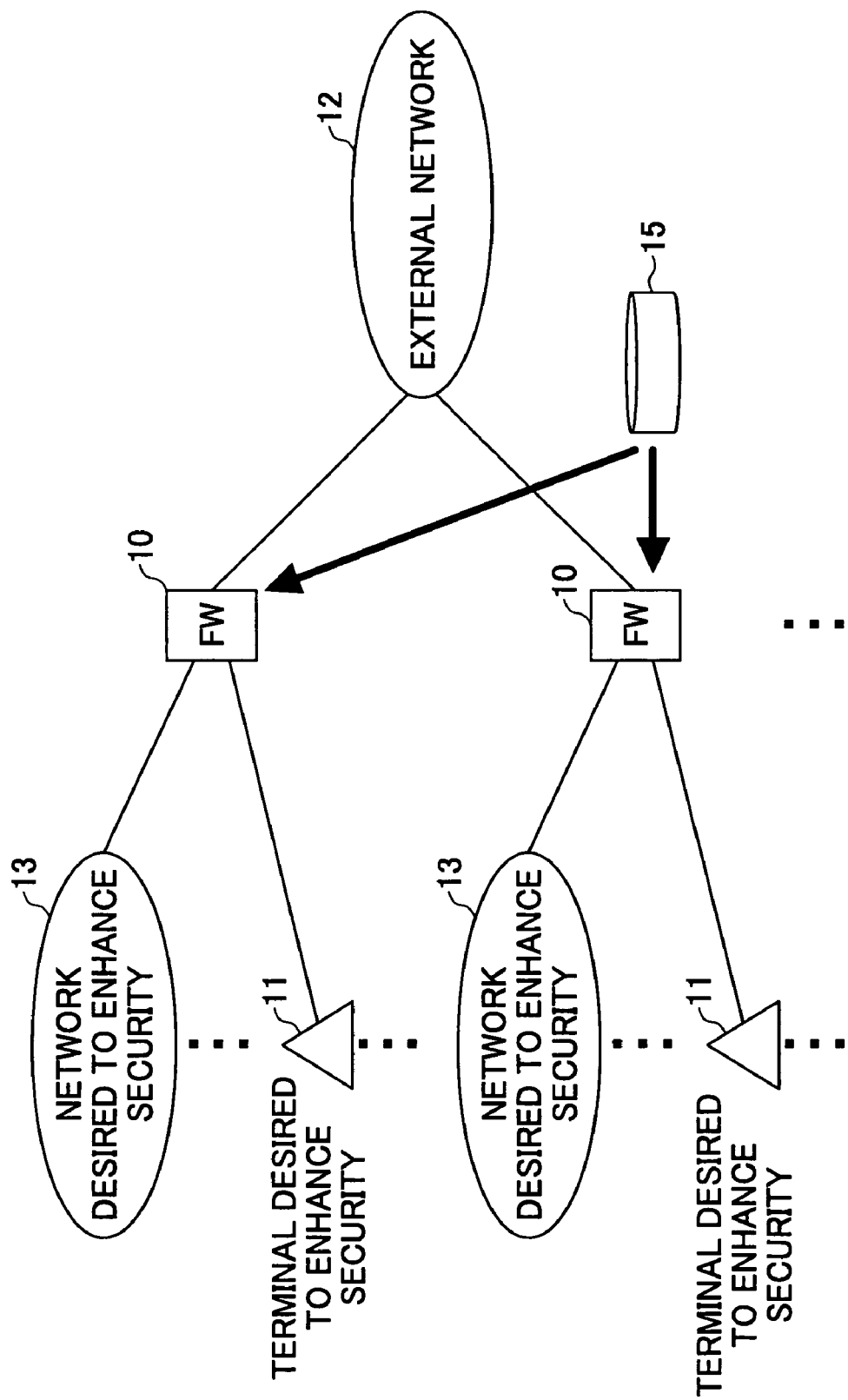
FIG. 7 is a diagram showing another example of a conventional firewall apparatus in which a security policy is provided in its outside.
Figure 8:
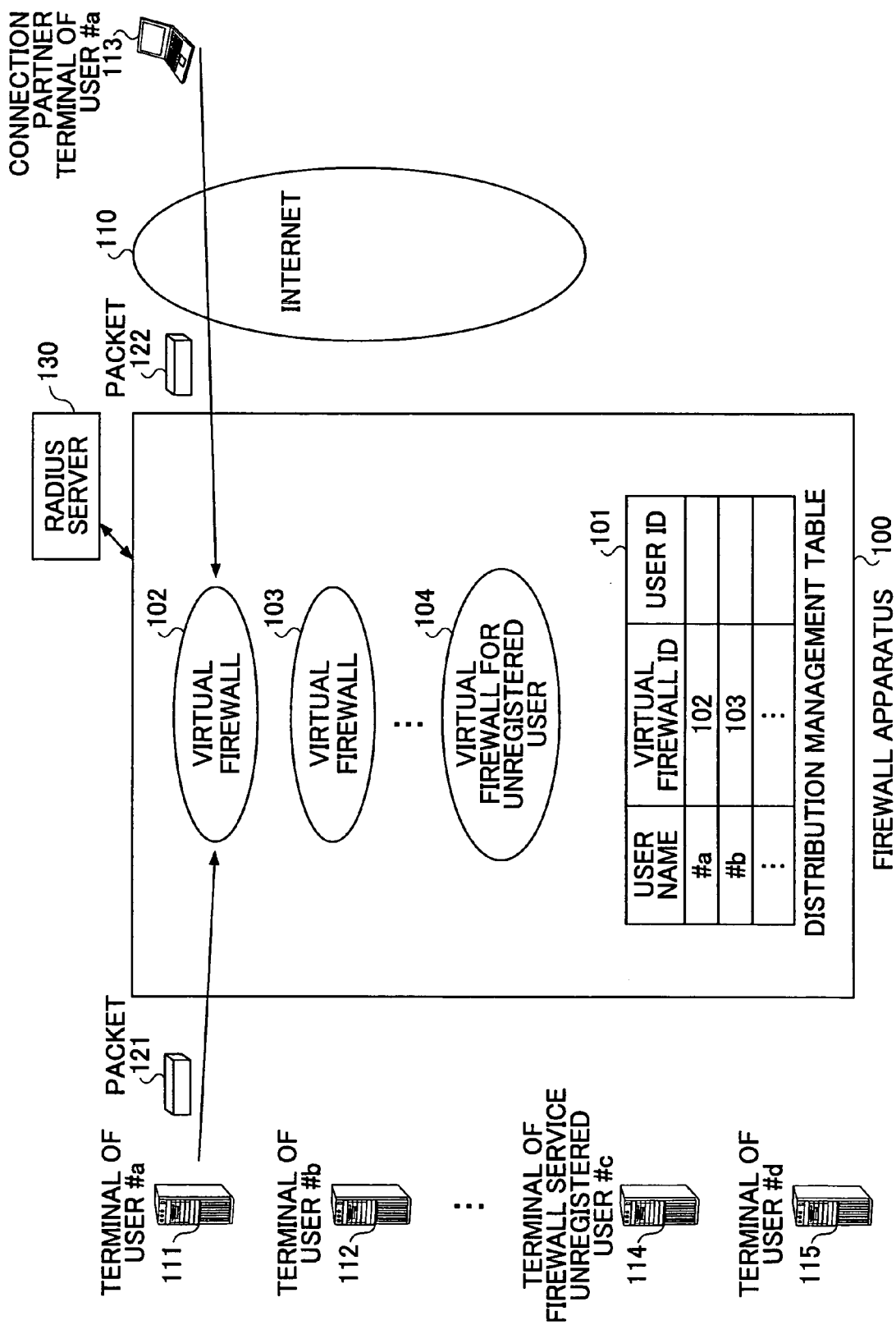
FIG. 8 is a diagram showing a configuration of a firewall apparatus in an embodiment 1-1 of the present invention.
Figure 9:
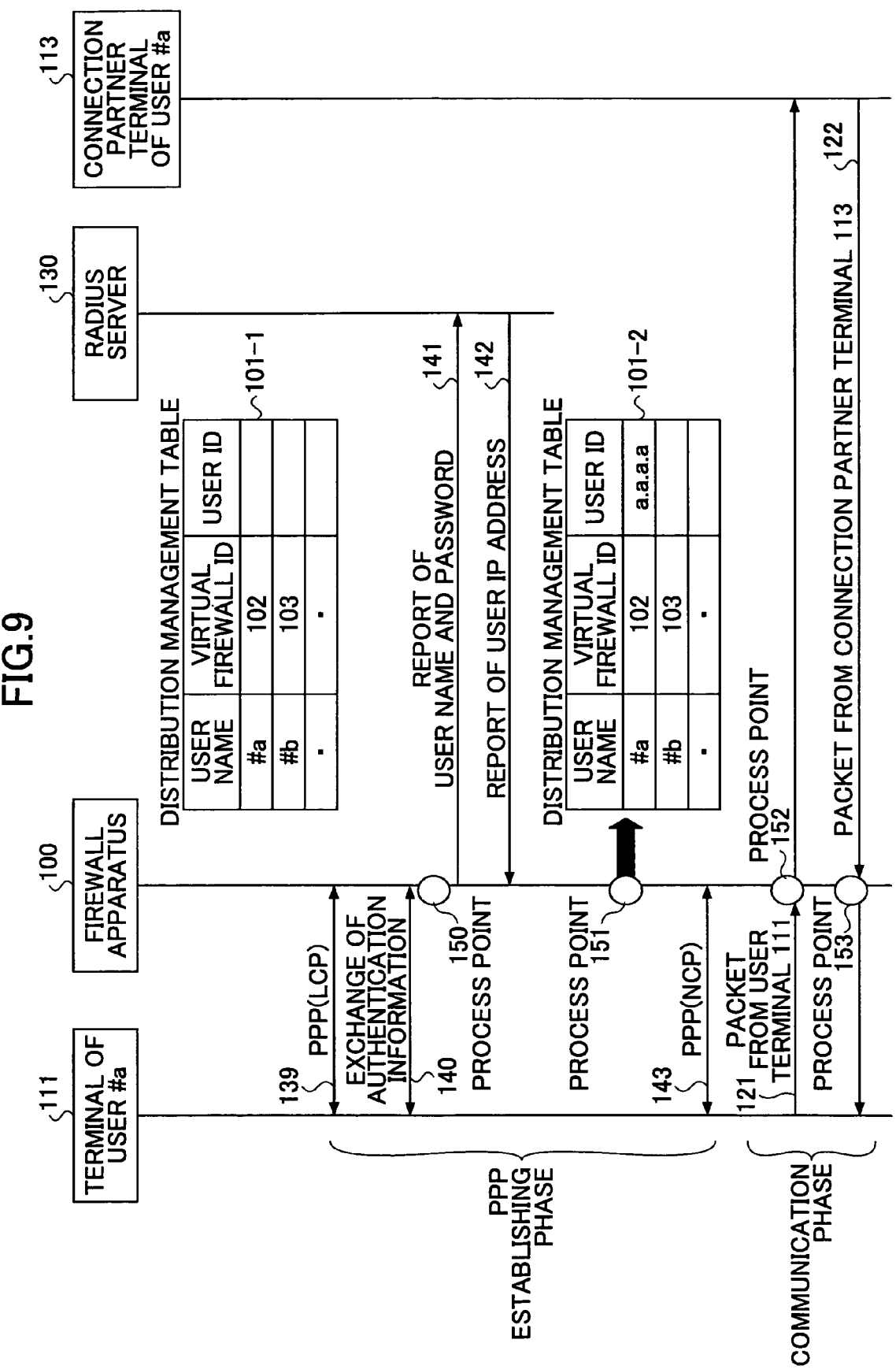
FIG. 9 is a sequence diagram showing operations of the firewall apparatus in the embodiment 1-1.

First, an embodiment 1-1 of the present invention is described with reference to FIGS. 8 and 9. In this embodiment, it is assumed that the method of connecting to the network from the user is PPP, and the authentication communication method is RADIUS.

The firewall apparatus 100 includes a virtual firewall for each user. For example, the firewall apparatus 100 includes a virtual firewall 102 to which a security policy of the user #a is applied for protecting a terminal 111 of the user #a, and a virtual firewall 103 to which a security policy of the user #b is applied for protecting a terminal 112 of the user #b.

In a distribution management table 101, user names and virtual firewall IDs that can be set beforehand are registered. That is, the distribution management table 101 registers associations between a user name #a and a virtual firewall ID 102, and a user name #b and a virtual firewall ID 103. However, since each user IP address that is a user ID for each user terminal has not been determined, it cannot be registered at this time (in a state of the distribution management table 101-1).

In this example, it is assumed that the terminal 111 of the user #a connects to the Internet 110, and, after that, the terminal 111 performs IP communications with a connection partner terminal 113. First, as a network connection request from the user terminal 111, information of LPC (Link Control Protocol) is exchanged between the user terminal 111 and the firewall apparatus 100 (139). After that, by exchanging authentication information (140), the firewall apparatus 100 extracts the user name #a sent from the user terminal 111 and holds the user name #a (process point 150).

Then, the authentication information (user name and password) are sent to the RADIUS server 130 (141). The authentication is performed by the RADIUS server 130, and the firewall apparatus 100 receives the response 142 so that the firewall apparatus 100 holds a user IP address, included in the response 142, to be supplied to the user terminal. Assume that the user IP address is [a.a.a.a]. Then, by using the user name #a as a search key, the firewall apparatus registers the user IP address [a.a.a.a] in a line including #a as the user name (process point 151, a state of the distribution management table 101-2).

At the same time, while information of NCP (Network Control Protocol) is exchanged between the user terminal 111 and the firewall apparatus 100 (143), the firewall apparatus 100 sends the user IP address [a.a.a.a] to the user terminal 111 so that the user terminal 111 recognizes that the own IP address is [a.a.a.a].

After completing NCP, a PPP connection is established between the user terminal and the network. After that, when the firewall apparatus 100 receives a packet 121 that is sent from the user terminal 111 to the connection partner terminal 113, the firewall apparatus 100 refers to the distribution management table 101 by using [a.a.a.a], as a search key, included in the packet as the source IP address so as to extract the virtual firewall ID=102 and distribute the packet 121 to the virtual firewall 102 (process point 152). Accordingly, a pass or discard process is applied to the packet 121 according to a filtering rule according to the security policy determined by the user #a.

In addition, when the firewall apparatus 100 receives a packet 122 that is sent from the connection partner terminal 113 to the user terminal 111, the firewall apparatus 100 refers to the distribution management table 101 by using [a.a.a.a], as a search key, included in the packet as the destination IP address so as to extract the virtual firewall ID=102 included in the line of [a.a.a.a], and distributes the packet 122 to the virtual firewall 102 (process point 153). Accordingly, the pass or discard process is applied to the packet 122 according to a filtering rule according to the security policy determined by the user #a.

A similar procedure is applied to a case where the terminal 112 of the user #b connects to the Internet 110 and the terminal 112 performs IP communications with a connection partner terminal 113. That is, the packet sent and received by the terminal 112 is distributed to the virtual firewall 103, so that the pass or discard process is applied to the packet according to a filtering rule according to a security policy determined by the user #b.

Embodiment 1-2

Figure 10:
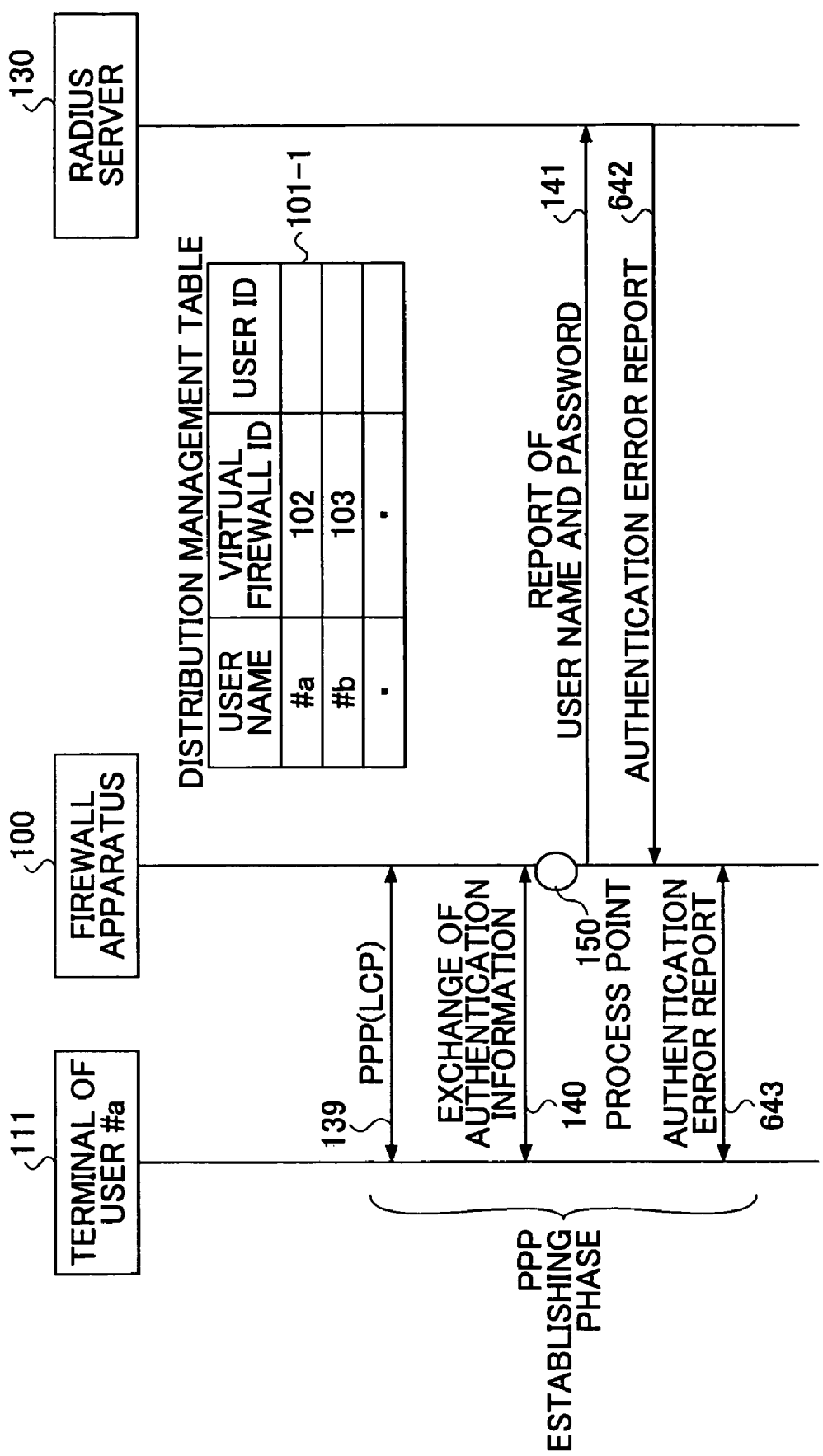
FIG. 10 is a sequence diagram showing operations of the firewall apparatus in the embodiment 1-2.

The embodiment 1-2 of the present invention is described with reference to FIG. 10. This embodiment shows a case where the combination of the user name and the password sent by the report 141 of the user name and the password in the embodiment 1-1 is not the same as the combination of the user name and the password registered in the RADIUS server 130 for the reason that the user name or the password sent from the user #a is not correct.

Since the process of the report 141 of the user name and the password from the LCP 139 is the same as that of the embodiment 1-1, the process is not described in this embodiment.

When an authentication error report 642 is sent from the RADIUS server 130 due to the above-mentioned reason, the firewall apparatus 100 sends an authentication error report 643 to the user terminal 111, and terminates the PPP establishment process. In this case, the firewall apparatus 100 does not perform any process for the distribution management table 101.

Embodiment 1-3

The embodiment 1-3 of the present invention is described with reference to FIGS. 8, 11 and 12. This embodiment shows a case where a terminal 114 of a firewall-service-unregistered user #c connects to the Internet 110, and, after that, the terminal 114 performs IP communications with a connection partner terminal 113. As to the firewall-service-unregistered user #c, the user name and the virtual firewall are not registered in the distribution management table 101-3. But the user #c receives a communication service to the Internet 110 via the terminal 114, and the user name and the password are registered in the RADIUS server 130.

Figure 12:
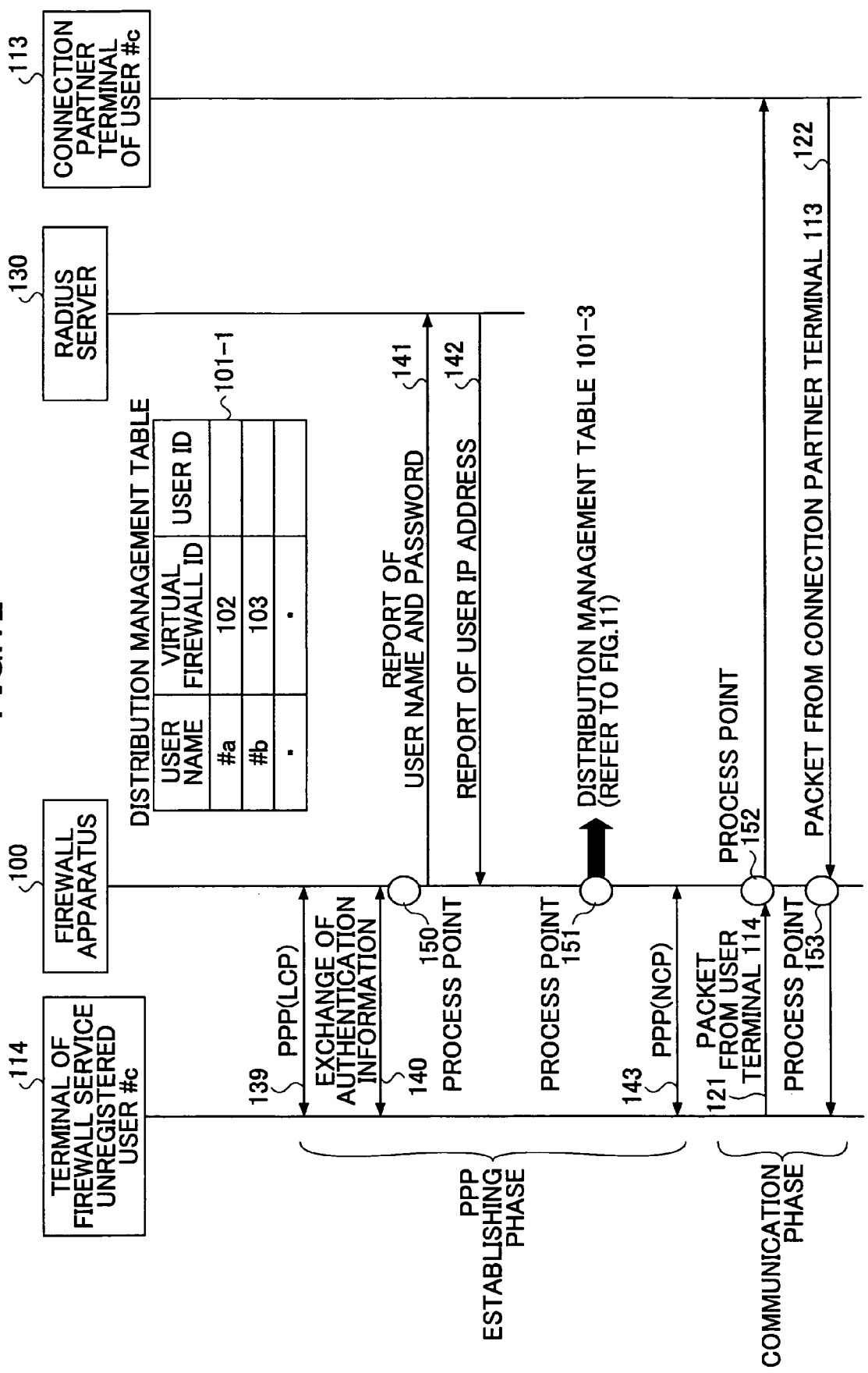
FIG. 12 is a sequence diagram showing operations of the firewall apparatus in the embodiment 1-3.

In FIG. 12, operations from the start to the report 142 of the use IP address are the same as those of the embodiment 1-1.

When the firewall apparatus 100 receives the report 142 of the user IP address, the firewall apparatus 100 holds a user IP address [c.c.c.c], included in the report 142 of the user IP address, to be provided to the user terminal. Then, the firewall apparatus 100 searches the distribution management table 101-3 for the user name #c. But, since the user name #c does not exist, the firewall apparatus 100 does not register the user IP address [c.c.c.c] in the distribution management table 101-3.

In addition, at the same time, while the firewall apparatus 100 exchanges information of NCP with the user terminal 114 in (143), the firewall apparatus 100 sends the user IP address [c.c.c.c] to the user terminal 114, and the user terminal 114 recognizes that the own user IP address is [c.c.c.c].

After completing NCP, a PPP connection is established between the user terminal and the network. After that, the firewall apparatus 100 receives a packet 121 that is sent from the user terminal 114 to the connection partner terminal 113, and the firewall apparatus 100 refers to the distribution management table 101 by using [c.c.c.c], as a search key, included in the packet 121 as a source IP address, so that it is determined that the source IP address is not registered.

When the source IP address is not registered, since a virtual firewall to which the packet is to be distributed is written as a virtual firewall 104 in a last line in the distribution management table 101-3 as shown in FIG. 11, the packet 121 is distributed to the virtual firewall 104 for the unregistered user (process point 152).

In the same way, also as for a packet 122 sent from the communication partner terminal 113, when the firewall apparatus 100 refers to the distribution management table 101 by using the destination user IP address [c.c.c.c] as a search key, it is determined that the destination IP address is not registered, so that the packet 122 is distributed to the virtual firewall 104 for the unregistered user (process point 153).

The virtual firewall 104 for the unregistered user does not include a filtering rule to unconditionally pass all packets, or includes a filtering rule common for all unregistered users.

Embodiment 1-4

The embodiment 1-4 of the present invention is described with reference to FIGS. 8, 13 and 14. This embodiment shows a case where the terminal 114 of the firewall-service-unregistered user #c connects to the Internet 110, and, after that, the terminal 114 performs IP communications with the connection partner terminal 113 in the same way as the embodiment 1-3. As to the firewall-service-unregistered user #c, the user name and the virtual firewall are not registered in the distribution management table 101-4. But, the user #c receives a communication service to the Internet 110 via the terminal 114, and the user name and the password are registered in the RADIUS server 130.

Figure 14:
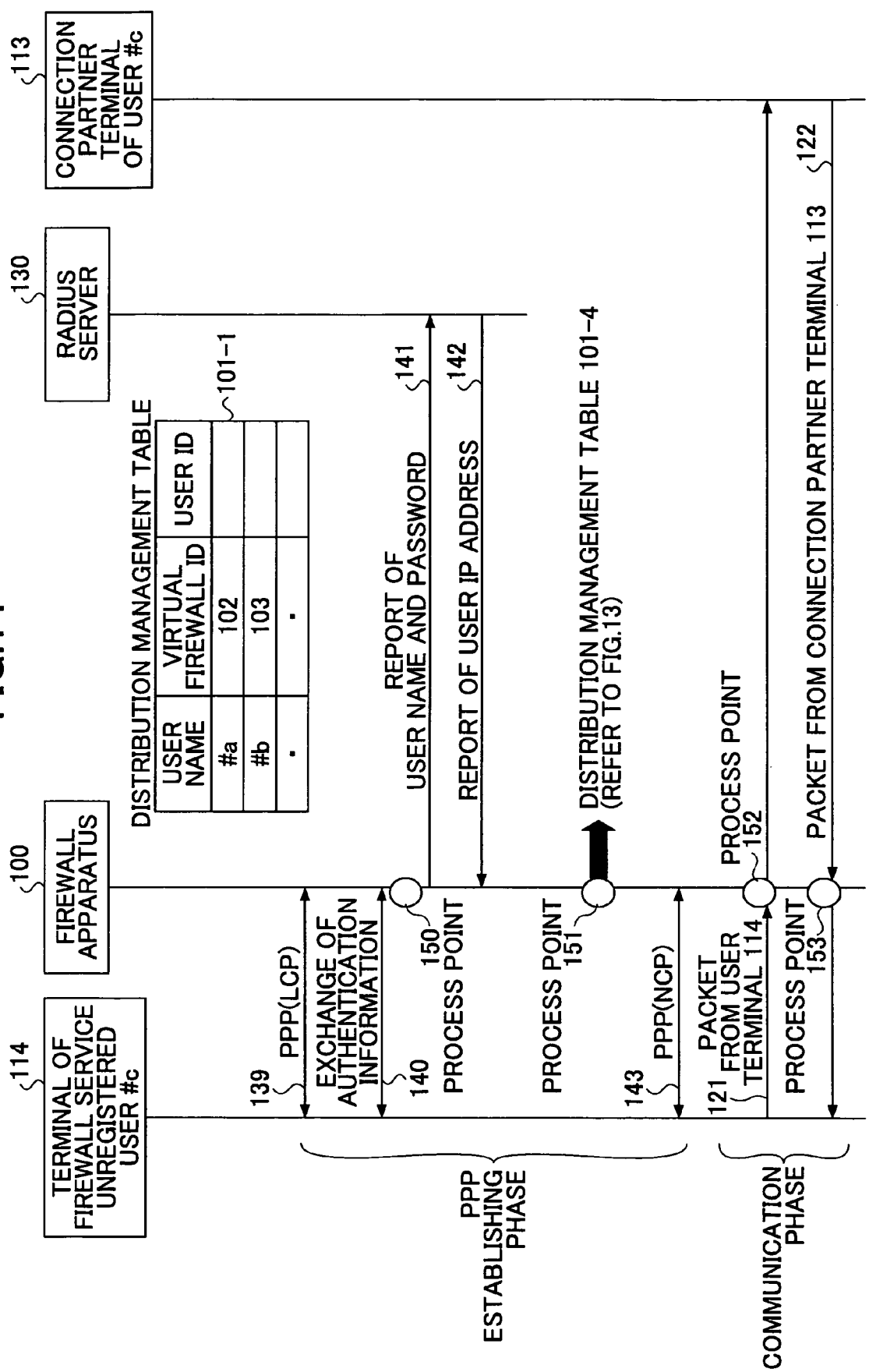
FIG. 14 is a sequence diagram showing operations of the firewall apparatus in the embodiment 1-4.

In FIG. 14, operations from the start to the notification 142 of the use IP address are the same as those of the embodiment 1-1.

When the firewall apparatus 100 receives the report 142 of the user IP address, the firewall apparatus 100 holds the user IP address [c.c.c.c], included in the report 142 of the user IP address, to be provided to the user terminal. Then, the firewall apparatus 100 searches the distribution management table 101-4 for the user name #c. But, the user name #c does not exist. In this case, the firewall apparatus 100 registers the user IP address [c.c.c.c] and ID=104 of the virtual firewall 104 for unregistered users in the distribution management table 101-4.

In addition, at the same time, while the firewall apparatus 100 exchanges information of NCP with the user terminal 114 in (143), the firewall apparatus 100 sends the user IP address [c.c.c.c] to the user terminal 114, and the user terminal 114 recognizes that the own user IP address is [c.c.c.c].

After completing NCP, a PPP connection is established between the user terminal and the network. After that, the firewall apparatus 100 receives a packet 121 that is sent from the user terminal 114 to the connection partner terminal 113, and the firewall apparatus 100 refers to the distribution management table 101 by using [c.c.c.c], as a search key, included in the packet 121 as a source IP address, so that the firewall apparatus 100 retrieves the virtual firewall ID=104 that is associated with the source IP address so as to distribute the packet 121 to the virtual firewall 104 (process point 152).

In the same way, also as for a packet 122 sent from the communication partner terminal 113, the firewall apparatus 100 refers to the distribution management table 101-4 by using [c.c.c.c] as a search key, included in the packet 121 as a destination IP address, so that the firewall apparatus 100 retrieves the virtual firewall ID=104 that is associated with the destination IP address so as to distribute the packet 121 to the virtual firewall 104 (process point 153).

In the same way as the embodiment 1-3, the virtual firewall 104 for the unregistered users does not include a filtering rule to unconditionally pass all packets, or includes a filtering rule common for all unregistered users.

In addition, when the source IP address is not registered, the packet is discarded as shown in the last line of the distribution management table 101-4 in FIG. 13. Accordingly, when a malicious user sends, in an IP Spoofing attack and the like, a large amount of packets having an IP address that is not assigned to any user, the firewall apparatus 100 can discard the packets.

Embodiment 1-5

The embodiment 1-5 of the present invention is described with reference to FIGS. 8, 15 and 16. This embodiment shows a case where a terminal 115 of a firewall-service-unregistered user #d connects to the Internet 110, and, after that, the terminal 115 performs IP communications with a connection partner terminal 113. The user #d is a user who should be registered in the firewall service. But, in this case, the user name #d is not correctly registered in the distribution management table 101-5 for the reason that the manager of the firewall apparatus 100 forgot about registering the user name #d in the distribution management table 101-5 or erroneously registered the user name. However, the user name #d and the password are correctly registered in the RADIUS server 130.

Figure 15:
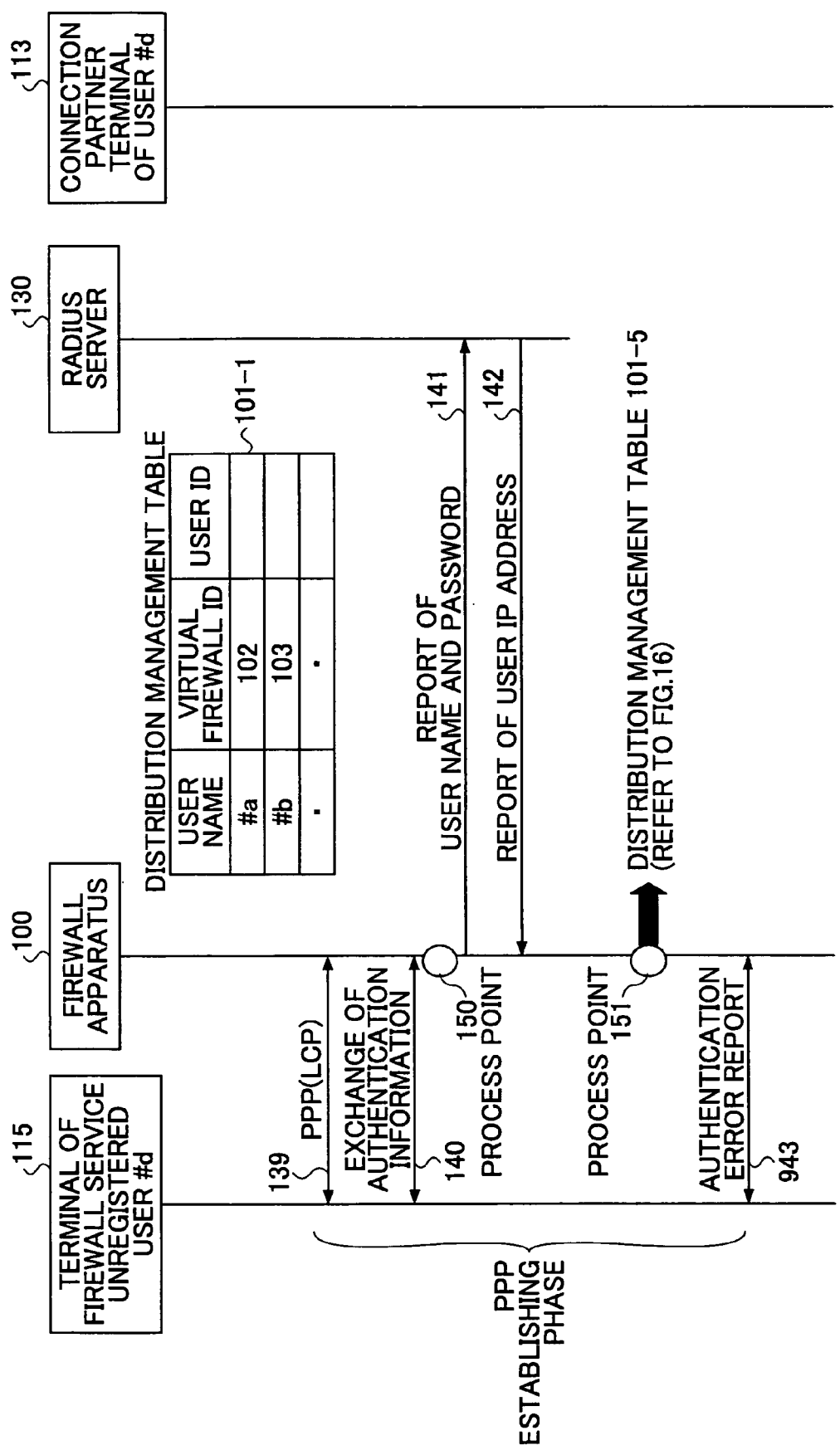
FIG. 15 is a sequence diagram showing operations of the firewall apparatus in the embodiment 1-5.

In FIG. 15, operations from the start to the report 142 of the user IP address are the same as those of the embodiment 1-1, and the description is not presented here.

When the firewall apparatus 100 receives the report 142 of the user IP address, the firewall apparatus 100 holds the user IP address [d.d.d.d], included in the report 142 of the user IP address, to be provided to the user terminal. Then, the firewall apparatus 100 searches the distribution management table 101-5 for the user name #d. The user name #d does not exist. When the user name does not exist, the firewall apparatus sends an authentication error report 943 to the user terminal 115, and ends the PPP establishment process.

Effects of the embodiments 1-1~1-5

The firewall apparatus in the embodiment 1-1 includes means for dynamically registering the user IP address in the distribution management table for a case where a user IP address is assigned for the first time when the connection between the user terminal and the network is established and the value of the user IP address is variable like the constant connection service. In addition, the firewall apparatus supporting dynamic user identifier of the present invention includes virtual firewalls for each user.

Accordingly, in a communication environment in which associating the user IP address with the virtual firewall ID cannot be performed beforehand, authentication information from the user terminal for network connection can be used so that the user IP address is dynamically associated with the virtual firewall ID so as to apply a filtering rule complying with security policy that the user defines to packets that the user terminal transmits or receives. In addition, savings due to integration of accommodating users and reduction of user workload due to outsourcing become possible.

As to the firewall apparatus of the embodiment 1-2, when the user name or the password sent from the user includes an error and an authentication error report from the RADIUS server is sent, the authentication error report is transmitted to the user terminal without any processing on the distribution management table. Accordingly, distribution management table search and registration processes are prevented when network connection is refused, so that a surplus of processing ability can be used for other processes.

The firewall apparatuses of the embodiment 1-3 and the embodiment 1-4 can accommodate a user terminal of a user who does not use the firewall service, so that inconvenience for changing physical connections can be eliminated which inconvenience occurs each time when each user who does not use the firewall service uses a service.

In addition, as to the means in the embodiment 1-3, the unregistered user is not registered in the distribution management table, so that transmit/receive packet of the unregistered user is automatically distributed to the virtual firewall for unregistered users. Thus, the number of entries registered in the distribution management table can be limited to registered users who are currently establishing a network connection, so that search time can be decreased.

On the other hand, as to the means of the embodiment 1-4, the unregistered user is registered in the distribution management table, and the transmission/receive packet of the unregistered user is distributed to a virtual firewall for unregistered users. In addition, when a user is not registered in the distribution management table, the packet of the user is discarded. Thus, when a malicious user transmits large amount of packets having an IP address that is not assigned to any user for the purpose of IP Spoofing attack and the like, the firewall apparatus can discard these packets.

As mentioned above, each means of the embodiment 1-3 and the embodiment 1-4 can be used differently according to usage.

As to the firewall apparatus of the embodiment 1-5, when a manager of the firewall apparatus forgets about registering the user name in the distribution management table or erroneously registers the user name, communication that should not be established can be forced to terminate from the viewpoint of security.

Embodiment 2-1~Embodiment 2-7

Next, the embodiment 2-1~the embodiment 2-7 are described.

According to the operation shown in the embodiment 1-1 and the like, in a communication environment in which associating the user IP address with the virtual firewall ID cannot be performed beforehand, authentication information for network connection from the user terminal can be used so that the user IP address is dynamically associated with the virtual firewall ID so as to apply a filtering rule complying with security policy that the user defines to packets that the user terminal transmits or receives.

However, in the case of the constant connection service, the number of accommodated users is much larger than the number of users in a data center.

In the case of the data center, an estimated number of accommodated users is several hundreds to several thousands. On the other hand, in the case of the constant connection service, the number of accommodated users is several tens of thousands to several hundreds of thousands.

Currently, many of implemented reliable virtual firewall apparatuses introduced in a service have been developed for the data center, so that the number of users that can be actually accommodated is several hundreds to several thousands as mentioned above.

Although the number of the accommodated users is different for developing the virtual firewall apparatus for the constant connection service, diverting development and adding development based on the virtual firewall apparatus for the data center is very effective from the viewpoint of efficiency of development and utilization of existing technology.

Therefore, the problem of providing the virtual firewall apparatus for the constant connection service is increasing the multiple number of users.

In addition, the number of multiple users is large in the constant connection service, the number of sum of filtering rules increases in proportion to the number of multiple users for keeping serviceability for providing independent security policy for each user.

However, in actuality, there are many filtering rules commonly used for users so that the rules overlap in view of the firewall apparatus as a whole, which is inefficient. As a result, it leads to an increase in the amount of filtering tables.

As mentioned above, for developing the virtual firewall apparatus for the constant connection service, increase of the number of multiple users and efficiency of the filtering tables are problems to be solved.

In embodiments 2-1~2-7, a firewall apparatus that increases the multiple number of users and that increases efficiency of the filtering tables is described.

Embodiment 2-1

Figure 17:
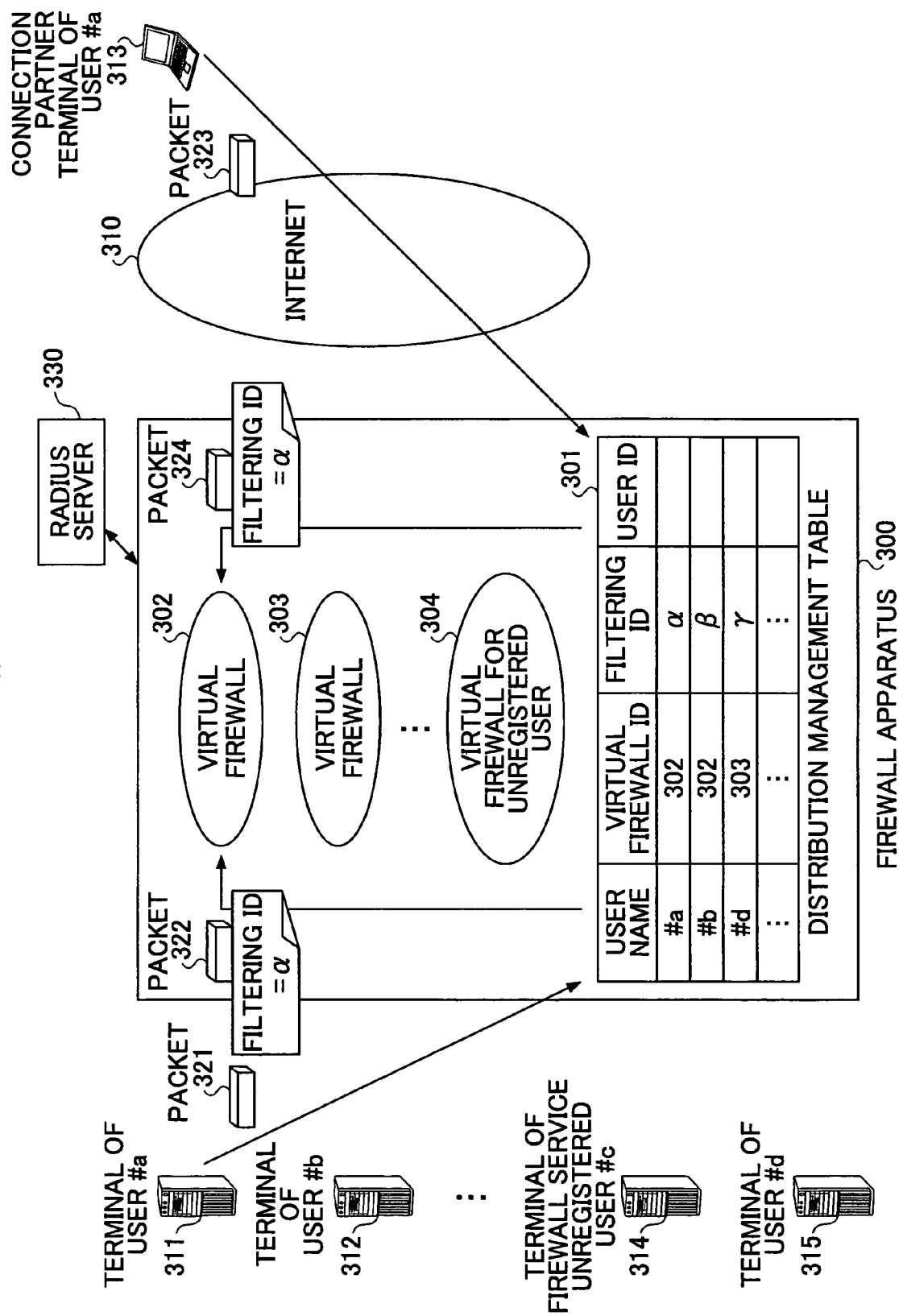
FIG. 17 is a block diagram showing an outline configuration of a firewall apparatus in an embodiment 2-1 of the present invention.
Figure 18:
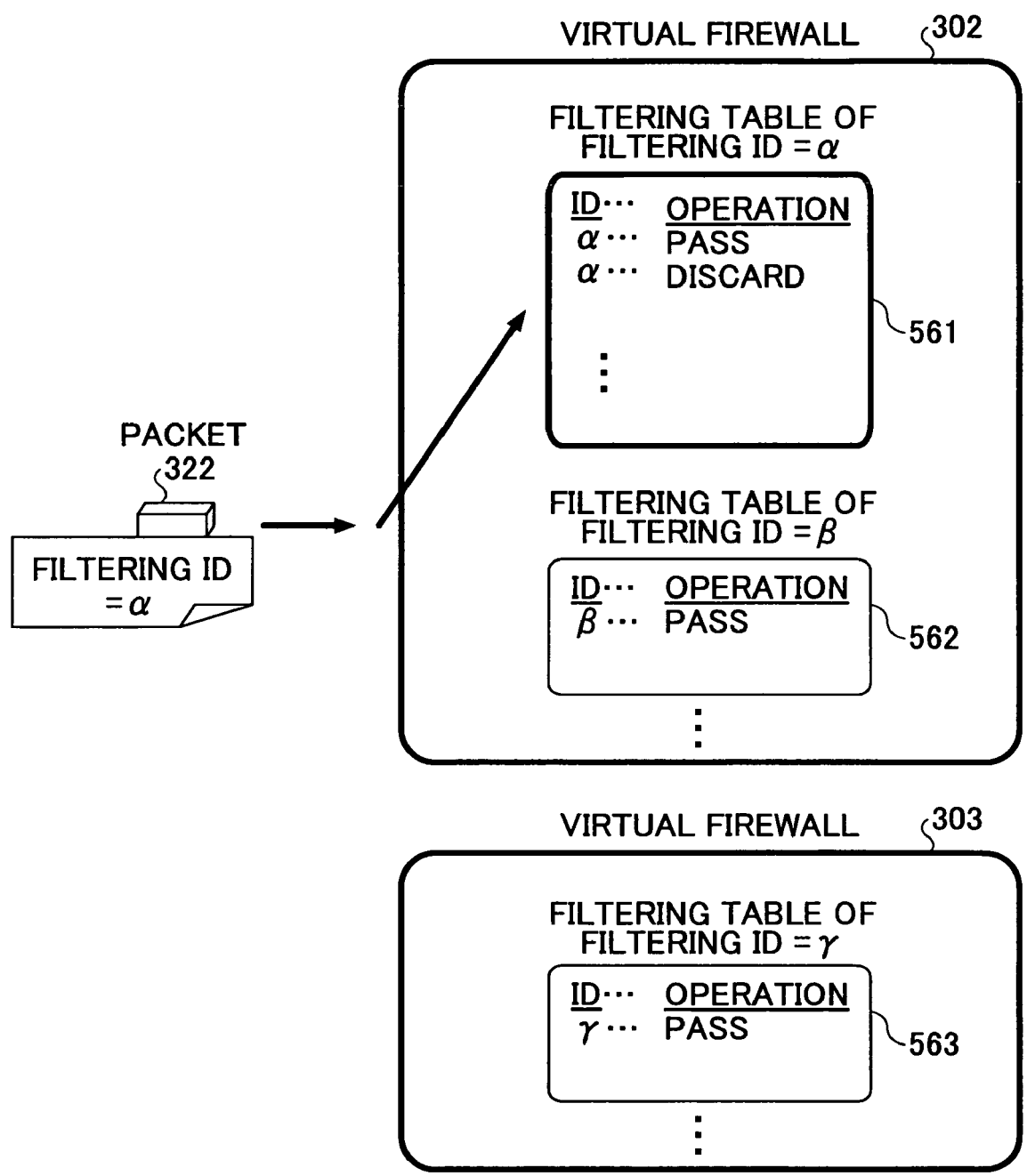
FIG. 18 is a diagram showing a configuration of a filtering table in a virtual firewall in the firewall apparatus in the embodiment 2-1.

FIG. 17 is a block diagram showing an outline configuration of a firewall apparatus of the embodiment 2-1 of the present invention. FIG. 18 is a diagram showing a configuration of a filtering table in the virtual firewall in the present embodiment.

In this embodiment, it is assumed that the method for network connection from the user is PPP (Point to point Protocol), and communication for authentication is RADIUS.

The firewall apparatus 300 includes plural virtual firewalls (302, 303, . . . , 304).

Further, as shown in FIG. 18, each firewall (302, 303) includes plural filtering tables (561, 562, 563) each being identified by a corresponding filtering ID, and each filtering table (561, 562, 563) includes one or more filtering policies independent of each user.

In the present embodiment, security policies defined by the user #a and the user #b are stored in the virtual firewall 302, and a security policy defined by the user #d is stored in the virtual firewall 303.

Further, in the virtual firewall 302, the security policy of the user #a is written in the filtering table 561 whose filtering ID is α, the security policy of the user #b is written in the filtering table 562 whose filtering ID is β. In addition, the security policy of the user #d is written in the filtering table 563 whose filtering ID is γ in the virtual firewall 303.

The reason why the user #a and the user #b are accommodated in the same virtual firewall 302 is that, for example, common filtering policies for the user #a and the user #b are the same, or the virtual firewall is established for each Internet provider and the user #a and the user #b belong to the same Internet provider.

In the distribution management table 301, user names, virtual firewall IDs and filtering IDs that can be set beforehand are registered.

That is, in the distribution management table 301, correspondence among the user #a, the virtual firewall ID (302) and the filtering ID (α), correspondence among the user #b, the virtual firewall ID (302) and the filtering ID (β), and correspondence between the virtual firewall ID (303) and the filtering ID (γ) are registered.

Figure 19:
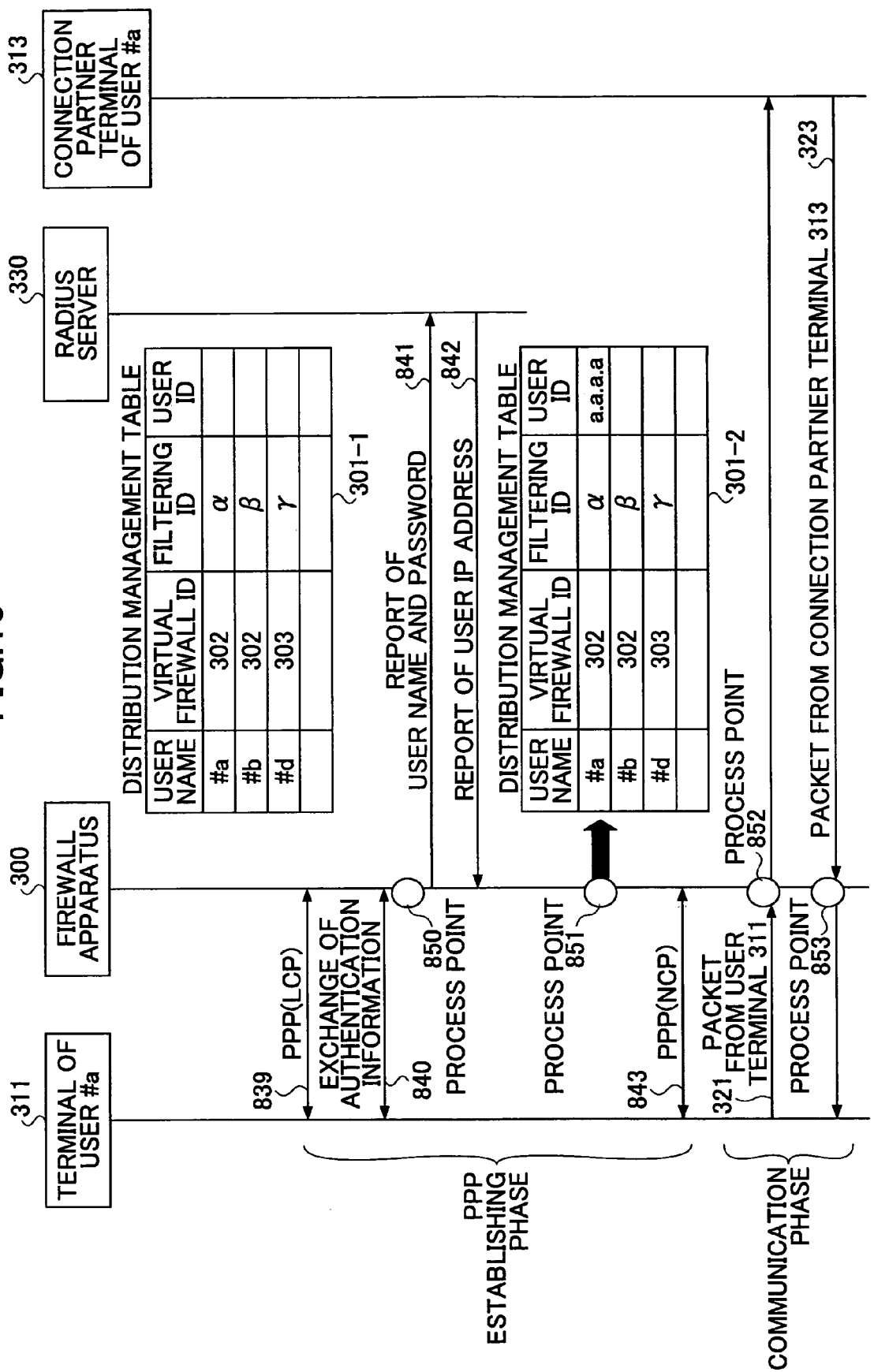
FIG. 19 is a sequence diagram showing operations of the firewall apparatus in the embodiment 2-1.

However, the user IP address that is a user ID of each user terminal is not decided so that it cannot be registered at this time (state of distribution management table 301-1 in FIG. 19).

Unless the user IP address is registered in the distribution management table 301, it cannot be performed to distribute packets from each user to a corresponding virtual firewall and to assign a filtering ID.

In the present embodiment, the terminal 311 of the user #a connects to the Internet 310, and after that, the terminal 311 performs IP communications with a connection partner terminal 313.

In the following, by using FIG. 19, the operation of the firewall apparatus of the present embodiment is described. FIG. 19 is a sequence diagram indicating operations of the firewall apparatus of the present embodiment.

First, as a network connection request from the user terminal 311, information of LCP is exchanged between the user terminal 311 and the firewall apparatus 300 (839 in FIG. 19).

Based on the exchange of authentication information that is performed after that (840 in FIG. 19), the firewall apparatus 300 extracts the user name #a sent from the user terminal 311 so as to hold the user name #a (process point 850 in FIG. 19).

Then, the authentication information (user name and password) is reported to the RADIUS server 330 (841 in FIG. 19).

The RADIUS server 330 performs authentication. When the firewall apparatus receives the response (842 in FIG. 19), the firewall apparatus 300 holds a user IP address to be assigned to the user terminal included in the response. It is assumed that the user IP address is [a a. a. a].

Then, by using the user name #a as a search key, the firewall apparatus 300 registers the user IP address [a. a. a. a] into a line that includes #a as a user name in the distribution management table (process point 851 in FIG. 19 state of distribution management table 301-2 in FIG. 19).

In addition, at the same time, the firewall apparatus 300 sends the user IP address [a. a. a. a] to the user terminal 311 so that the user terminal ascertains that the own user IP address is [a. a. a. a] while exchanging information of NCP (Network Control Protocol) between the user terminal 311 and the firewall apparatus 300.

After exchanging NCP, a PPP connection is established between the user terminal 311 and the Internet 320.

After that, when the firewall apparatus 300 receives a packet 321 sent from the user terminal 311 to the connection partner terminal 313, the firewall apparatus 300 searches the distribution management table (301-2 in FIG. 19) by using, as a search key, [a. a. a. a] included in the packet as the source IP address so as to extract a virtual firewall ID (ID=302) and a filtering ID (ID=α), distribute the packet 321 to the virtual firewall 302 and assign the filtering ID α to the packet 321 (process point 852 in FIG. 19).

As shown in FIG. 18, a "pass" or "discard" process is applied to the packet 322 to which the filtering ID has been assigned according to a filtering rule complying with the security policy of the user #a included in the filtering table 561 having filtering ID α.

In addition, when the firewall apparatus 300 receives a packet 323 sent from the communication partner terminal 313 to the user terminal 311, the firewall apparatus 300 searches the distribution management table (301-2 in FIG. 19) by using, as a search key, [a. a. a. a] included in the packet as the destination IP address so as to extract the virtual firewall ID (ID=302) and the filtering ID (ID=a) included in a line of [a. a. a. a] and assign filtering ID a to the packet 323 (process point 853 in FIG. 19).

In the virtual firewall 302 to which the packet 324, to which the filtering ID is assigned, is distributed, the passing or discarding process is applied to the packet 324 according to a filtering rule complying with a security policy of the user #a written in the filtering table 561 corresponding to the filtering ID α.

Also in a case where the terminal 312 of the user #b connects to the Internet 310 via a network, and after that, performs IP communications with the connection partner terminal 313, a similar procedure is applied. That is, a packet sent/received by the terminal 312 is distributed to the virtual firewall 302; after that, the passing or discarding process is applied to the packet according to a filtering rule complying with a security policy of the user #b in the filtering table 562.

As described above, in this embodiment, by introducing the filtering ID (α, β, γ), plural independent filtering policies can be managed by each virtual firewall (302, 303, 304) so that the number of multiple users can be increased.

In addition, as to a search region for a packet for each user, only a table having the same filtering ID assigned to the packet is searched, so it can be avoided that search process time becomes unnecessarily long.

Embodiment 2-2

The firewall apparatus of the embodiment 2-2 of the present invention is different from the firewall apparatus in the before-mentioned embodiment 2-1 in that the firewall apparatus of the embodiment 2-2 does not include the virtual firewall.

In the following, as for the firewall apparatus of this embodiment, features different from the firewall apparatus of the embodiment 2-1 are mainly described.

Also in this embodiment, it is assumed that the network connection method from the user is PPP and authentication communication is RADIUS.

Figure 20:
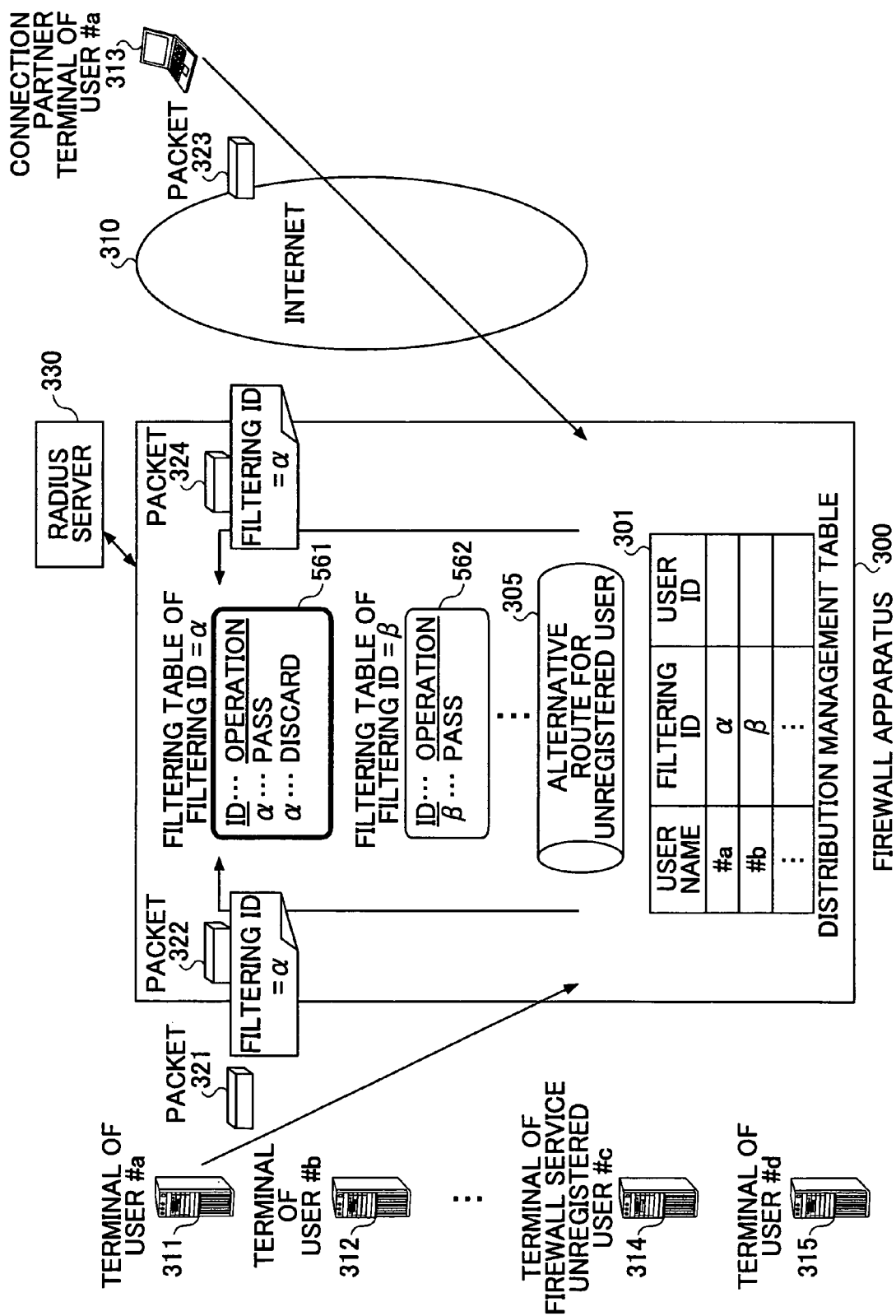
FIG. 20 is a block diagram showing an outline configuration of a firewall apparatus in an embodiment 2-2 of the present invention.

FIG. 20 is a block diagram showing an outline configuration of the firewall apparatus of the embodiment 2-2 of the present invention.

As shown in FIG. 20, the firewall apparatus 300 of this embodiment includes plural filtering tables (561, 562) each being identified by a corresponding filtering ID, and each filtering table includes an independent filtering policy for each user.

In this embodiment, a security policy of the user #a is written in the filtering table 561 to which α is assigned as the filtering ID, and a security policy of the user #b is written in the filtering table 562 to which β is assigned as the filtering ID.

In the distribution management table 301, user names and filtering IDs that can be set beforehand are registered.

That is, in the distribution management table 301, correspondence between the user name #a, and the filtering ID (α), and correspondence between the user name #b and the filtering ID (β) are registered.

Figure 21:
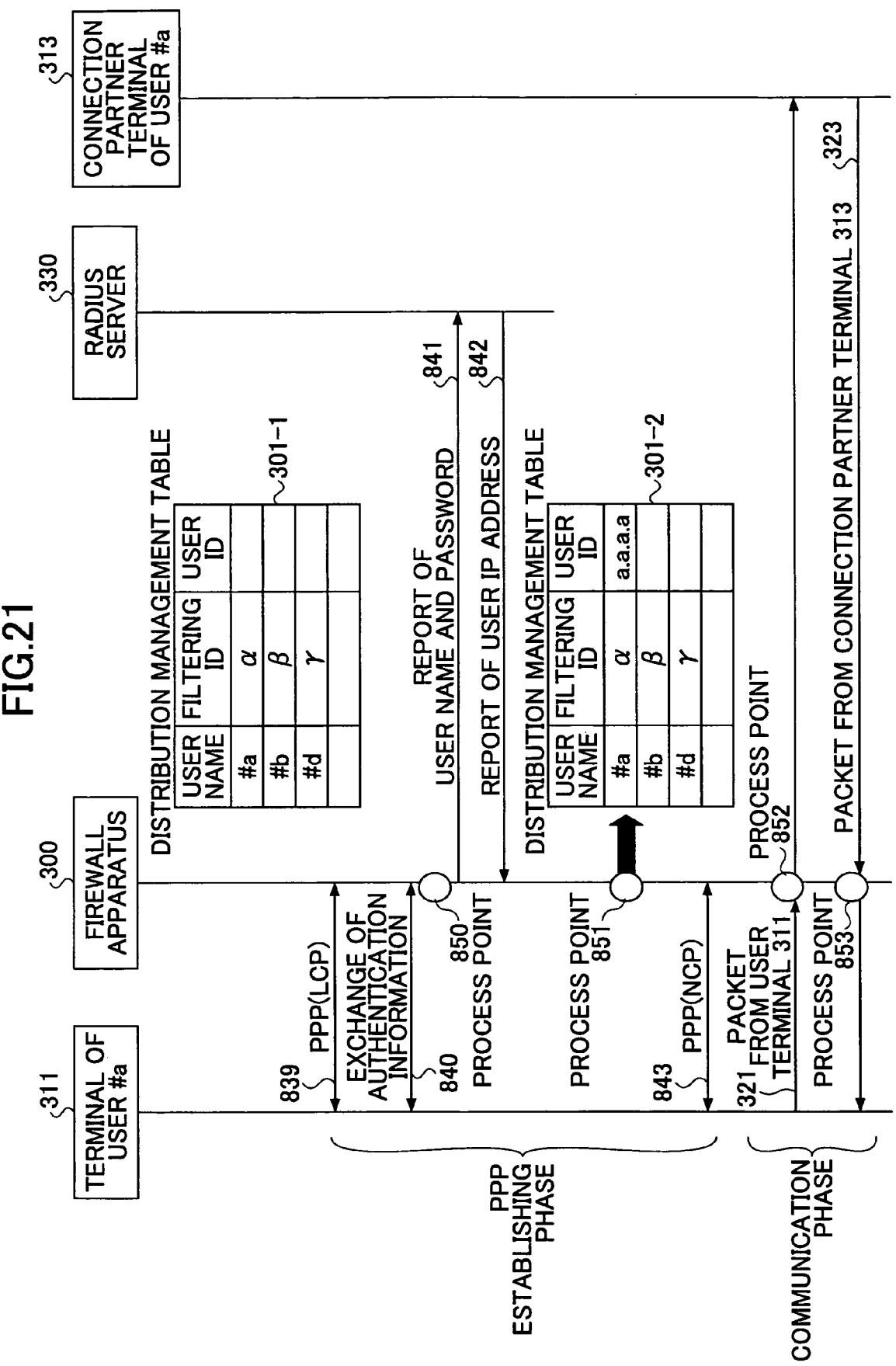
FIG. 21 is a sequence diagram showing operations of the firewall apparatus in the embodiment 2-2.

However, the user IP address that becomes a user ID of each user terminal is not decided so that it cannot be registered at this time (state of distribution management table 301-1 in FIG. 21).

Unless the user IP address is registered in the distribution management table 301, it cannot be performed to assign a filtering ID to a packet from each user.

In the present embodiment, it is assumed that the terminal 311 of the user #a connects to the Internet 310 via a network, and after that, the terminal 311 performs IP communications with a connection partner terminal 313.

In the following, by using FIG. 21, the operations of the firewall apparatus of the present embodiment are described. FIG. 21 is a sequence diagram indicating operations of the firewall apparatus of the present embodiment.

Operations from exchange (839 in FIG. 21) of information of LCP between the user terminal 311 and the firewall apparatus 300 to exchange (843 in FIG. 21) of information of NCP between the user terminal 311 and the firewall apparatus 300 are the same as those in the embodiment 2-1. Thus, the description for the operations are not provided.

After NCP ends, PPP connection is established between the user terminal 311 and the Internet 320. After that, when the firewall apparatus 300 receives a packet 321 sent from the user terminal 311 to the connection partner terminal 313, the firewall apparatus 300 searches the distribution management table (301-2 in FIG. 21) by using, as a search key, [a. a. a. a] included in the packet as a source IP address so as to extract a filtering ID (ID=α), and assign the filtering ID α to the packet 321 (process point 852 in FIG. 21).

A passing or discarding process is applied to the packet 323 to which the filtering ID has been assigned according to a filtering rule complying with the security policy of the user #a included in the filtering table 561 having filtering ID α.

In addition, when the firewall apparatus 300 receives the packet 323 sent from the communication partner terminal 313 to the user terminal 311, the firewall apparatus 300 searches the distribution management table (301-2 in FIG. 21) by using, as a search key, [a. a. a. a] included in the packet as the destination IP address so as to extract the filtering ID (ID=α) included in a line of [a. a. a. a] and assign filtering ID α to the packet 323 (process point 853 in FIG. 21).

The passing or discarding process is applied to the packet 324 to which the filtering ID has been assigned according to a filtering rule complying with a security policy of the user #a written in the filtering table 561 corresponding to the filtering ID α.

Also in a case where the terminal 312 of the user #b connects to the Internet 310 via a network, and after that, performs IP communications with the connection partner terminal 313, a similar procedure is applied. That is, the passing or discarding process is applied to the packet sent/received by the terminal 312, according to a filtering rule complying with a security policy of the user #b in the filtering table 562.

Embodiment 2-3

The firewall apparatus of the embodiment 2-3 of the present invention is different from the firewall apparatus in the above-mentioned embodiment 2-1 in that the filtering ID is classified into two types: individual filtering ID and common filtering ID.

In the following, as for the firewall apparatus of this embodiment, features different from the firewall apparatus of the embodiment 2-1 are mainly described.

An outline configuration of the firewall apparatus of this embodiment 2-3 is the same as that shown in FIG. 17. Also in this embodiment, it is assumed that the network connection method from the user is PPP and authentication communication is RADIUS.

In the firewall apparatus of this embodiment, the filtering ID of the embodiment 2-1 is divided to an individual filtering ID and a common filtering ID, so that filtering policies specific for each user are included in corresponding individual filtering tables, and a filtering policy that can be commonly used for plural users is included in the common filtering table.

Therefore, in this embodiment, each of the distribution management table 301 in FIG. 17 and the distribution management table (301-1) in FIG. 19 is replaced by a distribution management table 601 shown in FIG. 22, and the distribution management table (301-2) shown in FIG. 19 is replaced by a distribution management table shown in FIG. 23.

Figure 24:
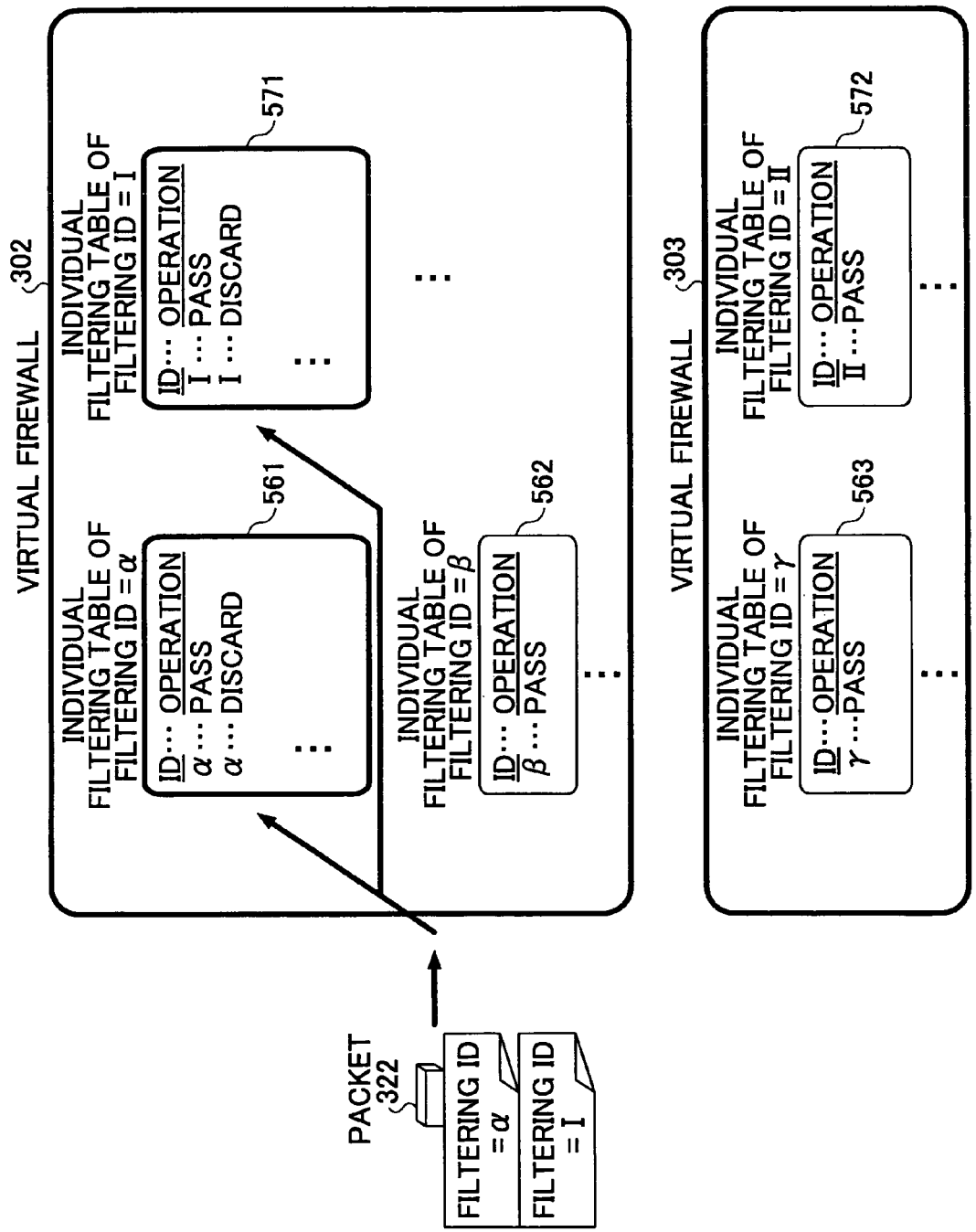
FIG. 24 is a diagram showing a configuration of a filtering table in a virtual firewall in the firewall apparatus in the embodiment 2-3.

FIG. 24 is a diagram showing a configuration of a filtering table in the virtual firewall in the firewall apparatus of this embodiment.

The firewall apparatus 300 of this embodiment includes plural virtual firewalls (302, 303, . . . , 304).

In addition, as shown in FIG. 24, each virtual firewall (302, 303) includes plural filtering tables (561, 562, 563) identified by corresponding individual filtering IDs and plural filtering tables (571, 572) identified by the common filtering ID.

Filtering policies specific for each user are written in corresponding individual filtering tables (561, 562, 563), and filtering policies commonly used plural users are written in the common filtering tables (571, 572).

Being associated with that, as shown in

FIG. 22, the distribution management table 601 manages user name, virtual firewall ID, individual filtering ID and common filtering ID.

In this embodiment, security policies defined by the user #a and the user #b are stored in the virtual firewall 302, security policies defined by the user #d are stored in the virtual firewall 303, and further, individual filtering policies of the user #a are written in the individual filtering table 561 to which α is assigned as the filtering ID in the virtual firewall 302, individual filtering policies of the user #b are written in the individual filtering table 562 to which β is assigned as the filtering ID in the virtual firewall 302, individual filtering policies of the user #d are written in the individual filtering table 563 to which γ is assigned as the filtering ID in the virtual firewall 303.

Filtering policies written in a common filtering table 571 to which "I" is assigned as the filtering ID are also applied to the user #a and the user #b.

In the same way, filtering policies written in a common filtering table 572 to which "II" is assigned as the filtering ID are also applied to the user #d.

In the distribution management table 601, user names, virtual firewall IDs, individual filtering IDs and common filtering IDs that can be set beforehand are registered.

That is, the distribution management table 601 registers correspondence among the user name #a, the virtual firewall ID (302), the individual filtering ID (α), and the common firewall ID (I); correspondence between the individual filtering ID (β) and the common filtering ID (I); and correspondence among the user name #b, the virtual firewall ID (303), the individual filtering ID (γ), and the common firewall ID (II).

However, the user IP address that is a user ID of each user terminal is not decided so that it cannot be registered at this time (state of distribution management table 601-1 in FIG. 22).

Unless the user IP address is registered in the distribution management table 601, it cannot be performed to distribute packets from each user to a corresponding virtual firewall and to assign an individual filtering ID and a common filtering ID.

In the present embodiment, it is assumed that the terminal 311 of the user #a is connected to the Internet 310, and after that, the terminal 311 performs IP communications with a connection partner terminal 313.

In the following, by using FIG. 19, the operation of the firewall apparatus of the present embodiment is described.

Operations from exchange of information of LCP between the user terminal 311 and the firewall apparatus 300 to exchange of information of NCP between the user terminal 311 and the firewall apparatus 300 are the same as those in the embodiment 2-1. Thus, the description for the operations are not provided.

After NCP ends, PPP connection is established between the user terminal 311 and the Internet 320. After that, as shown in FIG. 17, when the firewall apparatus 300 receives a packet 321 sent from the user terminal 311 to the connection partner terminal 313, the firewall apparatus 300 searches a distribution management table 1101 by using, as a search key, [a. a. a. a] included in the packet as the source IP address so as to extract the virtual firewall ID (ID=302), the individual filtering ID (ID=α) and the common filtering ID (ID=I), distribute the packet 321 to the virtual firewall 302 and assign the individual filtering ID a and the common filtering ID I to the packet 321 (process point 852 in FIG. 19).

As shown in FIG. 24, as for the packet 322 to which the individual filtering ID and the common filtering ID are assigned, a passing or discarding process is applied to the packet 322 according to a filtering rule complying with the security policy of the user #a written in the individual filtering table 561 having α as the filtering ID.

If any rule to be applied does not exist in the filtering policy written in the individual filtering table 561, the passing or discarding process is performed for the packet according to the filtering policy written in the common filtering table 571 to which I is assigned as the common filtering ID.

In addition, when the firewall apparatus 300 receives the packet 323 sent from the communication partner terminal 313 to the user terminal 311, the firewall apparatus 300 searches the distribution management table 1101 by using, as a search key, [a. a. a. a] included in the packet as the destination IP address so as to extract the virtual firewall ID (ID=302), the individual filtering ID (ID=α) and the common filtering ID (ID=I) included in a line of [a. a. a. a], and distributes the packet 323 to the virtual firewall 302 and assigns the filtering ID a and the common filtering ID I to the packet 323 (process point 853 in FIG. 19).

As for the packet 324 to which the individual filtering ID and the common filtering ID are assigned, the passing or discarding process is applied to the packet 324 according to a filtering rule complying with the security policy of the user #a written in the individual filtering table 561 having α as the filtering ID.

If any rule to be applied does not exist in the filtering policy written in the individual filtering table 561, the passing or discarding process is performed for the packet according to the filtering policy written in the common filtering table 571 to which I is assigned as the common filtering ID.

As described above, according to the present embodiment, when 10 users similarly use two filtering rules, for example, 20 rules are written in the filtering table by applying a conventional technology. In contrast, according to the present embodiment, only two rules need to be written in the filtering table.

That is, by introducing the common filtering ID and the common filtering table, the filtering policies can be efficiently managed.

Also in the embodiment 2-2 in which the virtual firewall is not used, the individual filtering table and the common filtering table in this embodiment can be introduced. In such a case, in the embodiment 2-2, the distribution management table is provided with the individual filtering ID and the common filtering ID similar to those of this embodiment instead of the filtering ID, and is provided with the individual filtering table and the common filtering table similar to those of this embodiment instead of the filtering table.

Embodiment 2-4

This embodiment of the firewall apparatus is an embodiment in which, in the firewall apparatus of the embodiments 2-1 or 2-2, the combination of the user name and the password sent by the report of the user name and the password is not the same as the combination of the user name and the password registered in the RADIUS server 330 for the reason that the user name or the password sent from the user #a is not correct, for example.

Figure 25:
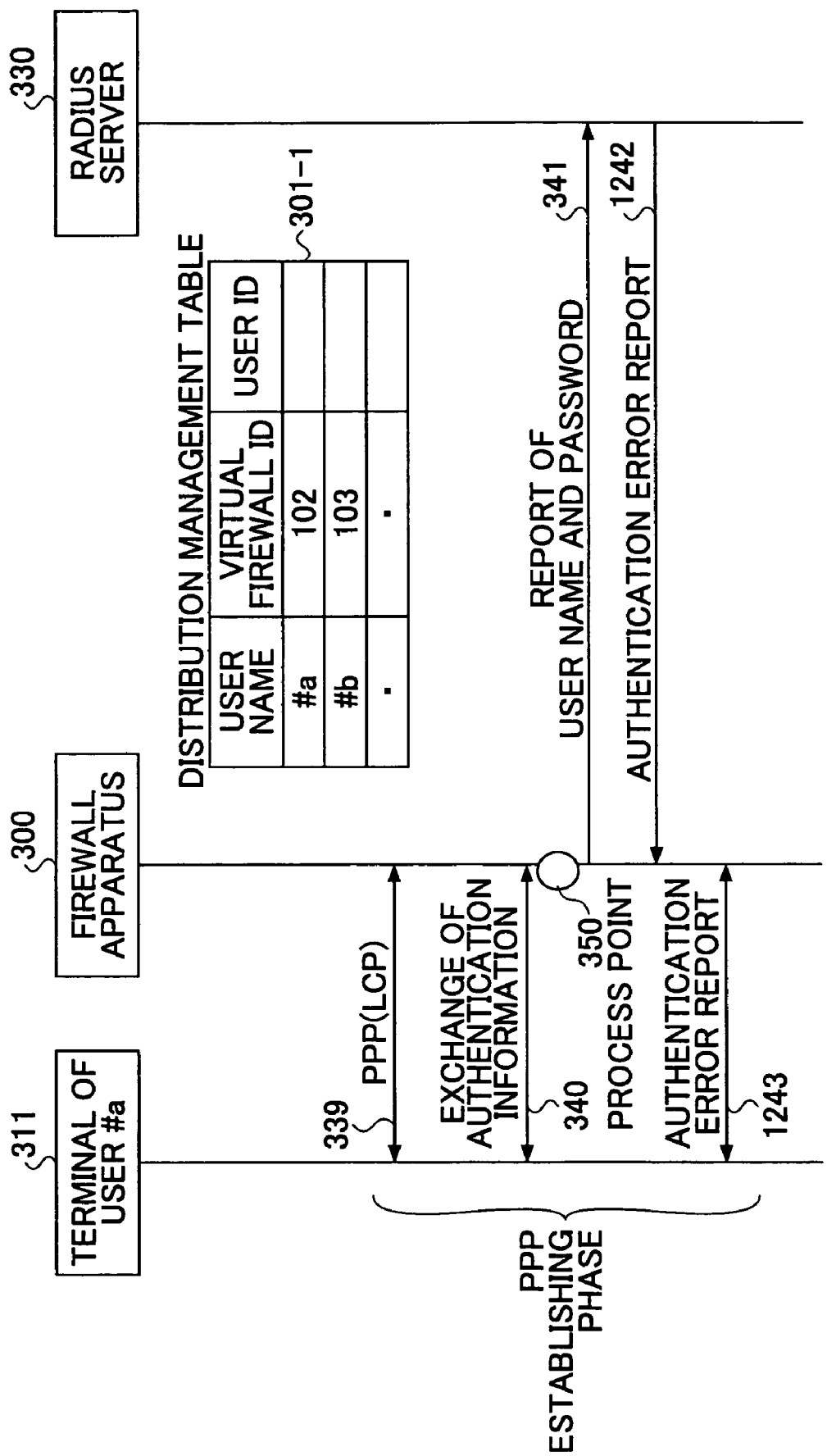
FIG. 25 is a sequence diagram showing operations of the firewall apparatus in the embodiment 2-4.

Operations of the firewall apparatus of the embodiment 2-4 are described with reference to FIG. 25. FIG. 25 is a sequence chart showing the operations of the firewall apparatus of the embodiment 2-4.

Since the processes from the LCP (339 in FIG. 25) to the report (341 in FIG. 25) of the user name and the password are the same as those of the embodiment 2-1, the processes are not described in this embodiment.

When an authentication error report is sent from the RADIUS server 330 due to the above-mentioned reason (1242 in FIG. 25), the firewall apparatus 300 sends an authentication error report to the user terminal 311 (1243 in FIG. 25), and terminates the PPP establishment process. In this case, the firewall apparatus 300 does not perform any process on the distribution management table 301.

Embodiment 2-5

This embodiment of the firewall apparatus is an embodiment in which, in the firewall apparatus of the embodiment 2-1, a terminal 314 of a firewall-service-unregistered user #c connects to the Internet 310, and, after that, the terminal 314 performs IP communications with a connection partner terminal 313.

An outline configuration of the firewall apparatus of this embodiment 2-5 is the same as that of FIG. 17, and FIG. 26 is a diagram showing information of the distribution management table of this embodiment.

As to the firewall-service-unregistered user #c, the user name and the virtual firewall are not registered in the distribution management table 301-3. But, the user #c receives a communication service to the Internet 310 via the terminal 314, and the user name and the password are registered in the RADIUS server 330.

Figure 27:
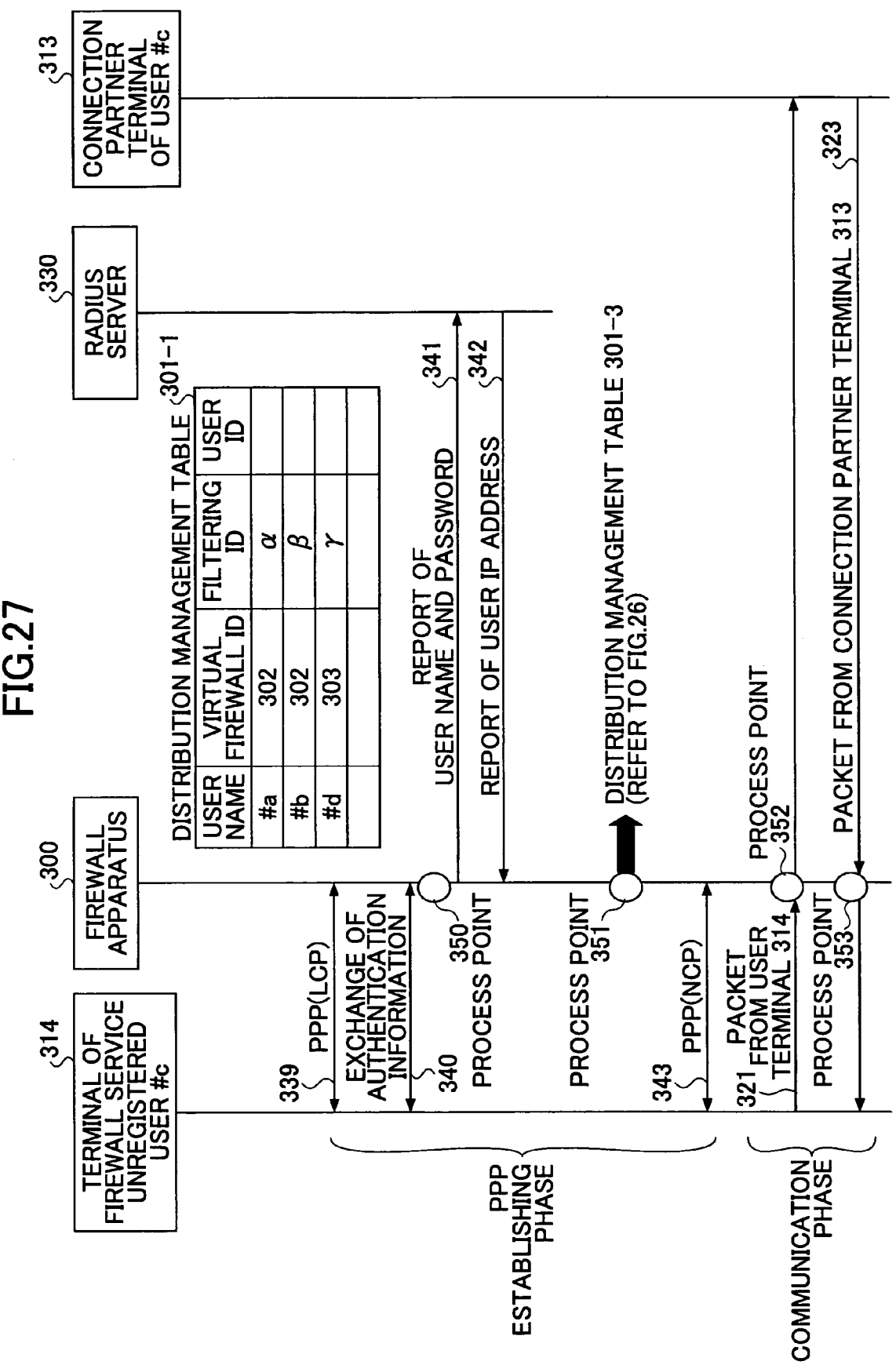
FIG. 27 is a sequence diagram showing operations of the firewall apparatus in the embodiment 2-5.

Operations of the firewall apparatus of this embodiment are described with reference to FIG. 27. FIG. 27 is a sequence diagram showing the operations of the firewall apparatus of this embodiment.

In FIG. 27, since the processes from the LCP (339 in FIG. 27) to the notification (342 in FIG. 27) of the user name and the password are the same as those of the embodiment 2-1, the processes are not described in this embodiment.

When the firewall apparatus 300 receives the report (342 in FIG. 27) of the user IP address, the firewall apparatus 300 holds a user IP address [c.c.c.c] included in the report of the user IP address, to be provided to the user terminal.

Then, the firewall apparatus 300 searches the distribution management table (301-3) for the user name #c. But, since the user name #c does not exist, the firewall apparatus does not register the user IP address [c.c.c.c] in the distribution management table (301-3).

In addition, at the same time, while the firewall apparatus 300 exchanges information of NCP with the user terminal 314 in (343 in FIG. 27), the firewall apparatus 300 sends the user IP address [c.c.c.c] to the user terminal 314, and the user terminal 314 ascertains that the own user IP address is [c.c.c.c].

After completing NCP, a PPP connection is established between the user terminal and the network. After that, when the firewall apparatus 300 receives a packet 321 that is sent from the user terminal 314 to the connection partner terminal 313, the firewall apparatus 300 searches the distribution management table (301-3) by using [c.c.c.c] as a search key, included in the packet 321 as a source IP address, so that it is determined that the source IP address is not registered.

When the source IP address is not registered, since a virtual firewall to which the packet is to be distributed is written to be a virtual firewall 304 as shown in a last line in the distribution management table (301-3) as shown in FIG. 26, the packet 321 is distributed to the virtual firewall 304 for unregistered users (process point 352 in FIG. 27).

In the same way, also as for a packet 323 sent from the communication partner terminal 313, when it is determined that the destination IP address is not registered as a result of searching of the distribution management table (301-3) by using the destination user IP address [c.c.c.c] as a search key, the packet 323 is distributed to a virtual firewall 304 for unregistered users (process point 353 in FIG. 27).

The virtual firewall 304 for the unregistered users does not include a filtering rule to unconditionally pass all packets, or includes a filtering rule common for all unregistered users.

The firewall apparatus of this embodiment can be applied to the before-mentioned embodiment 2-2. In such as case, a packet from the terminal 314 of the firewall service-unregistered user #c and a packet to the terminal 314 of the firewall service-unregistered user #c pass through an alternative route 305 shown in FIG. 20

Embodiment 2-6

This embodiment of the firewall apparatus is an embodiment in which, conditions are the same as those of the firewall apparatus in the embodiment 2-5, wherein the terminal 314 of the firewall-service-unregistered user #c connects to the Internet 310, and, after that, the terminal 314 performs IP communications with the connection partner terminal 313.

An outline configuration of the firewall apparatus of this embodiment is the same as that of FIG. 17, and FIG. 28 is a diagram showing information of the distribution management table of this embodiment.

As to the firewall-service-unregistered user #c, the user name and the virtual firewall are not registered in the distribution management table 301-4. But, the user #c receives a communication service to the Internet 310 via the terminal 314, and the user name and the password are registered in the RADIUS server 330.

Figure 29:
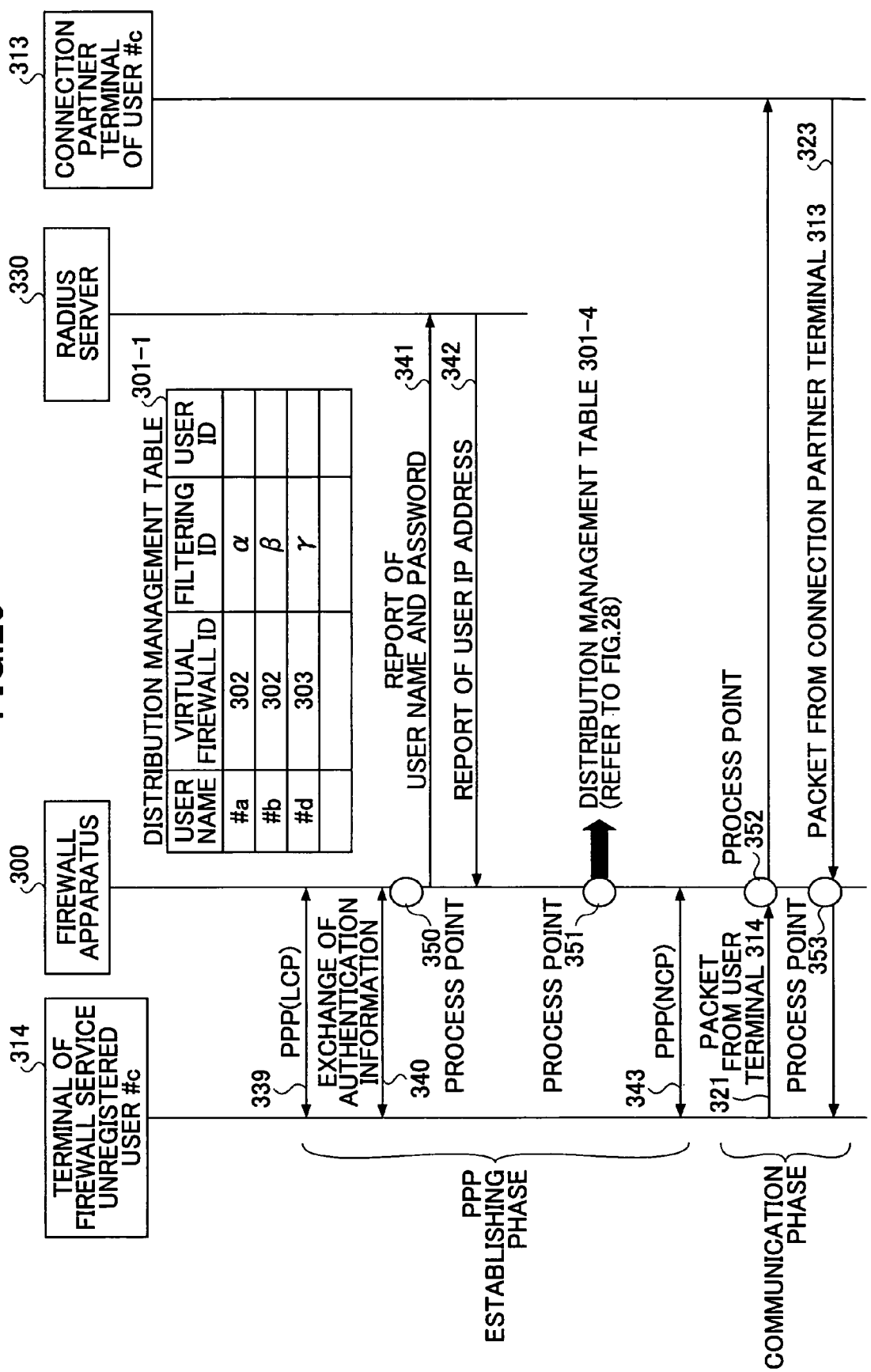
FIG. 29 is a sequence diagram showing operations of the firewall apparatus in the embodiment 2-6.

Operations of the firewall apparatus of this embodiment are described with reference to FIG. 29. FIG. 29 is a sequence chart showing the operations of the firewall apparatus of this embodiment.

In FIG. 29, since the processes from the LCP (339 in FIG. 29) to the notification (342 in FIG. 29) of the user name and the password are the same as those of the embodiment 2-1, the processes are not described in this embodiment.

When the firewall apparatus 300 receives the report (342 in FIG. 29) of the user IP address, the firewall apparatus 300 holds a user IP address [c.c.c.c], included in the notification of the user IP address, to be provided to the user terminal.

Then, the firewall apparatus 300 searches the distribution management table (301-4) for the user name #c. But, the user name #c does not exist.

In this case, as shown in FIG. 28, the firewall apparatus 300 registers the user IP address [c.c.c.c] and ID=304 of the virtual firewall 304 for unregistered users in the distribution management table (301-4).

In addition, at the same time, while the firewall apparatus 100 exchanges information of NCP with the user terminal 314 in (343 in FIG. 29), the firewall apparatus 300 sends the user IP address [c.c.c.c] to the user terminal 314, and the user terminal 314 ascertains that the own user IP address is [c.c.c.c].

After completing NCP, a PPP connection is established between the user terminal and the network. After that, when the firewall apparatus 300 receives a packet 321 that is sent from the user terminal 314 to the connection partner terminal 313, and the firewall apparatus 300 searches the distribution management table (301-4) by using [c.c.c.c] as a search key, included in the packet 321 as a source IP address, so that the firewall apparatus 300 extracts the virtual firewall ID=304 that is associated with the source IP address so as to distribute the packet 321 to the virtual firewall 304 for the unregistered user (process point 352 in FIG. 29).

In the same way, also as for a packet 323 sent from the communication partner terminal 313, the firewall apparatus 300 searches the distribution management table (301-4) by using [c.c.c.c] as a search key, included in the packet 323 as a destination IP address, so that the firewall apparatus 300 extracts the virtual firewall ID=304 that is associated with the destination IP address so as to distribute the packet 323 to the virtual firewall 304 for the unregistered user (process point 353 in FIG. 29).

In the same way as the embodiment 2-5, the virtual firewall 304 for the unregistered user does not include a filtering rule so as to unconditionally pass all packets, or includes a filtering rule common for all unregistered users.

In addition, when the source IP address is not registered, the packet is discarded as shown in the last line of the distribution management table 301-4 in FIG. 28.

Accordingly, when a malicious user sends a large amount of packets having an IP address that is not assigned to any user in an IP Spoofing attack and the like, the firewall apparatus 300 can discard the packet.

The firewall apparatus of this embodiment can be also applied to the before-mentioned embodiment 2-2.

In this case, the user IP address [c. c. c. c] and the filtering ID for the unregistered users are registered in the distribution table (301-4). Then, a packet from the terminal 314 of the firewall service-unregistered user #c and a packet to the terminal 314 of the firewall service-unregistered user #c pass through an alternative route 305 shown in FIG. 20.

Embodiment 2-7

This embodiment of the firewall apparatus is an embodiment in which, as in the embodiment 2-1, the terminal 315 of the firewall-service-unregistered user #d connects to the Internet 310, and, after that, the terminal 315 performs IP communications with the connection partner terminal 313.

An outline configuration of the firewall apparatus of this embodiment is the same as that of FIG. 17, and FIG. 30 is a diagram showing information of the distribution management table of this embodiment.

The user #d is a user who should be registered in the firewall service. But, in this embodiment, the user name #d is not correctly registered in the distribution management table (301-5) for the reason that the manager of the firewall apparatus 300 forgot about registering the user name #d in the distribution management table (301-5) or erroneously registered the user name. However, the user name #d and the password are correctly registered in the RADIUS server 330.

Figure 31:
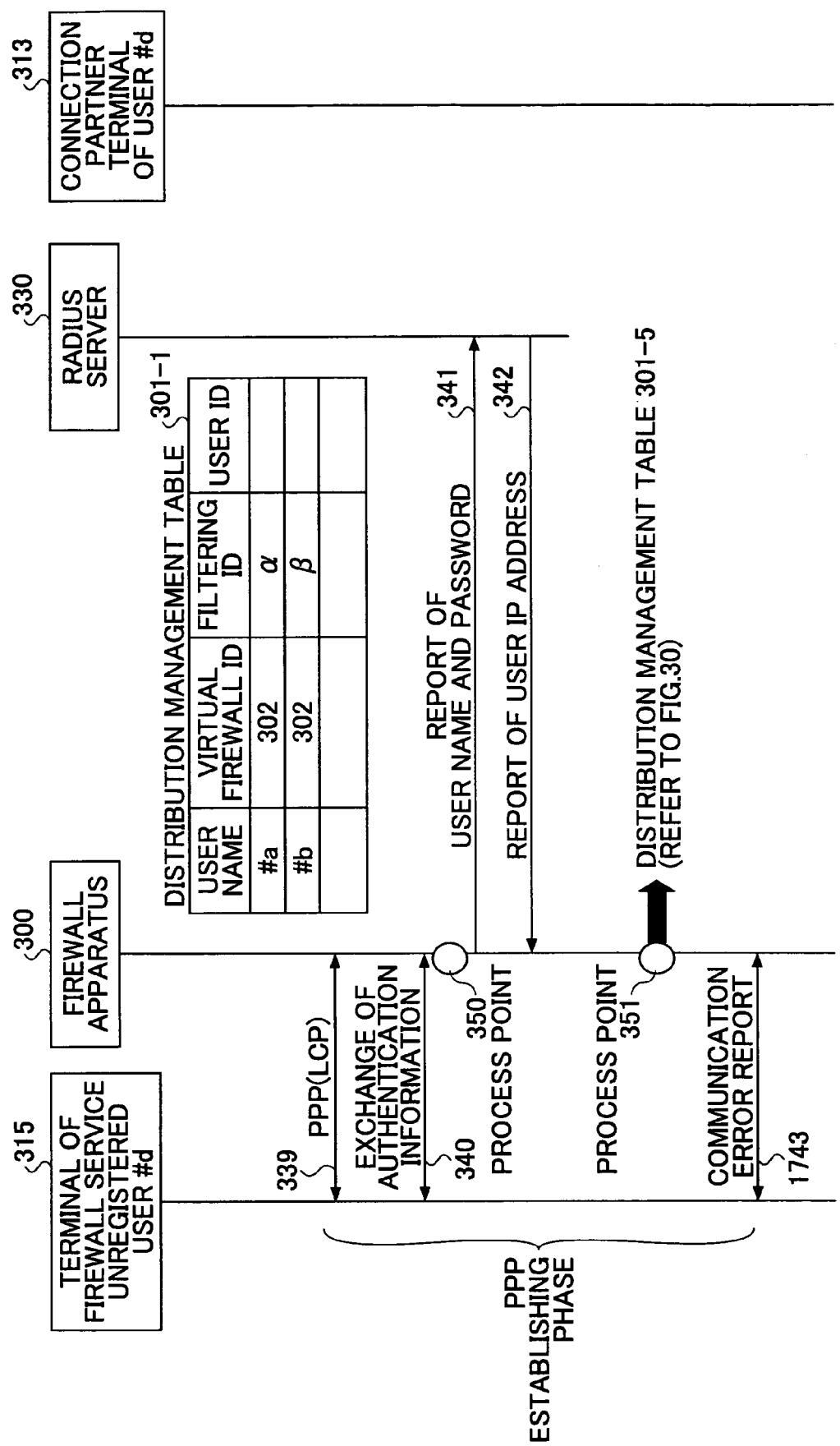
FIG. 31 is a sequence diagram showing operations of the firewall apparatus in the embodiment 2-7.

Operations of the firewall apparatus of this embodiment are described with reference to FIG. 31. FIG. 31 is a sequence chart showing the operations of the firewall apparatus of this embodiment.

In FIG. 31, since the processes from the LCP (339 in FIG. 31) to the report (342 in FIG. 31) of the user IP address are the same as those of the embodiment 2-1, the processes are not described in this embodiment.

When the firewall apparatus 300 receives the report (342 in FIG. 31) of the user IP address, the firewall apparatus 300 holds the user IP address [d. d. d. d], included in the report 342 of the user IP address, to be provided to the user terminal.

Then, the firewall apparatus 300 searches the distribution management table (301-5) for the user name #d by using the user name as a key. But, the user name #d does not exist.

When the user name does not exist, the firewall apparatus 300 sends an authentication error report (1743 in FIG. 31) to the user terminal 315, and ends the PPP establishment process.

The firewall apparatus of this embodiment can be also applied to the before-mentioned embodiment 2-2.

Generally, as shown in FIG. 32, the filtering table is generated based on IP addresses of the user terminal side and the connection partner terminal side, port numbers of the user terminal side and the connection partner terminal side, and the like.

As mentioned above, in the case of the constant connection service, the user terminal side IP address changes each time when PPP connection is established.

Therefore, the user terminal side IP address to be registered on the filtering table 1961 in FIG. 32 needs to be dynamically set for each PPP connection, and the setting process amount increases in proportion to the number of rules.

Figure 33:
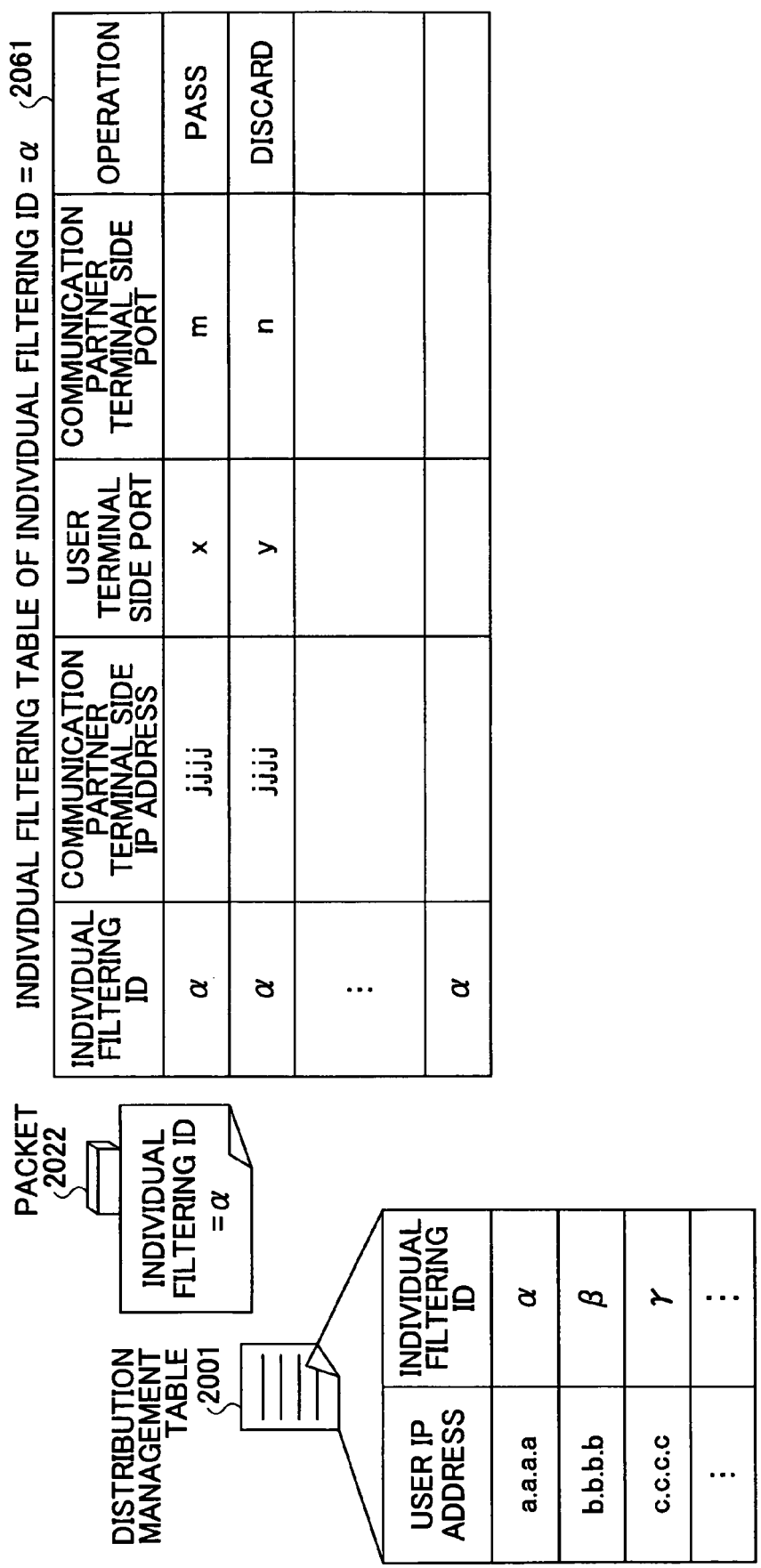
FIG. 33 is a diagram showing contents in an individual filtering table.

On the other hand, as for the individual filtering table based on the present invention shown in FIG. 33, an individual filtering ID is assigned to a packet in the distributing management table 2001, and the individual filtering ID instead of the user terminal side IP address is used in the individual filtering table 2061.

Since the individual filtering ID is a fixed value irrespective of a value of the user terminal side IP address, there is no effect on the individual filtering table 2061 however repeatedly PPP connection is performed.

Only a part for associating the user terminal side IP address with the individual filtering ID in the individual management table 2001 is affected by the change of the user terminal side IP address for each PPP connection, so that only one line needs to be changed irrespective of the number of the rules in the individual filtering table 2061.

As mentioned above, introduction of the filtering ID contributes to a decreasing process amount in the inside of the filtering apparatus.

In addition, by introducing the common filtering ID of the present invention, filtering policies that can be commonly used for plural users can be integrated to one so that a filtering table can be commonly provided to all users. Thus, this contributes to decreasing the filtering table amount in the whole firewall apparatus.

Effects of embodiments 2-1~2-7

According to the filtering apparatus of the embodiments 2-1~2-7, the multiple number of users can be increased and the efficiency of the filtering table can be increased.

Embodiments 3-1~3-6

In the following, embodiments 3-1~3-6 are described in detail with reference to figures.

Embodiment 3-1

Figure 34:
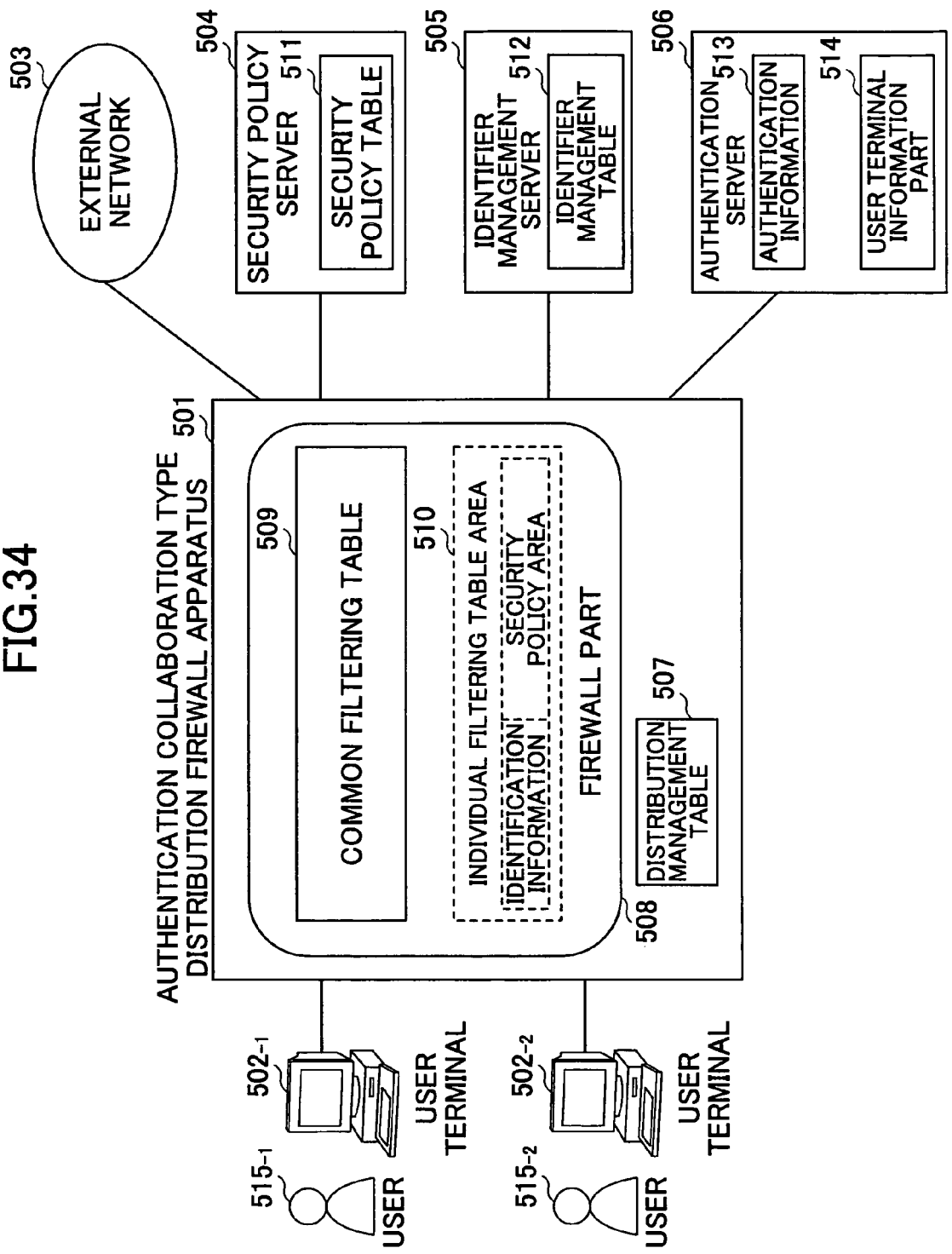
FIG. 34 is a block diagram showing an outline configuration of a firewall apparatus and a network model in which the firewall apparatus is used according to embodiment 3-1 of the present invention.

FIG. 34 is a block diagram showing an outline configuration of an authentication collaboration type distribution firewall apparatus of the embodiment 3-1 of the present invention, and a network model in which the authentication collaboration type distribution firewall apparatus of the embodiment 3-1 of the present invention is used.

The authentication collaboration type distribution firewall apparatus (to be simply referred to as "firewall apparatus" hereinafter) 501 accommodates a user terminal (502-1) used by a user (515-1) and a user terminal (502-2) used by a user (515-2) wherein each terminal starts communication by authentication, and the firewall apparatus is connected to an external network (the Internet, for example) 503.

In addition, the firewall apparatus 501 is connected to a security policy server 504 that includes a security policy table 511 holding security policies specific for users, and is connected to an identifier management server 505 that includes an identifier management table 512 holding identifiers to be distributed to the firewall apparatus 501.

Further, the firewall apparatus 501 is connected to an authentication server 506 that includes authentication information 513 of users, and a user terminal information part 514 holding a pool table including user terminal information to be provided to a user terminal when authenticating.

A RADIUS (Remote Authentication Dial-in User Service) server, for example, can be used as the authentication server. In addition, an IP address to be provided to a user terminal can be used as the user terminal information stored in the user terminal. information part 514.

In addition, PPP (Point to Point Protocol) is used by the user terminal (502-1, 502-2) to connect to the network, and PAP (Password Authentication Protocol) or CHAP (Challenge Handshake Authentication Protocol) can be used for authentication.

In addition, the firewall apparatus 501 includes a distribution management table 507 for associating user terminal information included in a received packet with an identifier that indicates a filtering table for filtering the received packet, and a firewall part 508 that actually performs filtering.

Further, the firewall part 508 includes a common filtering table 509 holding security policies common to the user (515-1) and the user (515-2), and an individual filtering table area for holding an individual security policy of the user (515-1) or the user (515-2).

The individual filtering table area is divided to an area in which identification information is written, and an area, associated with the area in which identification information are written, in which security policy is written.

FIG. 35 is a diagram showing details of the authentication information in the authentication server shown in FIG. 34. FIG. 36 is a diagram showing details of the pool table held in the user terminal information part 514 in the authentication server shown in FIG. 34.

In addition, FIG. 37 is a diagram showing details of the identifier management table 512 in the identifier management server shown in FIG. 34, FIG. 38 is a diagram showing details of the security policy table 511 in the security policy server shown in FIG. 34, and FIG. 39 is a diagram showing detail of the distribution management table, in its initial state, in the firewall apparatus shown in FIG. 34.

Figure 40:
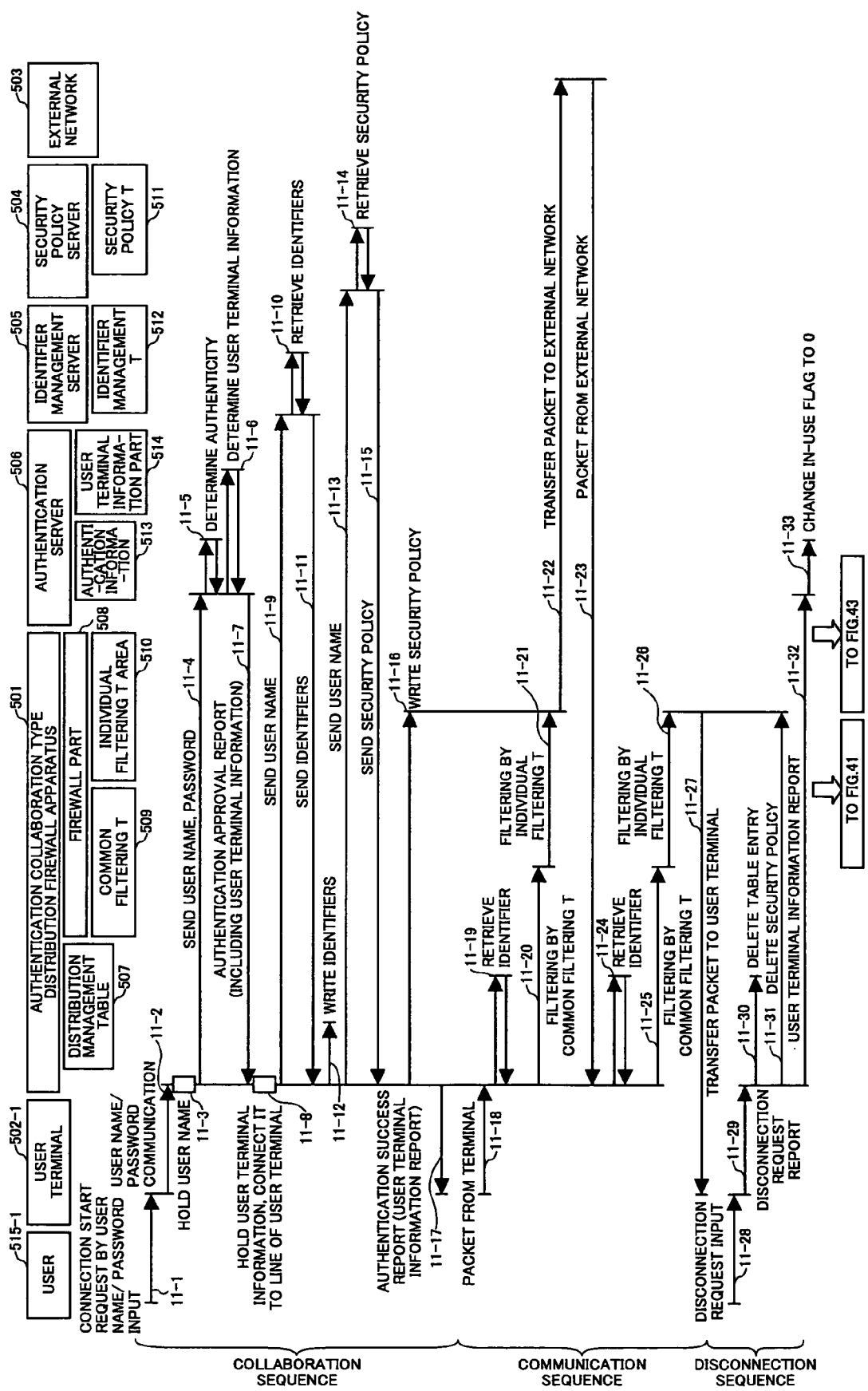
FIG. 40 is a diagram showing an example of a sequence of operations of the network model shown in FIG. 34.
Figure 41:
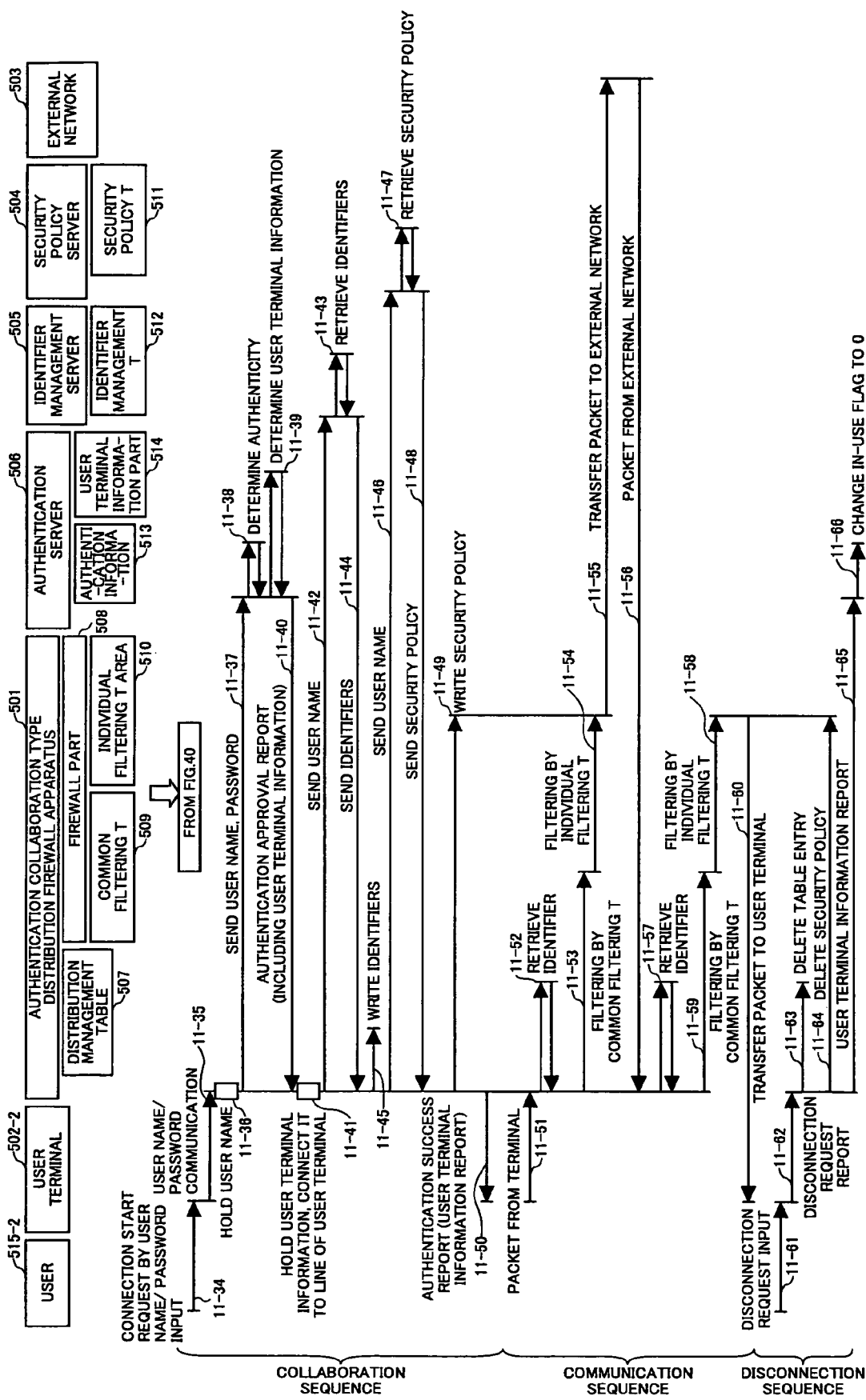
FIG. 41 is a diagram showing an example of a sequence of operations of the network model shown in FIG. 34.

FIGS. 40 and 41 show one example of a sequence of operations of the network model shown in FIG. 34, and FIGS. 40 and 41 show a sequence in which, after the user (515-1) connects to the external network 503, the user (515-1) disconnects; after that, the user (515-2) connects to the external network 503, and after that, the user (515-2) disconnects.

In the beginning, a connection start sequence of the user (515-1) is described.

First, the user (515-1) sends a user name (user 515-1) and a password ($\alpha$) to the firewall apparatus 501 using the user terminal (11-1, 11-2 in FIG. 40).

The firewall apparatus 501 that receives the user name (user 515-1) and the password ($\alpha$) holds the user name (user 515-1) (11-3 in FIG. 40), and sends the user name (user 515-1) and the password ($\alpha$) to the authentication server 506 (11-4 in FIG. 40).

The authentication server 506 retrieves authentication information 513 using the received user name (user 515-1) and the password ($\alpha$) so as to determine that authentication is possible (11-5 in FIG. 40).

In addition, the authentication server 506 extracts, from the pool table of the user terminal information part 514, usable user terminal information (IP_1) in which the in-use flag is "0", changes the extracted in-use flag to "1", and reports the extracted user terminal information (IP_1) to the firewall apparatus 501 with an authentication approval report (11-6, 11-7 in FIG. 40).

The firewall apparatus 501 holds the received user terminal information (IP_1), and associates the user terminal information with a line to which the user connects (11-8 in FIG. 40), and sends the held user name (user 515-1) to the identifier management server 505 (11-9 in FIG. 40).

The identifier management server 505 searches the identifier management table 512 based on the received user name (user 515-2) so as to extract a common filtering table ID (common 509) and an individual filtering table ID (individual 510-1) that are associated with the user name, and sends the identifiers (common 509, individual 510-1) to the firewall apparatus 501 (11-10, 11-11 in FIG. 40).

The firewall apparatus 501 holds the received individual filtering table ID (individual 510-1), and writes the received common filtering table ID (common 509), the individual filtering table ID (individual 510-1) and the holding user terminal information (IP_1) into the distribution management table 507 shown in FIG. 39 (11-12 in FIG. 40).

In addition, the firewall apparatus 501 sends the holding user name (user 515-1) to the security policy server 504 (11-13 in FIG. 40).

The security policy server 504 searches the holding security policy table 512 based on the received user name (user 515-1) so as to extract individual security policies (rule 1-1~rule 1-m) associated with the user name (11-4 in FIG. 40) and sends them to the firewall apparatus 501 (11-15 in FIG. 40).

The firewall apparatus 501 writes the holding individual filtering table ID (individual 510-1) into the identification information of the individual filtering table area 510, and writes the received individual security policies (rule 1-1~rule 1-m) into the security policy area (11-16 in FIG. 40).

After performing this series of processes, the firewall apparatus 501 sends an authentication success report including the holding user terminal information (IP_1) to the user terminal (502-1) (11-17 in FIG. 40).

Then, the connection start sequence ends, so that the user (515-1) can connect to the external network 503 via the user terminal (502-1).

Next, a communication sequence between the user terminal (502-1) and the external network 503 is described.

When the user terminal (502-1) transfers a packet to the external network 503, the user terminal (502-1) determines its own address as the user terminal information (IP_1) finally received in the connection start sequence, and adds the address to a packet to transfer the packet to the firewall apparatus 501 (11-18 in FIG. 40).

The firewall apparatus 501 extracts the user terminal information (IP_1) from the received packet, searches the distribution management table 507 using the user terminal information (IP_1) as a key so as to extract the common filtering table ID (common 509) and the individual filtering table ID (individual 510-1) (11-19 in FIG. 40).

Next, the firewall part 508 performs packet filtering using filtering tables indicated by the extracted common filtering table ID (common 509) and the individual filtering table ID (individual 510-1) (11-20, 11-21 in FIG. 40). After that, the packet is transferred to the external network 503 (11-22 in FIG. 40).

In a case when the firewall apparatus 501 receives a packet for the user terminal (502-1) from the external network 503 (11-23 in FIG. 40) and transfers the packet to the user terminal (502-1), since the packet received from the external network 503 includes the user terminal information (IP_1) as a destination address, the firewall apparatus 501 extracts the user terminal information (IP_1) from the received packet (11-24 in FIG. 40). Then, the firewall apparatus 501 transfers the packet to the user terminal (502-1) (11-27 in FIG. 40) after filtering the packet according to a sequence the same as that for transferring a packet from the user terminal (502-1) to the external network 503 (11-25, 11-26 in FIG. 40).

Based on the above-mentioned processes, the firewall apparatus 501 of the present embodiment performs a filtering process for packets sent from both directions of the user terminal side and the external network side so as to transfer the packet.

Next, a disconnection sequence from the user (515-1) is described.

When disconnecting, a disconnection request is reported to the firewall apparatus 501 (11-28, 11-29 in FIG. 40) from the user (515-1) via the user terminal (502-1).

When the firewall apparatus 501 receives the disconnection request, the firewall apparatus 501 checks a line via which the request is received, and derives the user terminal information (IP-1) associated with the line in the connection start sequence.

Based on the user terminal information, the firewall apparatus 501 extracts the individual filtering table ID (individual 510-1) from an entry associated with the user terminal information (IP-1) in the distribution management table 507, and deletes the entry (11-30 in FIG. 40).

In addition, the firewall apparatus 501 sends the derived user terminal information (IP-1) to the authentication server 506 (11-32 in FIG. 40). The authentication server 5-6 restores, to "0", the in-use flag in an entry associated with the received user terminal information in the pool table in the user terminal information part 514 (11-33 in FIG. 40).

In this way, information in various tables changed in the connection sequence are restored to a state before the connection, so that the disconnection sequence ends.

Next, a connection start sequence, a communication sequence and a disconnection sequence are performed for the user (515-2) in the same way for the user (515-1) (11-34~11-66 in FIG. 41).

Characteristics of sequences for the user (515-2) are as follows. Since the disconnection sequence is performed for the user (515-1), information on the user (515-1) does not exist in the distribution management table 507 and in the individual filtering table area 510 in the firewall apparatus 501. Thus, information on user (515-2) can be written into the same areas, and the user terminal information (IP_1) used by the user terminal (515-1) can be used, so that filtering can be performed by using the security policy for the user (515-2) even though the user terminal information for the user (515-2) is the same as the user terminal information (IP_1) for the user (515-2).

Accordingly, using the individual filtering table area 510 and the common filtering table 509, only security policies to be written into the individual filtering table area 510 are loaded so that loading workload can be reduced, which is a problem to be solved by the present invention.

In addition, the user terminal uses the individual filtering table area 510 and the area of the distribution management table 507 only while the user terminal is connecting to the network, and these areas are not used when the user terminal is disconnected. Thus, information in the individual filtering table area 510 and the distribution management table 507 in the firewall apparatus 501 need to be held only for the number of the user terminals that connect simultaneously, so that capacity of the security policies to be held can be reduced.

In addition, by associating the user terminal information provided for each connection with the security policies, filtering corresponding to a current user can be performed even though the user terminal information is the same as that of a past different user terminal.

Embodiment 3-2

Figure 42:
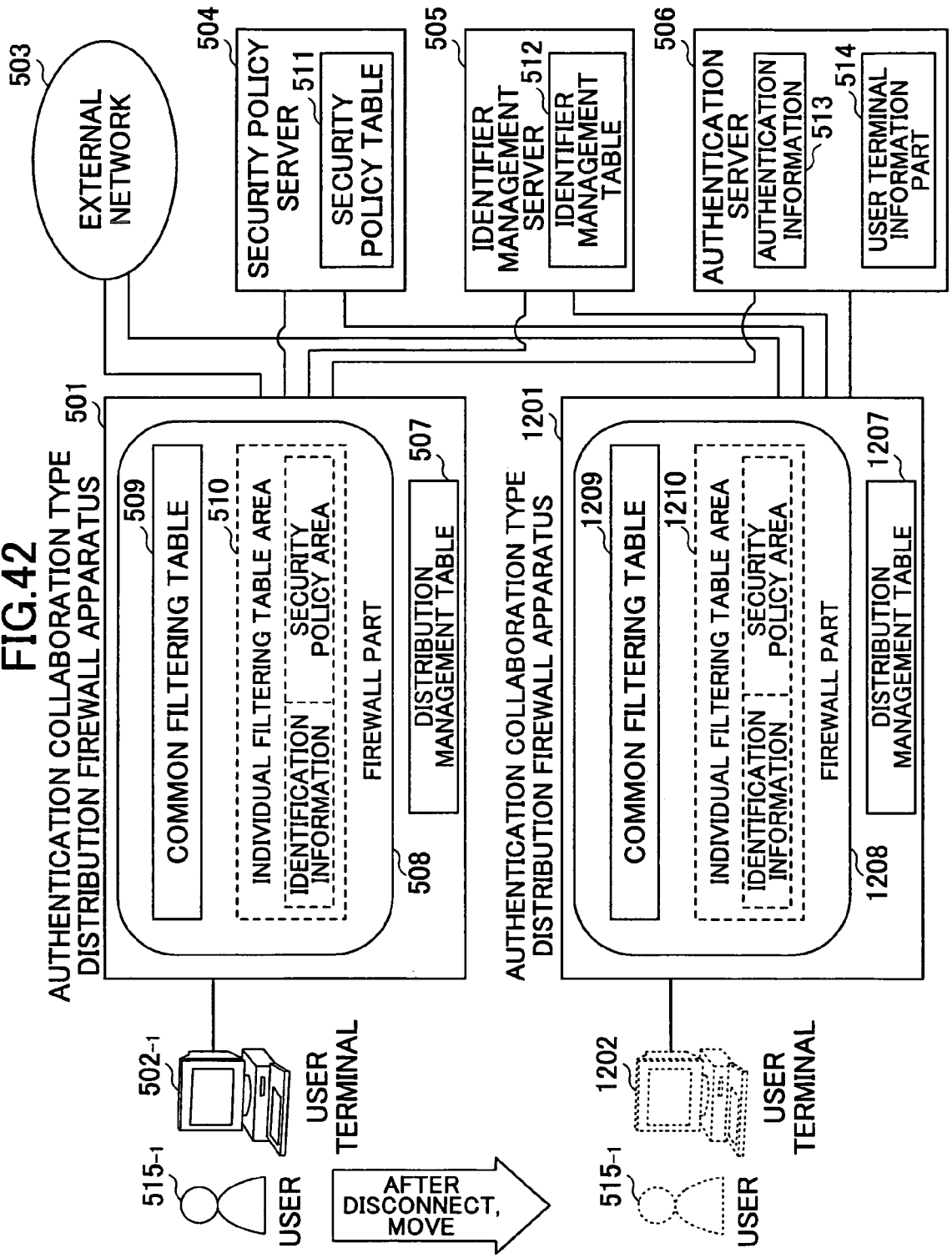
FIG. 42 is a block diagram showing an outline configuration of a firewall apparatus and a network model in which the firewall apparatus is used according to an embodiment 3-2.

FIG. 42 is a block diagram showing an outline configuration of a firewall apparatus of the embodiment 3-2 of the present invention, and a network model in which the firewall apparatus of the embodiment 3-2 of the present invention is used.

In the network model shown in FIG. 42, a firewall apparatus 1201 and a user terminal 1202 connected to the firewall apparatus 1201 are newly added to the network model shown in FIG. 34.

In addition, the user (515-1) can connect to the firewall apparatus 1201, and the firewall apparatus 1201 is connected to the external network 503, the security policy server 504, the identifier management server 505 and the authentication server 506.

The firewall apparatus 1201 includes a distribution management table 1207 including information for associating user terminal information included in a received packet with an identifier that indicates a filtering table for filtering the received packet, and a firewall part 1208 that actually performs filtering.

Further, the firewall part 1208 includes a common filtering table 1209 holding security policies common to plural users including the user (515-1) and an individual filtering table area 1210 for holding individual security policies of the user (515-1).

The individual filtering table area 1210 is divided to an area in which identification information is written, and an area in which security policies are written.

Figure 43:
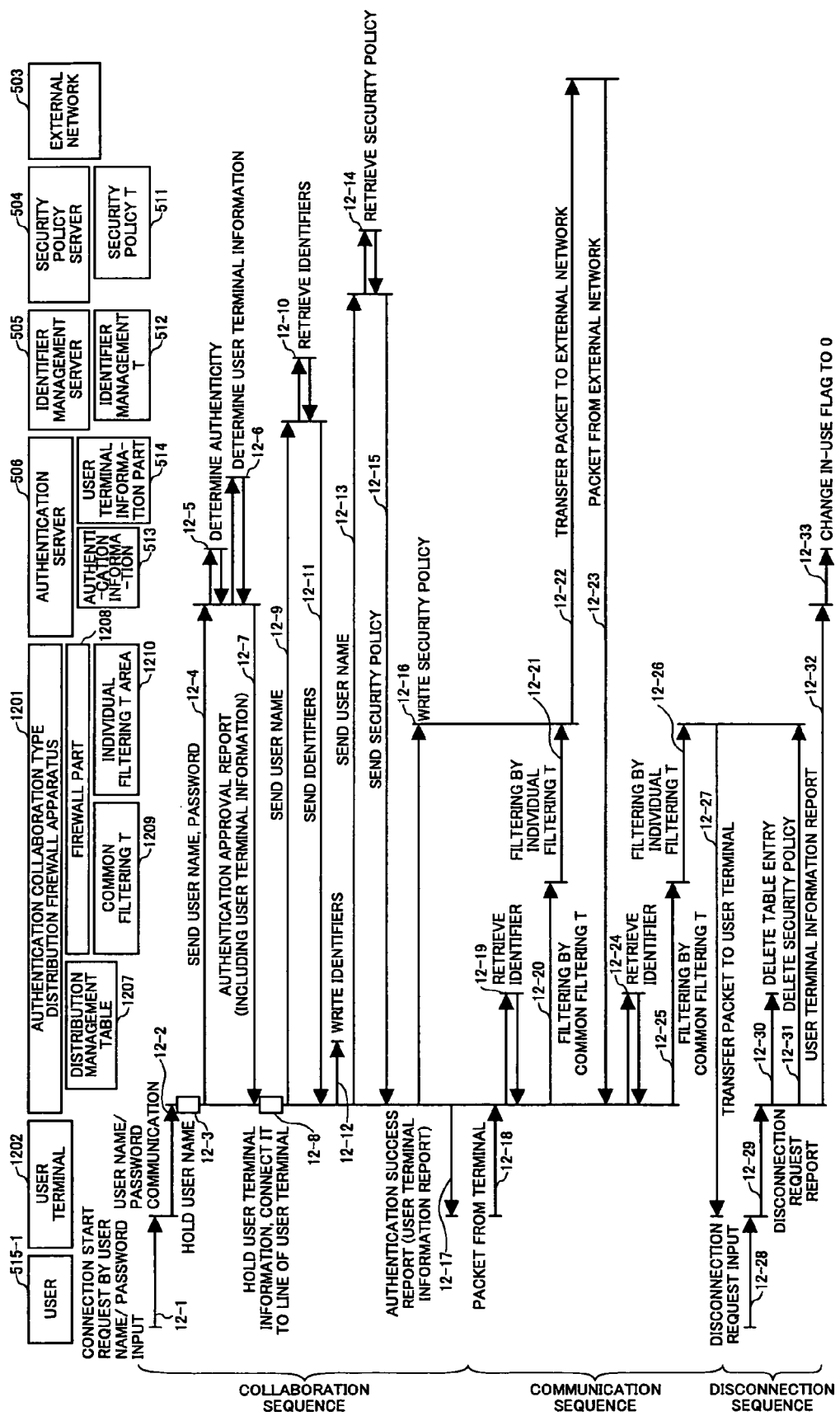
FIG. 43 is a diagram showing an example of a sequence of operations of the network model shown in FIG. 42.

FIG. 43 is a diagram showing an example of a sequence of operations in the network model in FIG. 42. FIG. 43 shows a sequence in which, after the sequence shown in FIG. 40 is performed, the user (515-1) connects to the external network 503 again from the user terminal 1202 connected to the firewall apparatus 1201, performs communications and disconnects.

A connection sequence in which the user (515-1) moves to the user terminal 1202 to perform re-connection, a sequence for performing communication and a sequence for disconnection, shown in 12-1~12-33 in FIG. 43, are the same as the sequences performed using the firewall apparatus 501 shown in FIG. 40. Thus, the description is not provided.

In addition, individual security policies for the user (515-1) sent to the firewall apparatus 1201 from the security policy server 504 and each identifier sent from the identifier management server 505 are the same as information sent to the firewall apparatus 501 in FIG. 40.

Accordingly, in the present embodiment, security policies corresponding to a user can be applied even though the user changes the firewall apparatus that accommodates the user.

Embodiment 3-3

Figure 44:
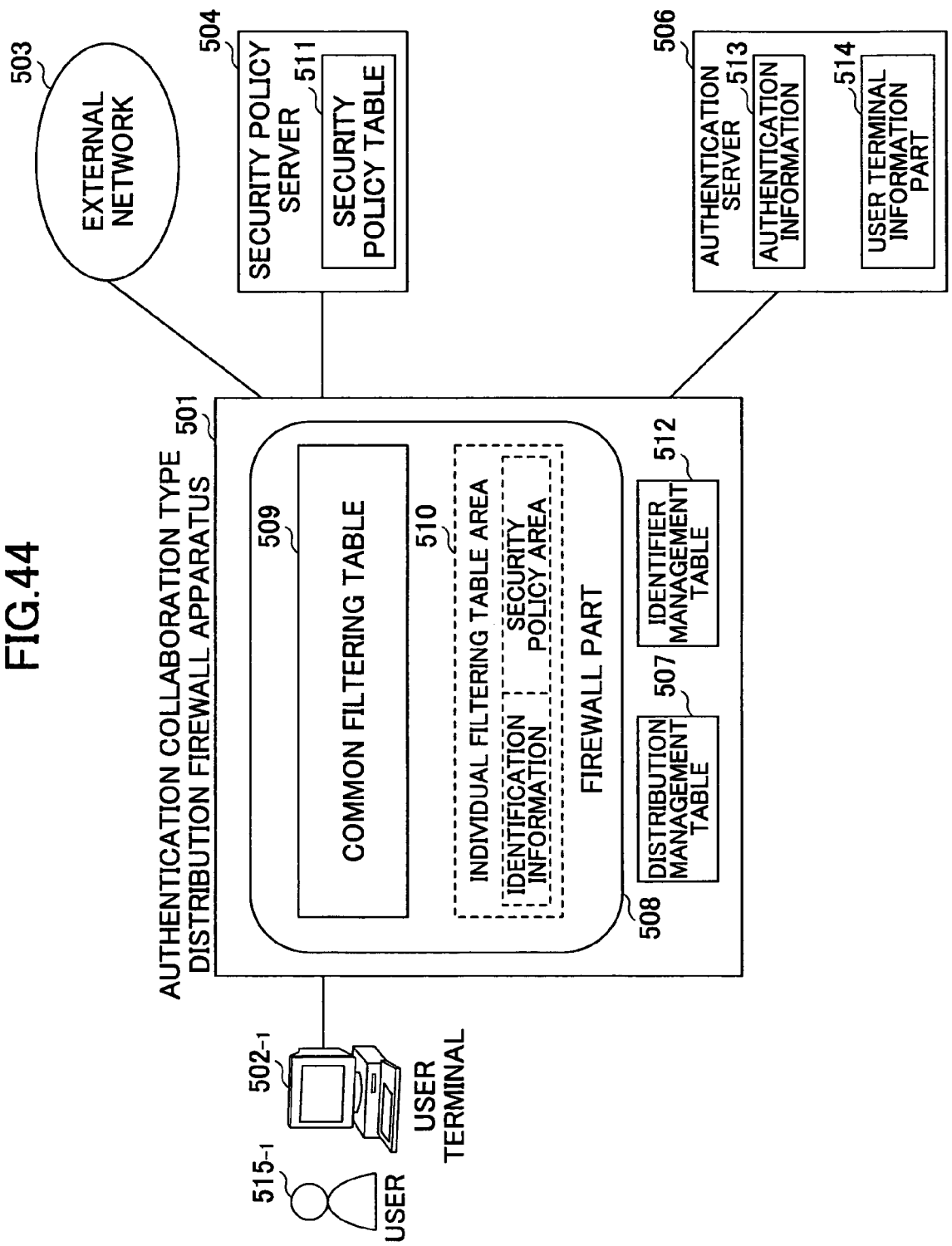
FIG. 44 is a block diagram showing an outline configuration of a firewall apparatus and a network model in which the firewall apparatus is used according to an embodiment 3-3.

FIG. 44 is a block diagram showing an outline configuration of a firewall apparatus of the embodiment 3-3 of the present invention, and a network model in which the firewall apparatus of the embodiment 3-3 of the present invention is used.

This embodiment is different from the before-mentioned embodiment 3-1 in that firewall apparatus 501 holds, in its inside, the identifier management table 512 associating user names with various identifiers held in the identifier management server 505.

Figure 45:
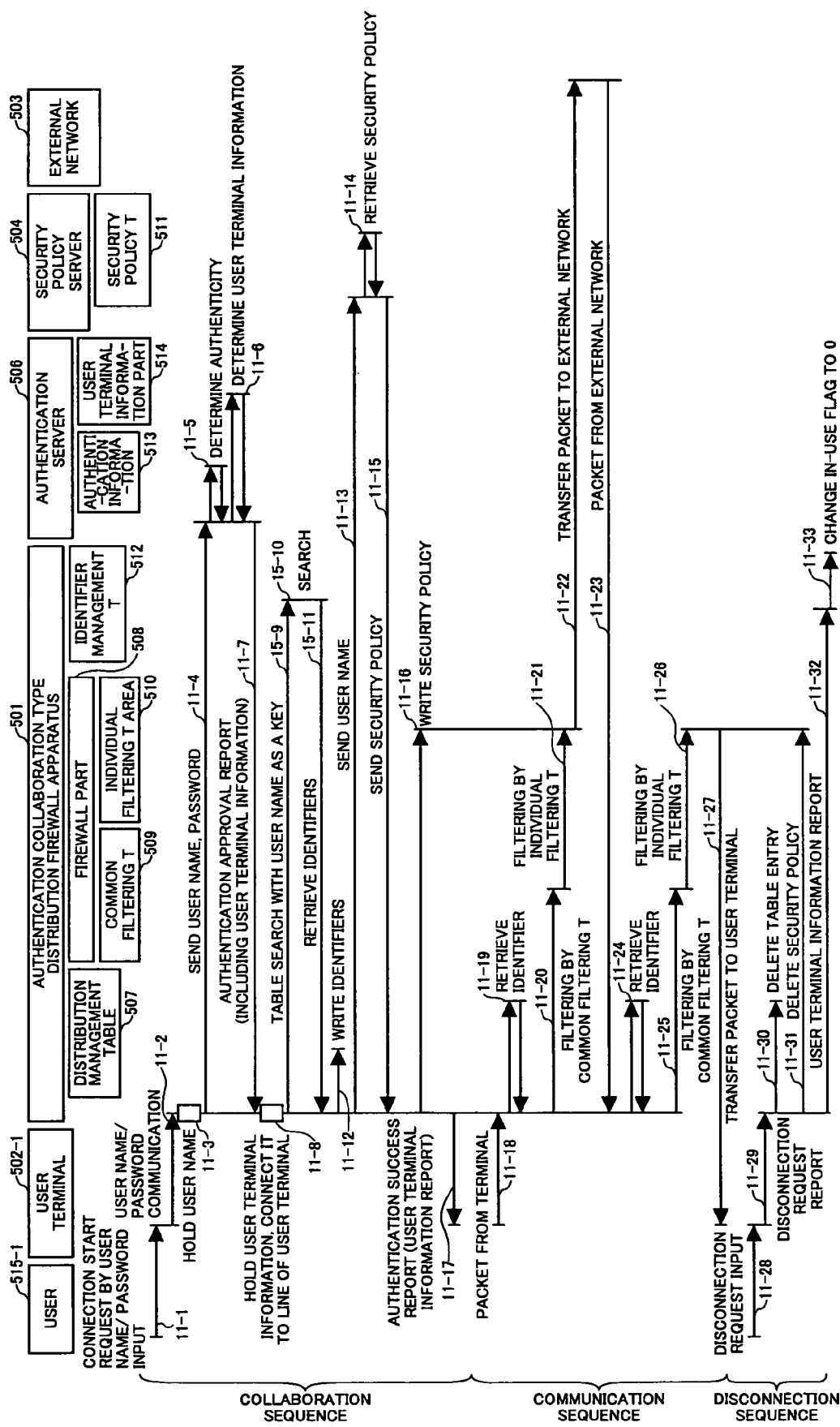
FIG. 45 is a diagram showing an example of a sequence of operations of the network model shown in FIG. 44.

FIG. 45 is a diagram showing an example of a sequence showing operations of the network model shown in FIG. 44. The sequence is different from the sequence shown in FIG. 40 in that communication with the identifier management server 505 is deleted, and a sequence for the identifier management table 512 held in the inside of the firewall apparatus 501 is newly added.

In the sequence changed from the sequence in FIG. 40, the firewall apparatus 501 holds user information received from the authentication server 506 in 11-8 in FIG. 45, and associates a connection line of the user terminal (502-1) with the user information. After that, the firewall apparatus 501 searches the identifier management table 512 using the user name held in 11-3 in FIG. 45 as a search key to extract the common filtering table ID and the individual filtering table ID (15-19, 15-10, 15-11 in FIG. 45).

In this embodiment, since the firewall apparatus 501 needs to hold the identifier management table 512 including various identifiers for all users who may be accommodated, more memory capacity of the firewall apparatus 501 becomes necessary or the number of the users that can be accommodated decreases. However, operations can be performed without performing communication with the identifier management server.

Embodiment 3-4

Figure 46:
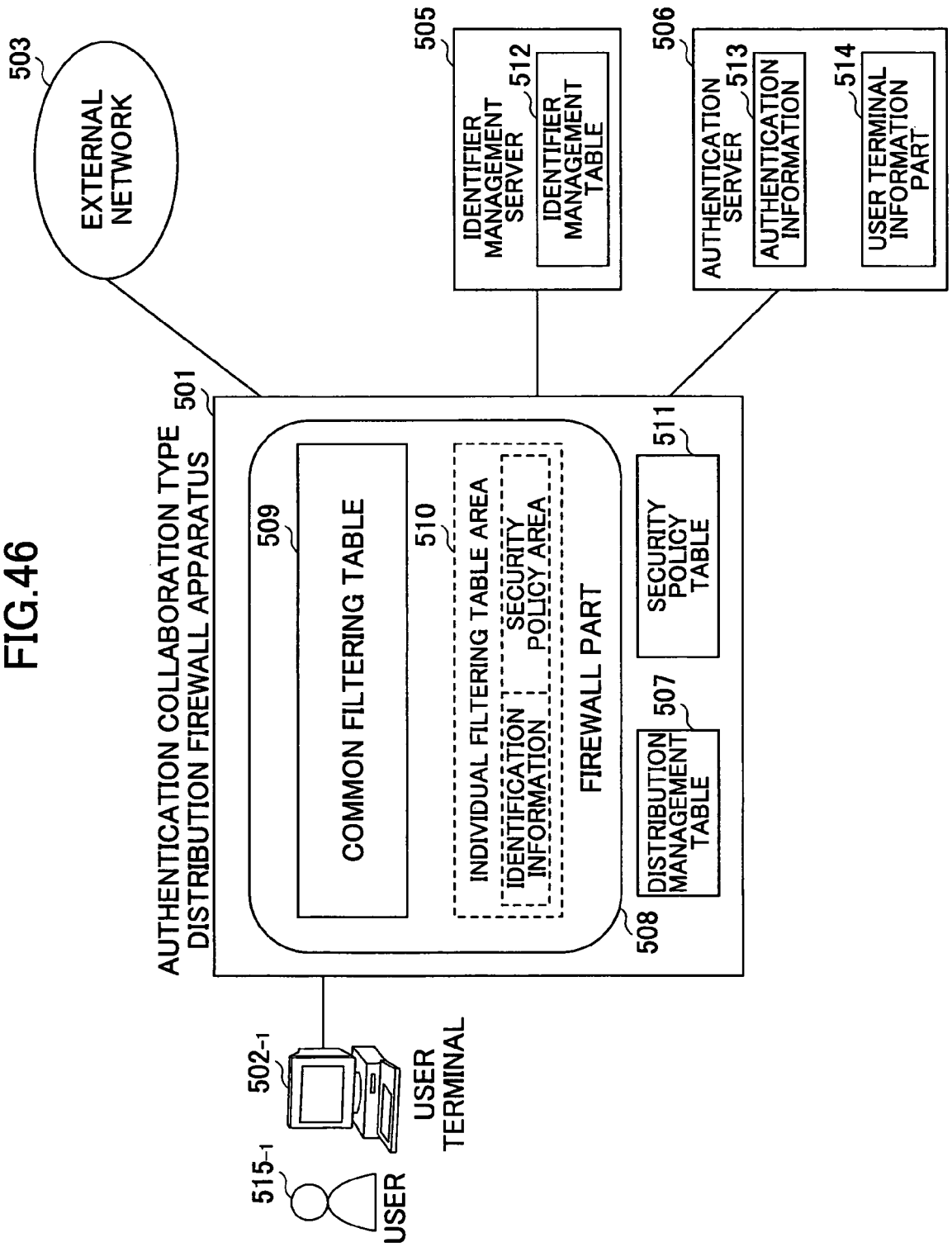
FIG. 46 is a block diagram showing an outline configuration of a firewall apparatus and a network model in which the firewall apparatus is used according to an embodiment 3-4.

FIG. 46 is a block diagram showing an outline configuration of a firewall apparatus of the embodiment 3-4 of the present invention, and a network model in which the firewall apparatus of the embodiment 3-4 of the present invention is used.

This embodiment is different from the before-mentioned embodiment 3-1 in that firewall apparatus 501 holds, in its inside, the security policy table 511 associating user names with various individual security policies held in the security policy server 504.

Figure 47:
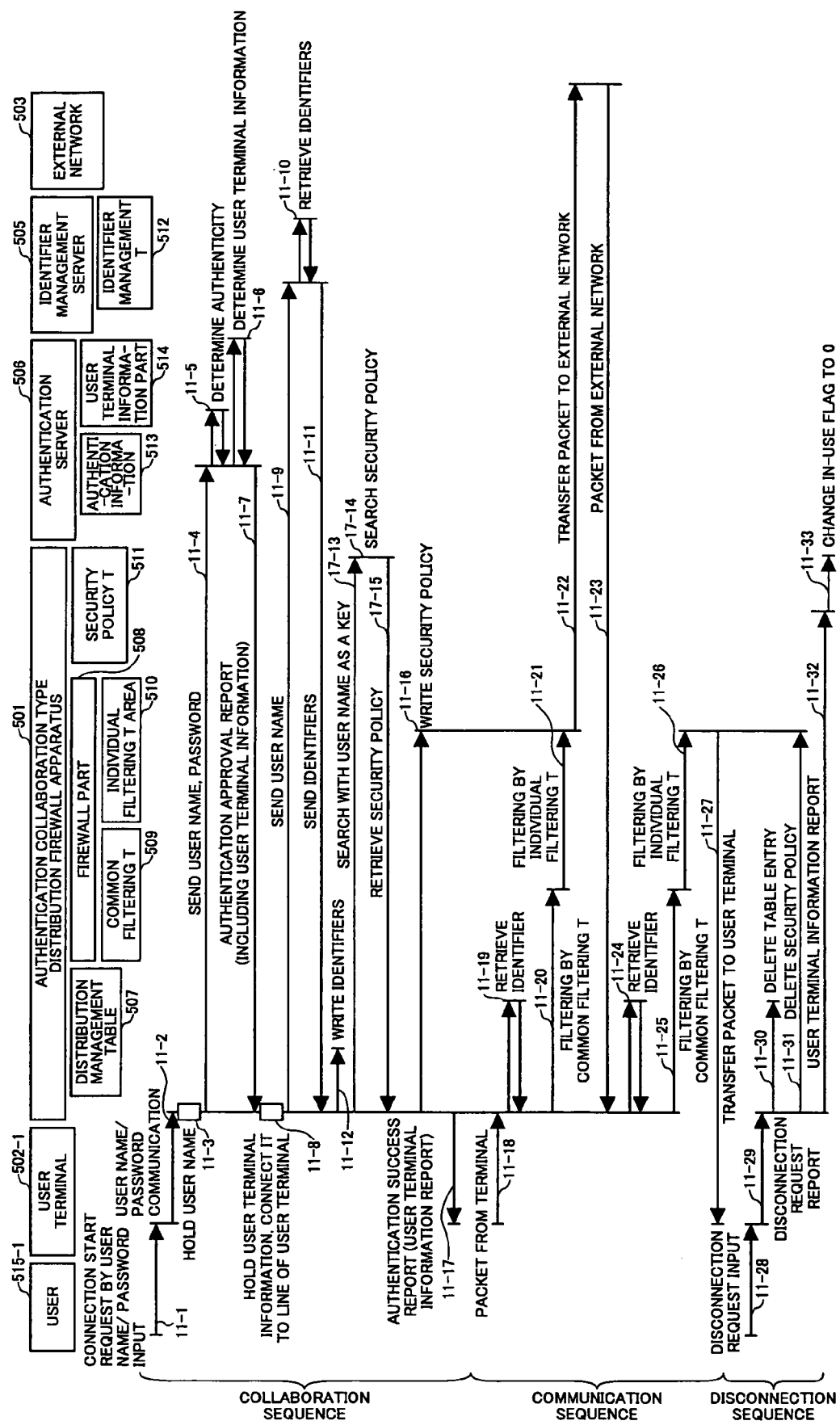
FIG. 47 is a diagram showing an example of a sequence of operations of the network model shown in FIG. 46.

FIG. 47 is a diagram showing an example of a sequence showing operations of the network model shown in FIG. 46. The sequence is different from the sequence shown in FIG. 40 in that communication with the security policy server 504 is deleted, and a sequence for the security policy table 511 held in the inside of the firewall apparatus 501 is newly added.

In the sequence changed from the sequence in FIG. 40, after the firewall apparatus 501 writes various identifiers in the distribution management table 507 in the 11-12 in FIG. 47, the firewall apparatus 501 searches the security policy table 511 using the user name held in 11-3 in FIG. 47 as a search key to extract security policies corresponding to the user name (17-13, 17-14, 17-15 in FIG. 47).

In this embodiment, since the firewall apparatus 501 needs to hold the security policy table 511 including individual security policies for all users who may be accommodated, more memory capacity of the firewall apparatus becomes necessary or the number of the users that may be accommodated decreased. However, operations can be performed without performing communication with the security policy server.

Embodiment 3-5

Figure 48:
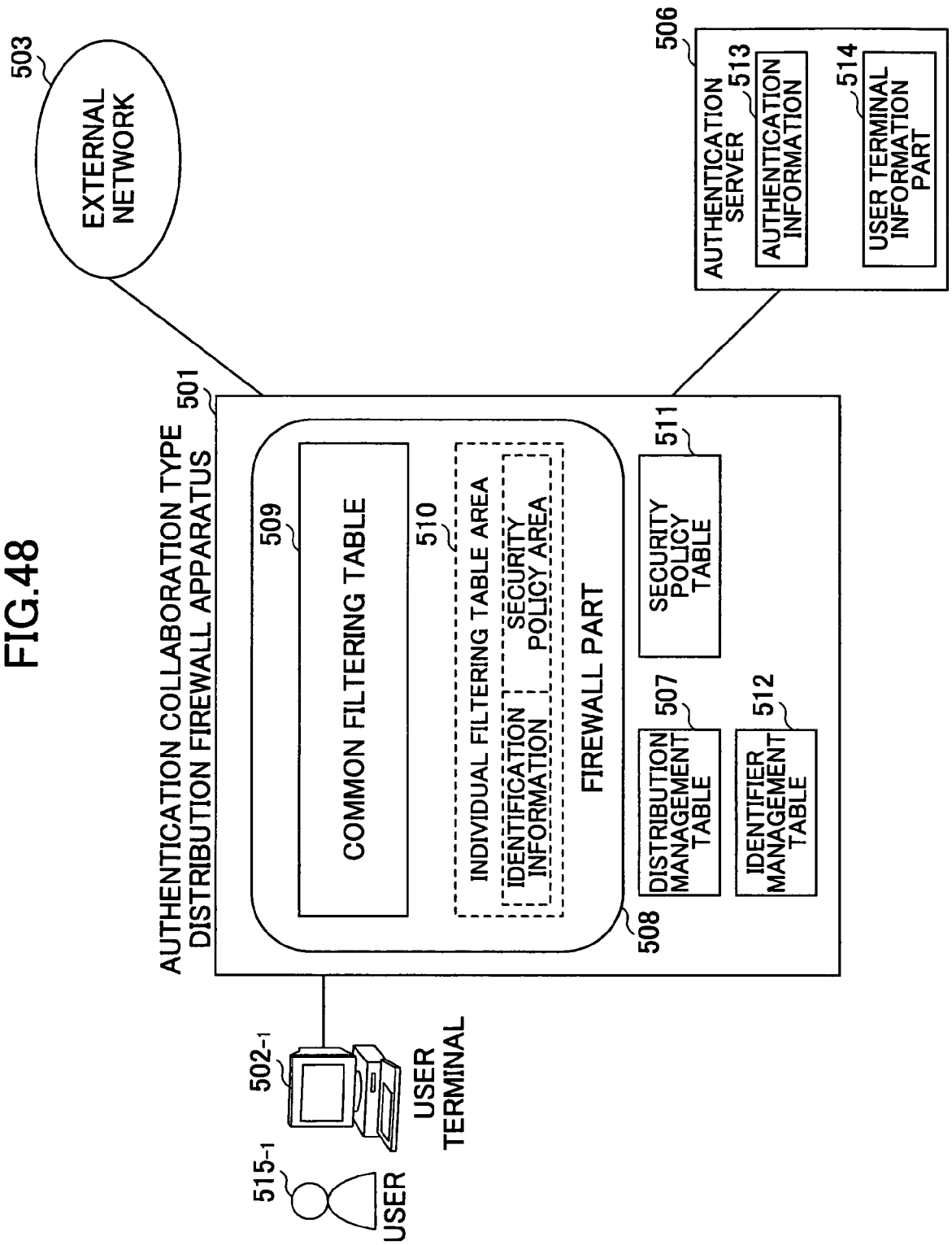
FIG. 48 is a block diagram showing an outline configuration of a firewall apparatus and a network model in which the firewall apparatus is used according to an embodiment 3-5.

FIG. 48 is a block diagram showing an outline configuration of a firewall apparatus of the embodiment 3-5 of the present invention, and a network model in which the firewall apparatus of the embodiment 3-5 of the present invention is used.

This embodiment is different from the before-mentioned embodiment 3-1 in that firewall apparatus 501 holds, in its inside, the security policy table 511 associating user names with various individual security policies held in the security policy server 504 and the identifier management table 512 associating user names with various identifies held in the identifier management server 505.

Figure 49:
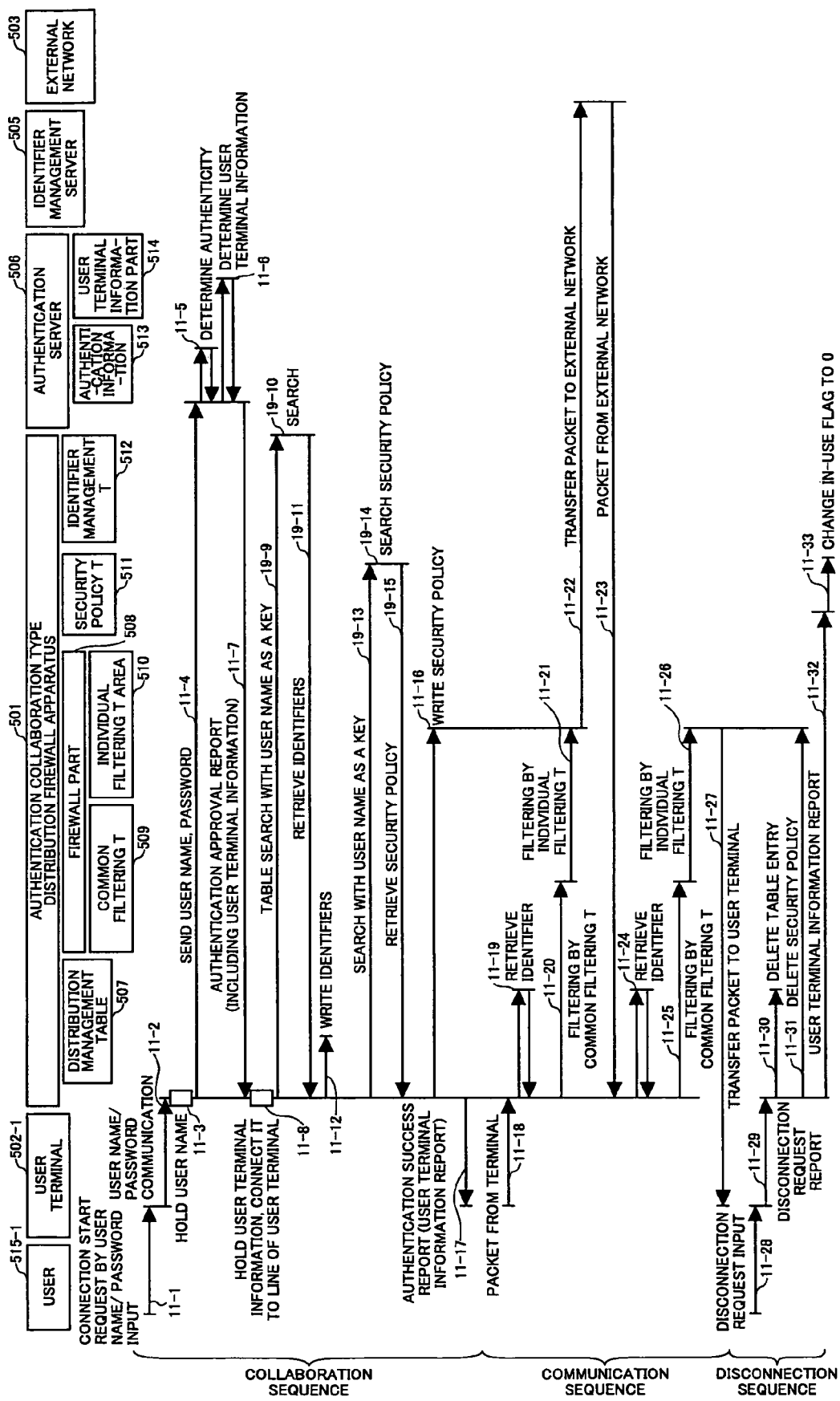
FIG. 49 is a diagram showing an example of a sequence of operations of the network model shown in FIG. 48.

FIG. 49 is a diagram showing an example of a sequence showing operations of the network model shown in FIG. 48. The sequence is different from the sequence shown in FIG. 40 in that communication parts with the security policy server 504 and communication parts with the identifier management server 505 are deleted, and a sequence for the security policy table 511 and a sequence for the identifier management table 512 held in the inside of the firewall apparatus 501 are newly added.

In sequences changed from the sequence in FIG. 40, after the firewall apparatus 501 holds user information received from the authentication server 506, and associates a connection line of the user terminal (502-1) with the user information in 11-8 in FIG. 49, the firewall apparatus 501 searches the identifier management table 512 using the user name held in 11-3 in FIG. 49 as a search key to extract the common filtering table ID and the individual filtering table ID (19-9, 19-10, 19-11 in FIG. 49). In addition to that, after the firewall apparatus 501 writes various identifiers in the distribution management table 507 in the 11-12 in FIG. 47, the firewall apparatus 501 searches the security policy table 511 using the user name held in 11-3 in FIG. 47 as a search key to extract security policies corresponding to the user name (19-13, 19-14, 19-15 in FIG. 49).

In this embodiment, since the firewall apparatus 501 needs to hold the security policy table 511 including individual security policies for all users who may be accommodated, more memory capacity of the firewall apparatus becomes necessary or the number of the users that can be accommodated further decreases, and since the firewall apparatus 501 needs to hold the identifier management table 512 including various identifies for all users who may be accommodated, more memory capacity of the firewall apparatus becomes necessary or the number of the users that can be accommodated further decreases. However, operations can be performed without performing communications with the security policy server and the identifier management server.

Embodiment 3-6

Figure 50:
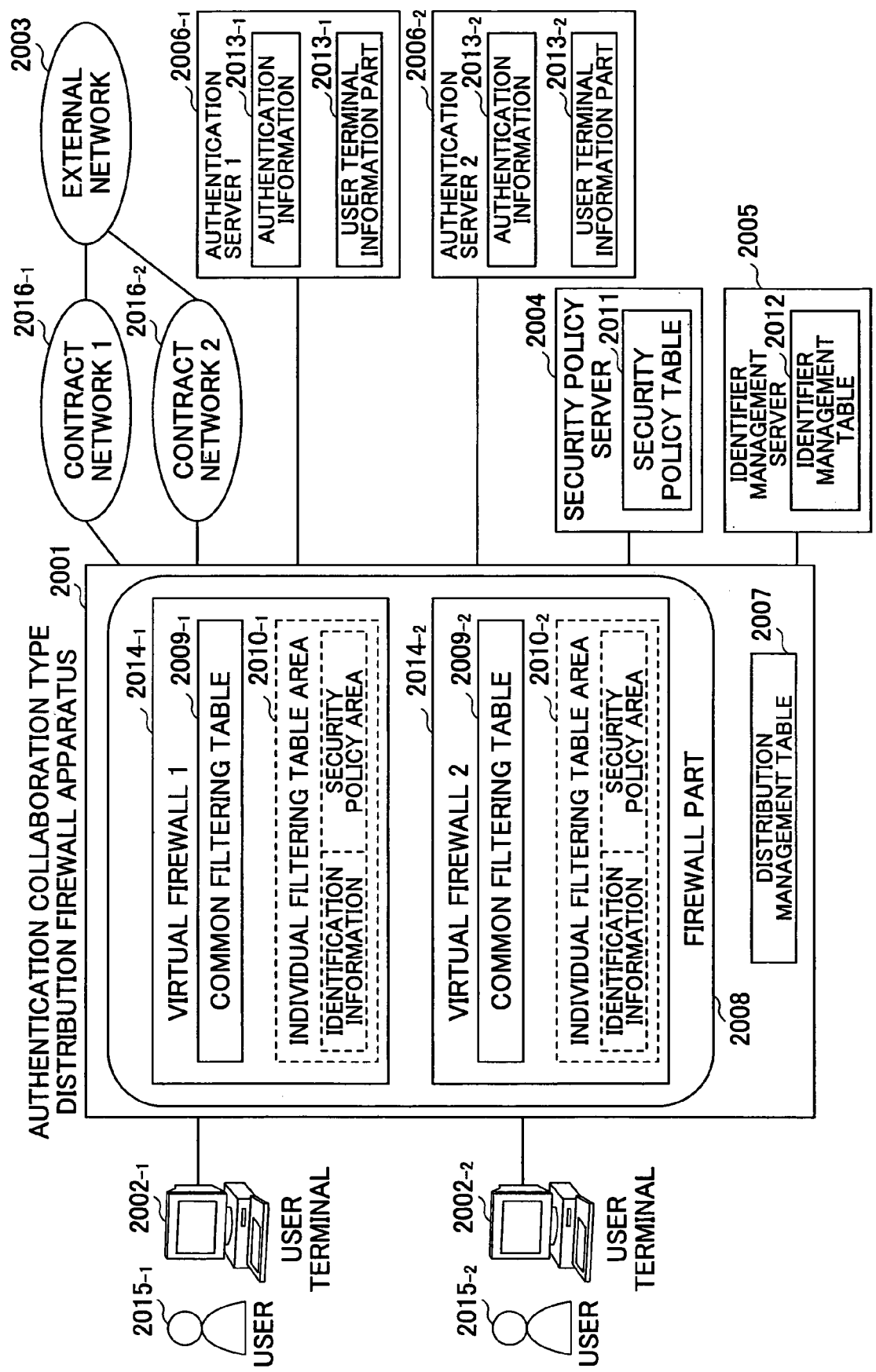
FIG. 50 is a block diagram showing an outline configuration of a firewall apparatus and a network model in which the firewall apparatus is used according to an embodiment 3-6.

FIG. 50 is a block diagram showing an outline configuration of a firewall apparatus of the embodiment 3-6 of the present invention, and a network model in which the firewall apparatus of the embodiment 3-6 of the present invention is used.

The firewall apparatus 2001 accommodates a user terminal (2002-1), used by a user (2015-1), that starts to connect to an external network 2003 via a contract network 1 (ISP: Internet Service Provider, for example) (2016-1) by authentication, and a user terminal (2002-2), used by a user (2015-2), that starts to connect to the external network 2003 via a contract network 2 (2016-2) by authentication.

In addition, the firewall apparatus 2001 is connected to a security policy server 2004 that includes a security policy table 2011 holding security policies specific for users, and connected to an identifier management server 2005 that includes an identifier management table 2012 holding identifiers to be distributed to the firewall apparatus 2001.

Further, the firewall apparatus 2001 is connected to an authentication server 1 (2006-1) that includes authentication information (2013-1) of users, and a user terminal information part (2014-1) holding a pool table including user terminal information to be provided to a user terminal when performing authentication, wherein the authentication server 1 authenticates a user to connect to an external network via the contract network 1.

Further, the firewall apparatus 2001 is also connected to an authentication server 2 (2006-2) that includes authentication information (2013-2) of users, and a user terminal information part (2014-2) holding a pool table including user terminal information to be provided to a user terminal when performing authentication, wherein the authentication server 1 authenticates a user to connect to an external network via the contract network 2.

In addition, the firewall apparatus 2001 includes a distribution management table 2007 for linking user terminal information attached to a received packet, virtual firewalls (2014-1, 2014-2) for filtering the received packet and an identifier to indicate a filtering table with each other.

Further, the firewall apparatus 2001 includes a firewall part 2008 that actually performs filtering. The firewall part 2008 includes a virtual firewall 1 (2014-1) for performing filtering for a packet related to a user terminal connected to the external network 2003 via the contract network 1 (2016-1), and a virtual firewall 2 (2014-2) for performing filtering for a packet related to a user terminal connected to the external network 2003 via the contract network 2 (2016-2).

The virtual firewall 1 (2014-1) includes a common filtering table (2009-1) holding security policies common to plural users for performing filtering by the virtual firewall 1 (2014-1), and an individual filtering table area (2010-1) for holding individual security policies for each user.

The individual filtering table area (2010-1) is divided into an area in which identification information is written, and an area, associated with the area in which identification information is written, in which security policy is written.

Like the virtual firewall 1 (2014-1), the virtual firewall 2 (2014-2) also includes a common filtering table (2009-2) and an individual filtering table area (2010-2), where the individual filtering table area (2010-2) is divided into an area in which identification information is written, and an area associated with the area in which identification information is written, in which security policy is written.

FIG. 51 is a diagram showing details of the authentication information (2013-1) in the authentication server 1 shown in FIG. 50. FIG. 52 is a diagram showing details of the pool table held in the user terminal information part (2014-1) in the authentication server 1 shown in FIG. 50.

Similarly, FIG. 53 is a diagram showing details of the authentication information (2013-2) in the authentication server 2 shown in FIG. 50. FIG. 54 is a diagram showing details of the pool table held in the user terminal information part (2014-2) in the authentication server 2 shown in FIG. 50.

FIG. 55 is a diagram showing a user name sent to the firewall apparatus 2001 via the user terminal (2002-1) by the user (2015-1), and FIG. 56 is a diagram showing a user name sent to the firewall apparatus 2001 via the user terminal (2002-2) by the user (2015-2).

FIG. 57 is a diagram showing details of the identifier management table 2012 in the identifier management server shown in FIG. 50, FIG. 58 is a diagram showing details of the security policy table 2011 in the security policy server shown in FIG. 50.

Figure 59:
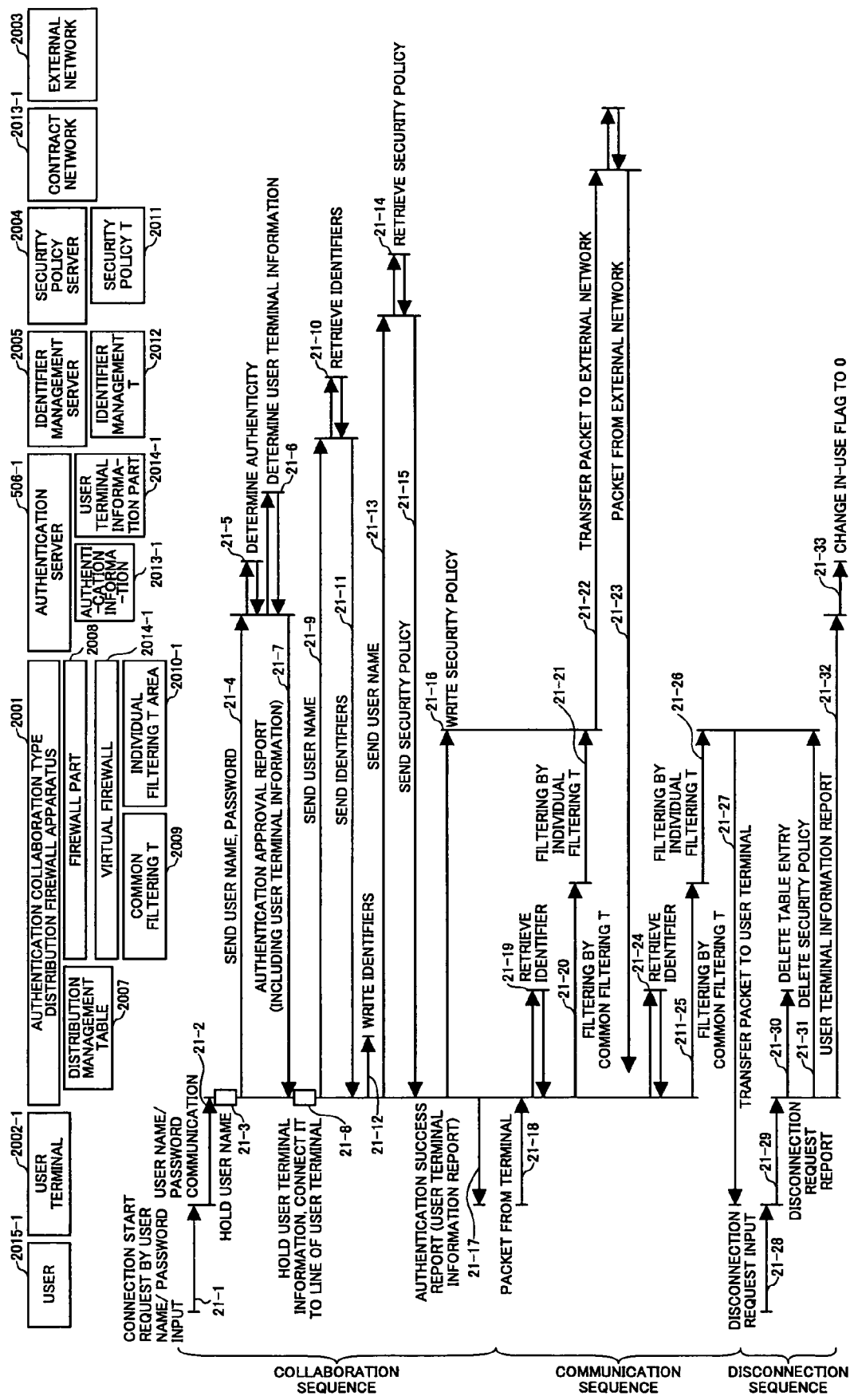
FIG. 59 is a diagram showing one example of a sequence of operations of the network model shown in FIG. 50.
Figure 60:
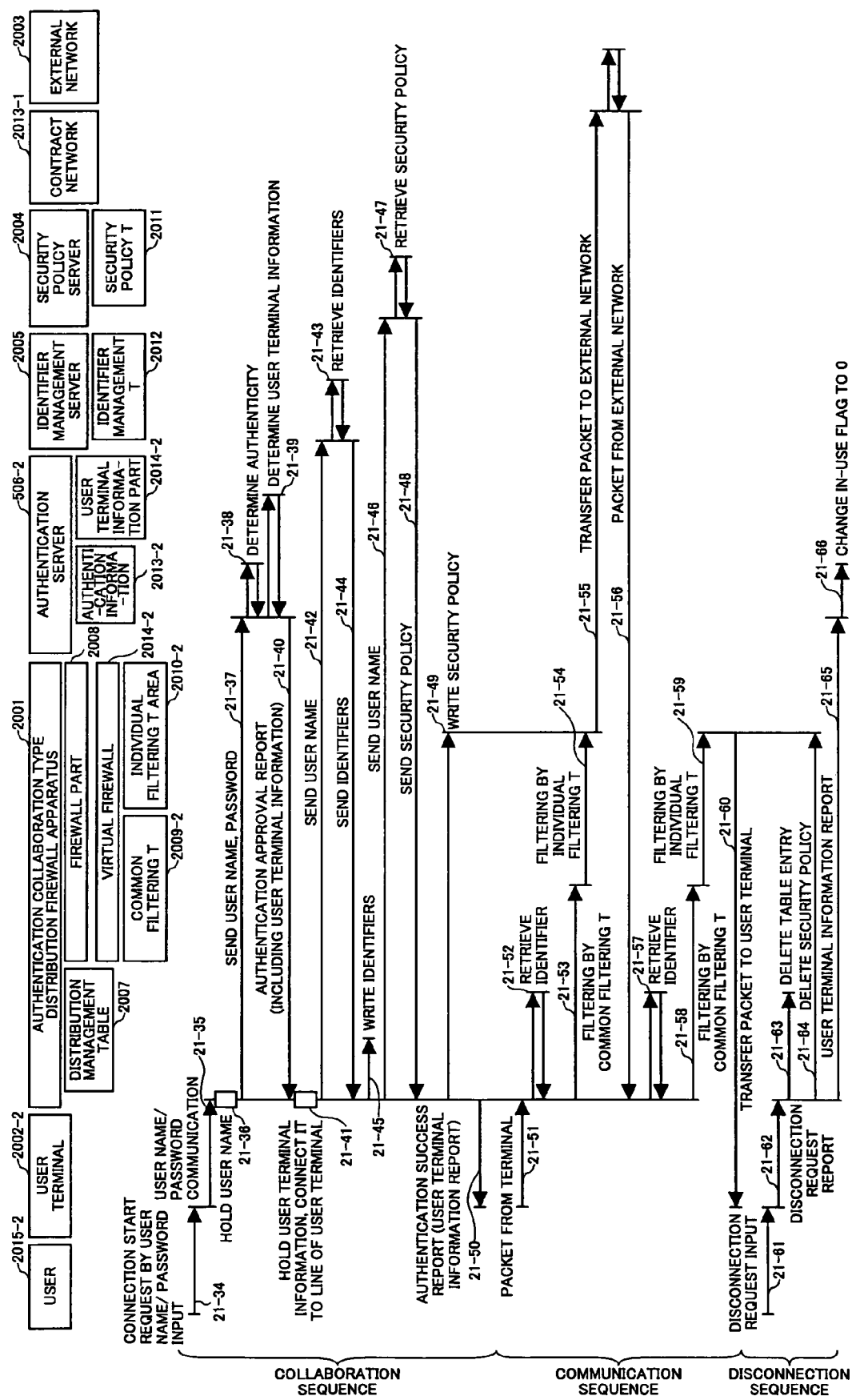
FIG. 60 is a diagram showing another example of a sequence of operations of the network model shown in FIG. 50.

FIGS. 59 and 60 show one example of a sequence of operations of the network model shown in FIG. 50, and FIGS. 59 and 60 show a sequence in which, after the user (2015-1) connects to the external network 2003 via the contract network 1 (2016-1), the user (2015-1) disconnects, and, a sequence in which, after the user (2015-2) connects to the external network 2003 via the contract network 2 (2016-2), the user (2015-2) disconnects.

In the beginning, a connection start sequence of the user (2015-1) is described.

First, the user (2015-1) sends a user name (user 2015-1_2016-1) and a password (α) to the firewall apparatus 2001 via the user terminal (2002-1) (21-1, 21-2 in FIG. 59).

The firewall apparatus 2001 that receives the user name (user 2015-1_2016-1) and the password (α) holds a first half part of the user name (user 2015-1), and determines to send authentication information to the authentication server 1 (2006-1) based on a second half part of the user name so as to send the first half part of the user name (user 2015-1) and the password (α) (21-4 in FIG. 59).

The authentication server 1 (2003-1) retrieves authentication information (2013-1) using the received first half part of the user name (user 2015-1) and the password (α) so as to determine that authentication is possible (21-5 in FIG. 59).

In addition, the authentication server 1 (2003-1) extracts, from the pool table of the user terminal information part (2014-1), usable user terminal information (IP_1) in which the in-use flag is "0" (21-6 in FIG. 59), changes the extracted in-use flag to "1", and reports the extracted user terminal information (IP_1) to the firewall apparatus 2001 with an authentication approval notification (21-7 in FIG. 59).

The firewall apparatus 2001 holds the received user terminal information (IP_1) (21-8 in FIG. 59), and associates the user terminal information (IP_1) with a line to which the user terminal (2002-1) connects, and sends the held first half part of the user name (user 2015-1) to the identifier management server 2005 (21-9 in FIG. 59).

The identifier management server 2005 searches the identifier management table 2012 based on the received first half part (user 2015-1) of the user name so as to extract a virtual firewall ID (virtual 2014-1), a common filtering table ID (common 2009-1), and an individual filtering table ID (individual 2010-1) that are associated with the half part (user 2015-2) of the user name, and sends the identifiers to the firewall apparatus 2001 (21-11 in FIG. 59).

The firewall apparatus 2001 holds the received individual filtering table ID (individual 2010-1), and writes the received virtual firewall ID (virtual 2014-1), the common filtering table ID (common 2009-1), the individual filtering table ID (individual 2010-1) and the holding user terminal information (IP_1) into the distribution management table 2007 (21-12 in FIG. 59).

In addition, the firewall apparatus 2001 sends the holding first half part (user 2015-1) of the user name to the security policy server 2004 (21-13 in FIG. 59).

The security policy server 2004 searches the holding security policy table 2011 based on the received first half part (user 2015-1) of the user name so as to extract individual security policies (rule 1-1~rule 1-*m*) associated with first half part (user 2015-1) of the user name (21-14 in FIG. 59) and sends them to the firewall apparatus 2001 (21-15 in FIG. 59).

The firewall apparatus 2001 writes the holding individual filtering table ID (individual 2010-1) into the identification information area of the individual filtering table area (2010-1), and writes the received individual security policies into the security policy area (21-16 in FIG. 59).

After performing this series of processes, the firewall apparatus 2001 sends an authentication success report including the holding user terminal information (IP_1) to the user terminal (2002-1) (21-17 in FIG. 59).

Then, the connection start sequence ends, so that the user (2015-1) can connect to the external network 2003 via the user terminal (2002-1).

Next, a communication sequence between the user terminal (2002-1) and the external network 2003 is described.

When the user terminal (2002-1) transfers a packet to the external network 2003, the user terminal (2002-1) determines its own address as the user terminal information (IP_1) finally received in the connection start sequence, and adds the address to a packet to transfer the packet to the firewall apparatus 2001 (21-18 in FIG. 59).

The firewall apparatus 2001 extracts the user terminal information (IP_1) from the received packet, searches the distribution management table 2007 using the user terminal information (IP_1) as a key so as to extract the virtual firewall ID (virtual 2014-1), the common filtering table ID (common 2009-1), and the individual filtering table ID (individual 2010-1) (21-19 in FIG. 59).

Next, the firewall apparatus 2001 distributes the received packet to the virtual firewall (2014-1) indicated by the extracted virtual firewall ID (virtual 2014-1), and performs packet filtering using filtering tables indicated by the extracted common filtering table ID (common 2009-1) and the individual filtering table ID (individual 2010-1) in the virtual firewall (2014-1) indicated by the extracted virtual firewall ID (virtual 2014-1) (21-20, 21-21 in FIG. 59). After that, the packet is transferred to the external network 2003 via the contract network 1 (2016-1) (21-22 in FIG. 59).

In a case when the firewall apparatus 2001 receives a packet for the user terminal (2002-1) from the external network 2003 via the contract network 1 (2016-1) (21-23 in FIG. 59) and transfers the packet to the user terminal (2002-1), since the packet received from the external network 2003 includes the user terminal information (IP_1) as a destination address, the firewall apparatus 2001 extracts the user terminal information (IP_1) from the received packet (21-24 in FIG. 59). Then, the firewall apparatus 2001 transfers the packet to the user terminal (2002-1) (21-27 in FIG. 59) after filtering the packet according to a sequence the same as that for transferring a packet from the user terminal (2002-1) to the external network 2003 (21-25, 21-26 in FIG. 59).

Based on the above-mentioned processes, the firewall apparatus 2001 of the present embodiment performs filtering process for packets sent from both directions of the user terminal side and the external network side so as to transfer the packet.

Next, a disconnection sequence from the user (2015-1) is described.

When disconnecting, a disconnection request is sent to the firewall apparatus 2001 (21-28, 21-29 in FIG. 59) from the user (2015-1) via the user terminal (2002-1).

When the firewall apparatus 2001 receives the disconnection request, the firewall apparatus 2001 checks a line via which the request is received, and derives the user terminal information (IP-1) that is associated with the line in the connection start sequence.

Based on the user terminal information (IP_1), the firewall apparatus 2001 extracts the virtual firewall ID (virtual 2014-1) and the individual filtering table ID (individual 2010-1) from an entry associated with the user terminal information (IP-1) in the distribution management table 2007, and deletes the entry (21-30 in FIG. 59).

Next, the firewall apparatus 2001 deletes identification information in which the extracted individual filtering table ID (individual 2010-1) is written and deletes the security policy area associated with the identification information in the individual filtering table area (2010-1) in the virtual firewall 1 (2014-1) indicated by the extracted virtual firewall ID (virtual 2014-1) (21-31 in FIG. 59).

In addition, the firewall apparatus sends the derived user terminal information (IP-1) to the authentication server 1 (2006-1) (21-32 in FIG. 59).

The authentication server 1 (2006-1) restores, to "0", the in-use flag in an entry associated with the received user terminal information (IP_1) in the pool table in the user terminal information part (2014-1) (21-33 in FIG. 59).

In this way, information in various tables changed in the connection sequence is restored to an state before the connection, so that the disconnection sequence ends.

A connection start sequence, a communication sequence and a disconnection sequence are performed for the user (2015-2) in the same way for the user (2015-1) (21-34~21-66 in FIG. 60).

As mentioned above, in the present embodiment, the firewall apparatus 2001 operates as plural firewalls, so that a user can be authenticated for each firewall by the individual authentication server (2006-1, 2006-2), the user can connect to the external network 2003 via the contract network (2016-1, 2016-2) for each firewall, and security policies can be loaded for each user.

In the above-mentioned description, although a case is described where each of the security server (504, 2004) and the identifier management server (505, 2005) is one machine, each firewall apparatus in this embodiment can be connected to two security servers having the same security table, or can be connected to two security policy servers having the same identifier management table.

Effects of the embodiments 3-1~3-6

According to the firewall apparatus of the embodiments 3-1~3-6, when an accommodating network or terminal dynamically performs connection and disconnection, or when the firewall apparatus by which the network or the terminal is accommodated is changed, it becomes possible to keep the optimal security policy capacity, so that the security policy amount to be loaded into the firewall apparatus can be reduced.

Figure 61:
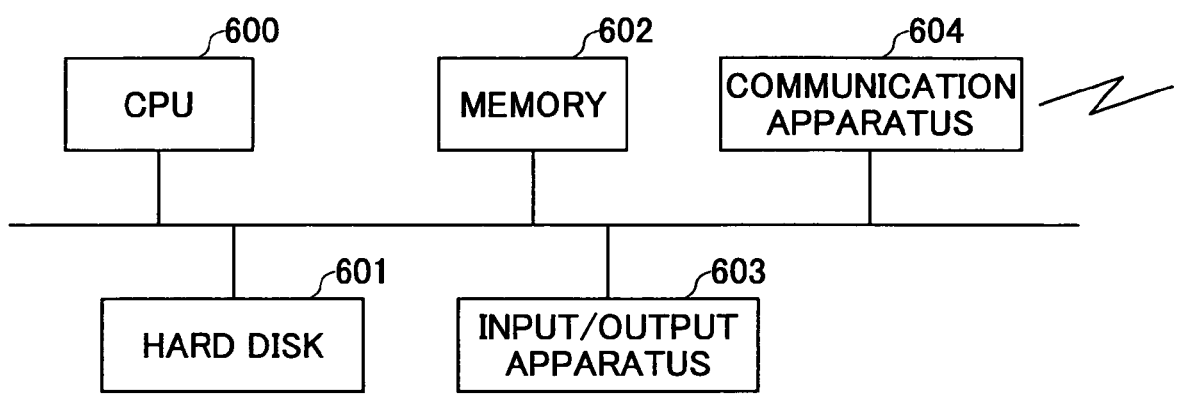
FIG. 61 is a diagram showing a configuration example of a computer system.

The firewall apparatus described so far in each embodiment can be realized by loading a program performing processes described in each embodiment into a computer system including a communication apparatus, for example. The computer system includes a CPU 600, a memory 602, a hard disk 601, and input-output apparatus 603 and a communication apparatus 604 as illustrated in FIG. 61, for example. Data held in processes in each embodiment are held in the memory 601, for example. In addition, the communication apparatus 604 is used as communication means with other servers. A router and the like are included in the computer system.

The present invention is not limited to the specifically disclosed embodiments, and variations and modifications may be made without departing from the scope of the invention.

The invention claimed is:

1. A firewall apparatus including plural virtual firewalls, each virtual firewall including a dependent firewall policy, the firewall apparatus comprising:
a distribution management table for managing a user name and a virtual firewall ID;
a part configured to receive authentication information for a network connection from a user terminal, and hold the user name included in the authentication information;
a part configured to report the authentication information to an authentication server; and
a part configured to receive an authentication response from the authentication server, and hold a user ID, included in the authentication response, to be provided to the user terminal, wherein,
the firewall apparatus registers the user ID in the distribution management table by associating the user ID with the user name,
after a connection between the user terminal and a network is established, the firewall apparatus searches the distribution management table by using a source user ID of a packet sent from the user terminal as a search key, and retrieves the virtual firewall ID associated with the source user ID so as to distribute the packet sent from a communication partner terminal to a virtual firewall corresponding to the virtual firewall ID, and
the firewall apparatus searches the distribution management table by using a destination user ID of a packet sent from the communication partner terminal of the user terminal as the search key, and retrieves the virtual firewall ID associated with the destination user ID so as to distribute the packet sent from the communication partner terminal to the virtual firewall corresponding to the virtual firewall ID.

2. The firewall apparatus as claimed in claim 1, wherein:
the authentication server authenticates a user requesting the network connection,
the user ID to be provided to the user terminal is reported to the user terminal, and
the user terminal is provided with the user ID only after a report of the user ID is received.

3. The firewall apparatus as claimed in claim 1, wherein when the authentication response from the authentication server indicates an authentication error, the firewall apparatus reports the authentication error to the user terminal without registering the user ID in the distribution management table.

4. The firewall apparatus as claimed in claim 1, wherein when the user name included in the authentication information for the network connection sent from the user terminal is not registered in the distribution management table, the firewall apparatus does not register the user ID included in the authentication response from the authentication server in the distribution management table, and after the connection between the user terminal and the network is established, the firewall apparatus distributes the packet sent from the user terminal corresponding to the user ID to a virtual firewall for unregistered users, and the firewall apparatus distributes the packet sent from the communication partner terminal of the user terminal corresponding to the user ID to the virtual firewall for unregistered users.

5. The firewall apparatus as claimed in claim 1, wherein when the user name included in the authentication information for the network connection sent from the user terminal is not registered in the distribution management table, the firewall apparatus registers, in the distribution management table, the user ID included in the authentication response from the authentication server and a virtual firewall ID for unregistered users.

6. The firewall apparatus as claimed in claim 1, wherein when the user name included in the authentication information for the network connection sent from the user terminal is not registered in the distribution management table, the firewall apparatus reports an authentication error to the user terminal.

7. The firewall apparatus as claimed in any one of claims 1 or 2-6 wherein,
the authentication server is a Radius server,
the user ID is a user IP address,
the network is the Internet, and
the network connection from the user terminal uses PPP (Point to Point Protocol).

8. A firewall apparatus comprising:
a distribution management table for managing a user name, a user ID, a virtual firewall and a filtering ID associating them with each other;

a filtering table, being specified by the virtual firewall ID and the filtering ID, including a dependent filtering policy;

a part configured to receive authentication information, issued by a user terminal when starting a network connection, so as to hold the user name;

a part configured to report the authentication information to an authentication server;

a part configured to receive an authentication response from the authentication server so as to hold a user ID, included in the authentication response, to be provided to the user terminal, wherein, the firewall apparatus registers the user ID in the distribution management table associating the user ID with the user name, after a connection between the user terminal and a network is established, the firewall apparatus searches the distribution management table by using a source user ID of a packet sent from the user terminal as a search key, and retrieves the virtual firewall ID and the filtering ID associated with the source user ID so as to distribute the packet sent from the user terminal to a virtual firewall corresponding to the virtual firewall ID and provide the filtering ID to the packet sent from the user terminal, the firewall apparatus searches the distribution management table by using a destination user ID of a packet sent from a communication partner terminal of the user terminal as the search key, and retrieves the virtual firewall ID and the filtering ID associated with the destination user ID so as to distribute the packet sent from the communication partner terminal of the user terminal to a virtual firewall corresponding to the virtual firewall ID and provide the filtering ID to the packet sent from the communication partner terminal of the user terminal, and the firewall apparatus passes or discards a packet to which the filtering ID is provided according to a filtering policy included in the filtering table specified by the filtering ID in the virtual firewall specified by the virtual firewall ID.

9. The firewall apparatus as claimed in claim 8, wherein when the user name is included in the authentication information issued by the user terminal when starting the network connection and is not registered in the distribution management table, the firewall apparatus does not register the user ID included in the authentication response from the authentication server in the distribution management table, and the firewall apparatus processes the packet sent from the user terminal corresponding to the user ID or the packet sent from the communication partner terminal of the user terminal according to a filtering policy for unregistered users.

10. The firewall apparatus as claimed in claim 8, wherein when the user name is included in the authentication information issued by the user terminal when starting the network connection and is not registered in the distribution management table, the firewall apparatus registers the user ID included in the authentication response from the authentication server and a filtering ID for unregistered users in the distribution management table.

11. A firewall apparatus comprising:

a distribution management table for managing a user name, a user ID, a virtual firewall ID, and an individual filtering ID, and a common filtering ID associating them with each other;

an individual filtering table associated with the individual filtering ID; a common filtering table associated with the common filtering ID;

a part configured to receive authentication information, issued by a user terminal when starting a network connection, so as to hold the user name;

a part configured to report the authentication information to an authentication server;

a part configured to receive an authentication response from the authentication server so as to hold a user ID, included in the authentication response, to be provided to the user terminal, wherein, the firewall apparatus registers the user ID in the distribution management table associating the user ID with the user name, after a connection between the user terminal and a network is established, the firewall apparatus searches the distribution management table by using a source user ID of a packet sent from the user terminal as a search key, and retrieves the virtual firewall ID, the individual filtering ID and the common filtering ID associated with the source user ID so as to distribute the packet sent from the user terminal to a virtual firewall corresponding to the virtual firewall ID and provide the individual filtering ID and the common filtering ID to the packet sent from the user terminal, the firewall apparatus searches the distribution management table by using a destination user ID of a packet sent from a communication partner terminal of the user terminal as the search key, and retrieves the virtual firewall ID, the individual filtering ID and the common filtering ID associated with the destination user ID so as to distribute the packet sent from the communication partner terminal of the user terminal to a virtual firewall corresponding to the virtual firewall ID and provide the individual filtering ID and the common filtering ID to the packet sent from the communication partner terminal of the user terminal, and the firewall apparatus passes or discards a packet to which the individual filtering ID and the common filtering ID are provided according to a filtering policy included in the individual filtering table specified by the individual filtering ID and according to a filtering policy included in the common filtering table specified by the common filtering ID.

12. A firewall apparatus, comprising:

a distribution management table for associating a user name, a user ID, a virtual firewall ID, and a filtering ID with each other;

plural virtual firewalls, each being specified by the filtering ID, each including at least a filtering table being specified by the filtering ID;

a part configured to receive authentication information, issued by a user terminal when starting a network connection, so as to hold the user name;

a part configured to report the authentication information to an authentication server;

a part configured to receive an authentication response from the authentication server so as to hold the user ID, included in the authentication response, to be provided to the user terminal, wherein, the firewall apparatus registers the user ID in the distribution management table by associating the user ID with the user name, after a connection between the user terminal and a network is established, the firewall apparatus searches the distribution management table by using a source user ID of a packet sent from the user terminal as a search key, and retrieves the virtual firewall ID and the filtering ID associated with the source user ID so as to distribute the packet sent from the user terminal to a virtual firewall specified by the virtual firewall ID and to provide the filtering ID to the packet sent from the user terminal, the firewall apparatus searches the distribution management table by using a destination user ID of a packet sent from a communication partner terminal of the user terminal as the search key, and retrieves the virtual firewall ID and the filtering ID associated with the destination user ID so as to distribute the packet sent from the communication partner terminal of the user terminal to the virtual firewall specified by the virtual firewall ID and to provide the filtering ID to the packet sent from the communication partner terminal of the user terminal, and the firewall apparatus passes or discards a packet to which the filtering ID is provided according to a filtering policy included in the filtering table specified by the filtering ID.

13. The firewall apparatus as claimed in claim 12, wherein, when the user name is included in the authentication information issued from the user terminal when starting the network connection and is not registered in the distribution management table, the firewall apparatus does not register the user ID included in the authentication response from the authentication server in the distribution management table, and the firewall apparatus processes the packet sent from the user terminal corresponding to the user ID or the packet sent from the communication partner terminal of the user terminal corresponding to the user ID according to a filtering policy for unregistered users.

14. The firewall apparatus as claimed in claim 12, wherein when the user name is included in the authentication information issued from the user terminal when starting the network connection and is not registered in the distribution management table, the firewall apparatus registers, in the distribution management table, the user ID included in the authentication response from the authentication server and the virtual firewall ID for unregistered users.

15. The firewall apparatus as claimed in claim 8, wherein when the authentication response from the authentication server indicates an authentication error, the firewall apparatus reports the authentication error to the user terminal without registering the user ID in the distribution management table.

16. The firewall apparatus as claimed in claim 8, wherein when the user name is included in the authentication information issued from the user terminal when starting the network connection and is not registered in the distribution management table, the firewall apparatus reports an authentication error to the user terminal.

17. The firewall apparatus as claimed in any one of claims 8, 9-12, or 13-16, or wherein the filtering table does not include, as an element of a filtering policy, the user ID to be provided to the user terminal.

18. The firewall apparatus as claimed in claim 17, wherein, the authentication server is a Radius server,
the user ID is a user IP address,
the network is the Internet, and
the network connection from the user terminal uses PPP.

19. A firewall apparatus, comprising:
a distribution management table for associating a user name, a user ID, a virtual firewall ID, an individual filtering ID, and a common filtering ID with each other;
a virtual firewall including an individual filtering table corresponding to the individual filtering ID and a common filtering table corresponding to the common filtering ID;

a part configured to receive authentication information, issued by a user terminal when starting a network connection, so as to hold the user name;
a part configured to report the authentication information to an authentication server; and
a part configured to receive an authentication response from the authentication server so as to hold the user ID, included in the authentication response, to be provided to the user terminal, wherein,
the firewall apparatus registers the user ID in the distribution management table by associating the user ID with the user name,
after a connection between the user terminal and a network is established, the firewall apparatus searches the distribution management table by using a source user ID of a packet sent from the user terminal as a search key, and retrieves the virtual firewall ID, the individual filtering ID and the common filtering ID associated with the source user ID so as to distribute the packet sent from the user terminal to the virtual firewall specified by the virtual firewall ID and to provide the individual filtering ID and the common filtering ID to the packet sent from the user terminal,
the firewall apparatus searches the distribution management table by using a destination user ID of a packet sent from a communication partner terminal of the user terminal as the search key, and retrieves the virtual firewall ID, and the individual filtering ID, and the common filtering ID associated with the destination user ID so as to distribute the packet sent from the communication partner terminal of the user terminal to the virtual firewall specified by the virtual firewall ID and to provide the individual filtering ID and the common filtering ID to the packet sent from the communication partner terminal of the user terminal, and
the firewall apparatus passes or discards, in the virtual firewall, a packet to which the individual filtering ID and the common filtering ID are provided according to a filtering policy included in the individual filtering table specified by the individual filtering ID and according to a filtering policy included in the common filtering table specified by the common filtering ID.

20. The firewall apparatus as claimed in any one of claims 8, 13 or 16, wherein,
the authentication server is a Radius server,
the user ID is a user IP address,
the network is the Internet, and
the network connection from the user terminal uses PPP.

21. The firewall apparatus as claimed in any one of claims 11 and 19, wherein
the individual filtering table does not include, as an element of a filtering policy, the user ID to be provided to the user terminal.

22. The firewall apparatus as claimed in any of claim 21, wherein
the authentication server is a Radius server,
the user ID is a user IP address,
the network is the Internet, and
the network connection from the user terminal uses PPP.

23. A firewall apparatus provided between a plurality of user terminals and a network and performing filtering for the user terminals, the firewall apparatus comprising:
an individual filtering table holding security policies for each user;
a common filtering table holding a security policy common to plural users;

a distribution management table for managing user terminal information, a virtual firewall ID, a common filtering table ID, and an individual filtering table ID;

a communication part configured to communicate with an authentication server determining whether the user terminal is connectable;

a communication part configured to communicate with an identifier management server managing the virtual firewall ID, the common filtering table ID and the individual filtering table ID associated with a user;

a communication part configured to communicate with a security policy management server managing correspondence between a user-specific security policy to be written into the individual filtering table and the user, wherein, the firewall apparatus receives a connection request with authentication information including a user name from the user terminal when starting a network connection, holds the user name, reports the user name to the authentication server, holds user terminal information accompanied by an authentication response received from the authentication server, reports the user name to the identifier management server and to the security policy management server, writes the virtual firewall ID, the common filtering table ID, the individual filtering table ID and the user terminal information received from the identifier management server into the distribution management table, associated with each other, and writes policy information received from the security policy management server and the individual filtering table ID into the individual filtering table, after a connection between the user terminal that issues the connection request and the network is established, the firewall apparatus receives a packet sent from the user terminal or sent to the user terminal, the firewall apparatus searches the distribution management table using the user terminal information, included in the packet, as a search key so as to retrieve the virtual firewall ID, the common filtering table ID and the individual filtering table ID associated with the user terminal information, and the firewall apparatus distributes the packet to a virtual firewall indicated by the virtual firewall ID and filters the packet using the common filtering table corresponding to the common filtering table ID and the individual filtering table corresponding to the individual filtering table ID.

24. The firewall apparatus as claimed in claim 23, wherein when the user terminal disconnects the connection to the network, the firewall apparatus receives a disconnection request from the user terminal, searches the distribution management table using the user terminal information as the search key so as to retrieve the individual filtering table ID from an entry associated with the user terminal information and to invalidate the entry associated with the user terminal information, and the firewall apparatus invalidates information in the individual filtering table corresponding to the individual filtering table ID.

25. The firewall apparatus as claimed in claim 23, wherein, the security policy management server includes a security policy table in which the user name is associated with at least a security policy, and the firewall apparatus communicates with at least a security policy server including a similar security policy table.

26. The firewall apparatus as claimed in claim 23, wherein, the identifier management table includes the user name, the common filtering table ID, and the individual filtering table ID associated with each other, and the firewall apparatus communicates with at least one identifier management server including a similar identifier management table.

27. A firewall apparatus provided between a plurality of user terminals and a network and performing filtering for the user terminals, the firewall apparatus comprising:

at least a virtual firewall performing packet filtering for plural users;

at least an individual filtering table holding security policies for each user;

at least a common filtering table holding a security policy common to plural users;

a distribution management table for managing user terminal information, a virtual firewall ID, a common filtering table ID, and an individual filtering table ID;

a communication part configured to communicate with an authentication server determining whether a user terminal is connectable;

a communication part configured to communicate with an identifier management server managing the virtual firewall ID, the common filtering table ID and the individual filtering table ID associated with a user;

a communication part configured to communicate with a security policy management server managing correspondence between a user-specific security policy to be written into the individual filtering tablet and the user, wherein, the firewall apparatus receives a connection request with authentication information including a user name from the user terminal when starting a network connection, holds the user name, reports the user name to the authentication server, holds the user terminal information accompanied by an authentication response received from the authentication server, reports the user name to the identifier management server and to the security policy management server, writes the virtual firewall ID, the common filtering table ID, the individual filtering table ID and the user terminal information received from the identifier management server into the distribution management table, associated with each other, and writes policy information received from the security policy management server and the individual filtering table ID into the individual filtering table of the virtual firewall indicated by the virtual firewall ID, after a connection between the user terminal that issued the connection request and the network is established, the firewall apparatus receives a packet sent from the user terminal or sent to the user terminal, the firewall apparatus searches the distribution management table using the user terminal information, included in the packet, as a search key so as to retrieve the virtual firewall ID, the common filtering table ID and the individual filtering table ID associated with the user terminal information, and the firewall apparatus distributes the packet to the virtual firewall indicated by the virtual firewall ID, and filters the packet using the common filtering table corresponding to the common filtering table ID and the individual filtering table corresponding to the individual filtering table ID.

28. The firewall apparatus as claimed in claim 27, wherein, when the user terminal disconnects the connection to the network, the firewall apparatus receives a disconnection request from the user terminal, searches the distribution management table using the user terminal information as the search key so as to retrieve the virtual firewall ID and the individual filtering table ID from an entry associated with the user terminal information and to invalidate the entry associated with the user terminal information, and the firewall apparatus invalidates information in the individual filtering table corresponding to the individual filtering table ID, wherein the individual filtering table is held in the virtual firewall corresponding to the virtual firewall ID.

29. The firewall apparatus as claimed in claim 27, wherein, virtual firewalls are in a one-to-one correspondence with contract networks connected to the network, and the firewall apparatus accommodates the contract networks, a number of the contract networks being a same as a number of the virtual firewalls.

30. The firewall apparatus as claimed in claim 29, wherein, plural authentication servers are provided for each contract network, and the firewall apparatus determines authentication server based on the user name included in the connection request issued from the user terminal to perform authentication.

31. The firewall apparatus as claimed in claim 27, wherein, the identifier management server includes the identifier management table including the user name, the virtual firewall ID, the common filtering table ID, and the individual filtering table ID associated with each other, and the firewall apparatus communicates with at least one identifier management server including a similar identifier management table.

32. A firewall apparatus provided between a plurality of user terminals and a network and performing filtering for the user terminals, the firewall apparatus comprising:

an individual filtering table holding security policies for each user;

a common filtering table holding a security policy common to plural users;

a distribution management table for managing user terminal information, a common filtering table ID, and an individual filtering table ID;

a communication part configured to communicate with an authentication server determining whether a user terminal is connectable;

a communication part configured to communicate with an identifier management server managing the common filtering table ID and the individual filtering table ID associated with a user, wherein, the firewall apparatus receives a connection request with authentication information including a user name from the user terminal when starting a network connection, holds the user name, reports the user name to the authentication server, holds the user terminal information accompanied by an authentication response received from the authentication server, reports the user name to the identifier management server, writes the common filtering table ID, the individual filtering table ID and the user terminal information received from the identifier management server into the distribution management table, associated with each other, and searches a security policy table using the user name as a key to retrieve policy information associated with the user name, and writes the policy information and the individual filtering table ID into the individual filtering table, after a connection between the user terminal that issued the connection request and the network is established, the firewall apparatus receives a packet sent from the user terminal or sent to the user terminal, the firewall apparatus searches the distribution management table using the user terminal information included in the packet as a search key so as to retrieve a virtual firewall ID, the common filtering table ID and the individual filtering table ID associated with the user terminal information, and the firewall apparatus distributes the packet to a virtual firewall indicated by the virtual firewall ID, and filters the packet using the common filtering table corresponding to the common filtering table ID and the individual filtering table corresponding to the individual filtering table ID.

33. A firewall apparatus provided between a plurality of user terminals and a network and performing filtering for the user terminals, the firewall apparatus comprising:

an individual filtering table holding security policies for each user;

a common filtering table holding a security policy common to plural users;

a distribution management table for managing user terminal information, a common filtering table ID, and an individual filtering table ID;

an identifier management table in which a user name, a common filtering table ID and an individual filtering table ID are associated with each other;

a communication part configured to communicate with an authentication server determining whether a user terminal is connectable;

a communication part configured to communicate with a security policy management server managing correspondence between the security policy specific to a user to be written into the individual filtering table, and the user, wherein, the firewall apparatus receives a connection request with authentication information including a user name from the user terminal when starting a network connection, holds the user name, reports the user name to the authentication server, holds the user terminal information accompanied by an authentication response received from the authentication server, reports the user name to the security policy management server, searches the identifier management table using the user name as a key to retrieve the common filtering table ID and the individual filtering table ID associated with the user name, and writes the common filtering table ID, the individual filtering table ID and the user terminal information into the distribution management associating table, associated with each other, and writes policy information received from the security policy management server and the individual filtering table ID into the individual filtering table, after a connection between the user terminal that issued the connection request and the network is established, the firewall apparatus receives a packet sent from the user terminal or sent to the user terminal, the firewall apparatus searches the distribution management table using the user terminal information, included in the packet, as a search key so as to retrieve a virtual firewall ID, the common filtering table ID and the individual filtering table ID associated with the user terminal information, and the firewall apparatus distributes the packet to a virtual firewall indicated by the virtual firewall ID, and filters the packet using the common filtering table corresponding to the common filtering table ID and the individual filtering table corresponding to the individual filtering table ID.

34. A firewall apparatus provided between a plurality of user terminals and a network and performing filtering for the user terminals, the firewall apparatus comprising:
an individual filtering table holding security policies for each user;
a common filtering table holding a security policy common to plural users;
a distribution management table for managing user terminal information, a common filtering table ID, and an individual filtering table ID;
a security policy table in which a user name is associated with at least a security policy;
an identifier management table in which the user name, the common filtering table ID and the individual filtering table ID are associated with each other;
a communication part configured to communicate with an authentication server determining whether a user terminal is connectable, wherein,
the firewall apparatus receives a connection request with authentication information including the user name from the user terminal when starting a network connection, holds the user name, reports the user name to the authentication server, holds the user terminal information accompanied by an authentication response received from the authentication server, searches the identifier management table using the user name as a key to retrieve the common filtering table ID and the individual filtering table ID associated with the user name, and writes the common filtering table ID, the individual filtering table ID and the user terminal information into the distribution management table, associated with each other, and searches the security policy table using the user name as a key to retrieve policy information associated with the user name, and writes the policy information and the individual filtering table ID into the individual filtering table,
after a connection between the user terminal that issued the connection request and the network is established, the firewall apparatus receives a packet sent from the user terminal or sent to the user terminal,
the firewall apparatus searches the distribution management table using the user terminal information, included in the packet, as a search key so as to retrieve a virtual firewall ID, the common filtering table ID and the individual filtering table ID associated with the user terminal information, and
the firewall apparatus distributes the packet to a virtual firewall indicated by the virtual firewall ID, and filters the packet using the common filtering table corresponding to the common filtering table ID and the individual filtering table corresponding to the individual filtering table ID.

35. A firewall apparatus provided between a plurality of user terminals and a network and performing filtering for the user terminals, the firewall apparatus comprising:
at least a virtual firewall performing packet filtering for plural users;
at least an individual filtering table holding security policies for each user;
at least a common filtering table holding a security policy common to plural users;
a distribution management table for managing user terminal information, a virtual firewall ID, a common filtering table ID, and an individual filtering table ID;
a security policy table in which a user name is associated with at least a security policy;
a communication part configured to communicate with an authentication server determining whether a user terminal is connectable; and
a communication part configured to communicate with an identifier management server managing the virtual firewall ID, the common filtering table ID and the individual filtering table ID associated with a user, wherein,
the firewall apparatus receives a connection request with authentication information including the user name from the user terminal when starting a network connection, holds the user name, reports the user name to the authentication server, holds the user terminal information accompanied by an authentication response received from the authentication server, reports the user name to the identifier management server, writes the virtual firewall ID, the common filtering table ID, the individual filtering table ID and the user terminal information received from the identifier management server into the distribution management table, associated with each other, and searches the security policy table using the user name as a key to retrieve policy information associated with the user name, and writes the policy information and the individual filtering table ID into the individual filtering table in the virtual firewall indicated by the virtual firewall ID,
after a connection between the user terminal that issued the connection request and the network is established, the firewall apparatus receives a packet sent from the user terminal or sent to the user terminal,
the firewall apparatus searches the distribution management table using the user terminal information included in the packet as a search key so as to retrieve the virtual firewall ID, the common filtering table ID and the individual filtering table ID associated with the user terminal information, and
the firewall apparatus distributes the packet to the virtual firewall indicated by the virtual firewall ID, and filters the packet using the common filtering table corresponding to the common filtering table ID and the individual filtering table corresponding to the individual filtering table ID.

36. A firewall apparatus provided between a plurality of user terminals and a network and performing filtering for the user terminals, the firewall apparatus comprising:
at least a virtual firewall performing packet filtering for plural users;
at least an individual filtering table holding security policies for each user;
at least a common filtering table holding a security policy common to plural users;
a distribution management table for managing user terminal information, a virtual firewall ID, a common filtering table ID, and an individual filtering table ID;
an identifier management table in which a user name, the common filtering table ID and the individual filtering table ID are associated with each other;
a communication part configured to communicate with an authentication server determining whether a user terminal is connectable; and
a communication part configured to communicate with a security policy server managing correspondence between a security policy specific to a user to be written into the individual filtering table, and the user, wherein, the firewall apparatus receives a connection request with authentication information including the user name from the user terminal when starting a network connection, holds the user name, reports the user name to the authentication server, holds the user terminal information accompanied by an authentication response received from the authentication server, reports the user name to the security policy server, searches the identifier management table using the user name as a key to retrieve the virtual firewall ID, the common filtering table ID and the individual filtering table ID associated with the user name, and writes the virtual firewall ID, the common filtering table ID, the individual filtering table ID and the user terminal information into the distribution management table, associated with each other, and writes policy information received from the security policy server and the individual filtering table ID into the individual filtering table in the virtual firewall indicated by the virtual firewall ID, after a connection between the user terminal that issued the connection request and the network is established, the firewall apparatus receives a packet sent from the user terminal or sent to the user terminal, the firewall apparatus searches the distribution management table using the user terminal information included in the packet as a search key so as to retrieve the virtual firewall ID, the common filtering table ID and the individual filtering table ID associated with the user terminal information, and the firewall apparatus distributes the packet to the virtual firewall indicated by the virtual firewall ID, and filters the packet using the common filtering table corresponding to the common filtering table ID and the individual filtering table corresponding to the individual filtering table ID.

37. A firewall apparatus provided between a plurality of user terminals and a network and performing filtering for the user terminals, the firewall apparatus comprising:

at least a virtual firewall performing packet filtering for plural users;

at least an individual filtering table holding security policies for each user;

at least a common filtering table holding a security policy common to plural users;

a distribution management table for managing user terminal information, a virtual firewall ID, a common filtering table ID, and an individual filtering table ID;

a security policy table in which a user name is associated with at least a security policy;

a communication part configured to communicate with an authentication server determining whether a user terminal is connectable, wherein, the firewall apparatus receives a connection request with authentication information including the user name from the user terminal when starting a network connection, holds the user name, reports the user name to the authentication server, holds the user terminal information accompanied by an authentication response received from the authentication server, searches an identifier management table using the user name as a key to retrieve the virtual firewall ID, the common filtering table ID and the individual filtering table ID associated with the user name, and writes the virtual firewall ID, the retrieved common filtering table ID, the individual filtering table ID and the user terminal information into the distribution management table, associated with each other, and searches the security policy table using the user name as a key to retrieve policy information associated with the user name, and writes the policy information and the individual filtering table ID into the individual filtering table in the virtual firewall indicated by the virtual firewall ID, after a connection between the user terminal that issued the connection request and the network is established, the firewall apparatus receives a packet sent from the user terminal or sent to the user terminal, the firewall apparatus searches the distribution management table using the user terminal information, included in the packet, as a search key so as to retrieve the virtual firewall ID, the common filtering table ID and the individual filtering table ID associated with the user terminal information, and the firewall apparatus distributes the packet to the virtual firewall indicated by the virtual firewall ID, and filters the packet using the common filtering table corresponding to the common filtering table ID and the individual filtering table corresponding to the individual filtering table ID.

38. The firewall apparatus as claimed in any one of claims 23, 24-27 28-37, wherein, the authentication server is a Radius server, the user terminal information is an IP address provided to the user terminal, the connection to the network from the user terminal is PPP, and PAP or CHAP is used for authentication.

* * * * *